(12) United States Patent
Murphy

(10) Patent No.: US 10,791,536 B1
(45) Date of Patent: Sep. 29, 2020

(54) SYSTEMS AND METHODS FOR SHORT RANGE PEER-TO-PEER NAVIGATION

(71) Applicant: Lyft, Inc., San Francisco, CA (US)

(72) Inventor: Conrad Xavier Murphy, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 16/446,289

(22) Filed: Jun. 19, 2019

(51) Int. Cl.
| | |
|---|---|
| H04W 24/00 | (2009.01) |
| H04W 64/00 | (2009.01) |
| H04W 4/02 | (2018.01) |
| H04W 4/40 | (2018.01) |
| G06Q 50/30 | (2012.01) |
| G01S 5/00 | (2006.01) |
| G01S 11/04 | (2006.01) |
| G06Q 10/02 | (2012.01) |
| H04W 76/14 | (2018.01) |

(52) U.S. Cl.
CPC ......... *H04W 64/003* (2013.01); *G01S 5/0072* (2013.01); *G01S 11/04* (2013.01); *G06Q 10/02* (2013.01); *G06Q 50/30* (2013.01); *H04W 4/023* (2013.01); *H04W 4/026* (2013.01); *H04W 4/40* (2018.02); *H04W 76/14* (2018.02)

(58) Field of Classification Search
None
See application file for complete search history.

(56) References Cited

U.S. PATENT DOCUMENTS

| | | | |
|---|---|---|---|
| 9,562,785 B1* | 2/2017 | Racah | G01C 21/3438 |
| 9,965,960 B1 | 5/2018 | McDavitt-Van Fleet | |
| 10,176,718 B1* | 1/2019 | Mazuir | H04W 4/023 |
| 2010/0094482 A1* | 4/2010 | Schofield | G08G 1/205 701/2 |
| 2013/0290043 A1* | 10/2013 | Hoque | G06Q 10/02 705/5 |
| 2018/0189713 A1 | 7/2018 | Matthiesen et al. | |
| 2019/0212425 A1* | 7/2019 | Odejerte, Jr. | G01S 11/06 |
| 2019/0248439 A1* | 8/2019 | Wang | B60L 53/18 |
| 2019/0324446 A1* | 10/2019 | VanderZanden | B60R 25/24 |

* cited by examiner

*Primary Examiner* — Erika A Washington
(74) *Attorney, Agent, or Firm* — Haynes and Boone, LLP

(57) ABSTRACT

The disclosed computer-implemented method may include determining a wireless identifier associated with a vehicle computing device coupled to a vehicle, transmitting wireless signals for receipt by an antenna included in the vehicle computing device, establishing a wireless connection to the vehicle computing device via one or more of the wireless signals using the wireless identifier, receiving, via the wireless connection, bearing information that indicates a bearing of the vehicle computing device relative to the requestor computing device, the bearing information being based on an angle of arrival of the one or more wireless signals received by the antenna, and displaying information describing a location of the vehicle relative to the requestor computing device based at least in part on the bearing information. Various other methods, systems, and computer-readable media are also disclosed.

20 Claims, 31 Drawing Sheets

SYSTEMS AND METHODS FOR SHORT RANGE PEER-TO-PEER NAVIGATION

BACKGROUND

A dynamic transportation network that provides on-demand transportation to transportation requestors may include and use personal mobility vehicles for fulfilling transportation requests. A transportation requestor may meet up with a personal mobility vehicle (e.g., a scooter) and ride the personal mobility vehicle along a route from a starting location to an ending location (a destination). In some cases, the transportation requestor may need to travel to (e.g., walk to) a location of the personal mobility vehicle before starting a trip. As the transportation requestor gets closer to the location of the personal mobility vehicle it may be difficult for the transportation requestor to find the personal mobility vehicle. For example, the personal mobility vehicle may be located behind a building, in an alley alongside a building, or in a location that may not be readily apparent to the transportation requestor as the transportation requestor approaches the designated location of the personal mobility vehicle. This may prove frustrating to the transportation requestor increasing an overall travel time for the trip.

SUMMARY

As will be described in greater detail below, the instant disclosure describes systems and methods for pinpointing a location of a personal mobility vehicle when a requestor is within a predetermined distance from the personal mobility vehicle using peer-to-peer communications between a computing device coupled to the personal mobility vehicle and a computing device of the requestor.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
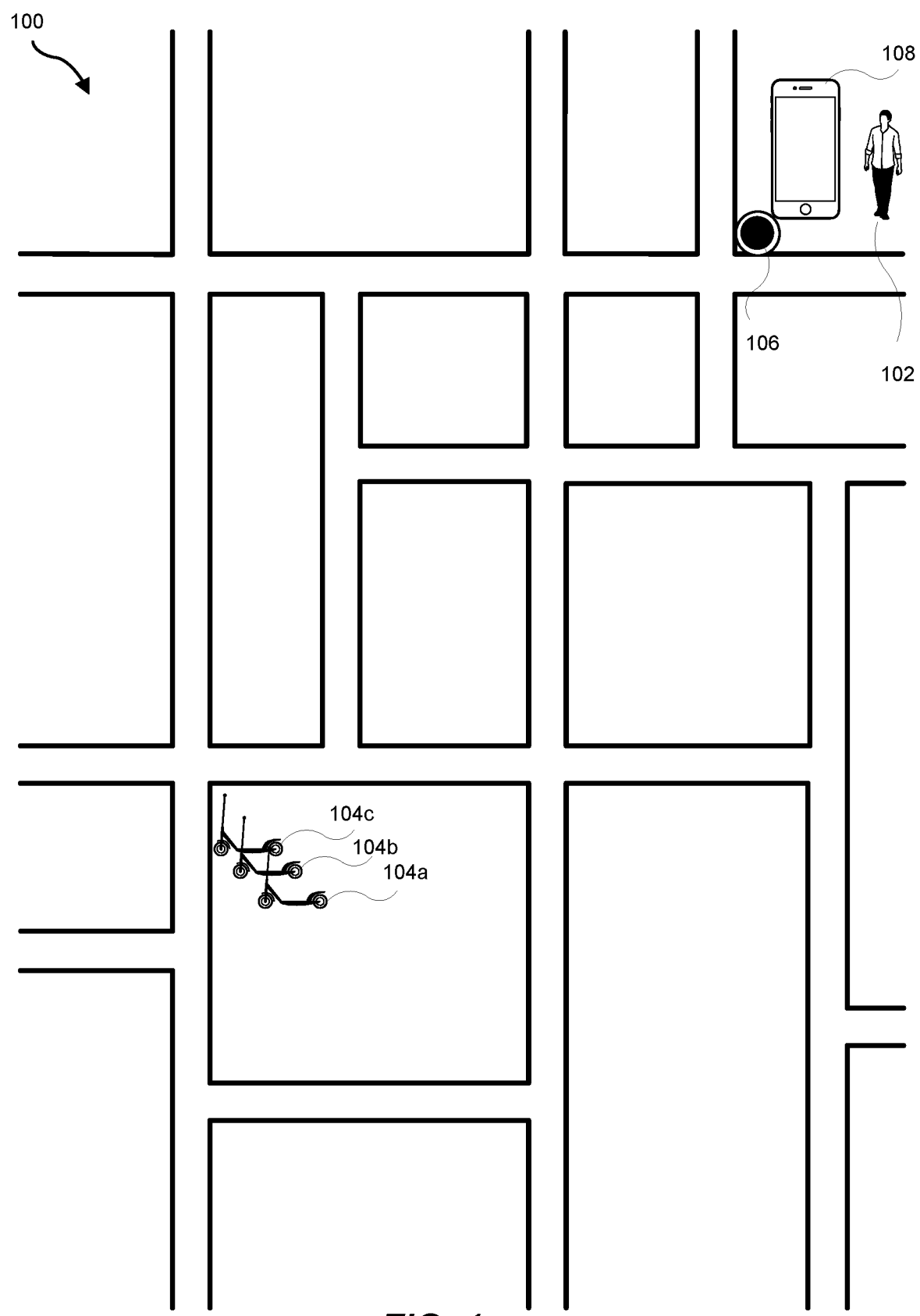
FIG. 1 is an illustration of an example of a first scenario of a transportation requestor requesting to be matched with (reserve) a personal mobility vehicle for use in fulfilling a transportation request.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for helping a transportation requestor (also referred to herein as a requestor) pinpoint a location of a personal mobility vehicle matched to the requestor (reserved by the requestor) for fulfilling a transportation request when the requestor is within a range of a short-range communication system utilized by both a mobile computing device of the requestor (e.g., a smartphone, a tablet, a personal digital assistant (PDA)) and a computing device coupled to (included on, mounted to) the personal mobility vehicle.

As will be explained in greater detail below, embodiments of the instant disclosure may use short-range communications and/or angle of arrival calculations of the mobile computing device of the requester (the requestor computing device) to the personal mobility vehicle computing device using antennas included in the personal mobility vehicle computing device that can support such calculations to help a requestor pinpoint a location of the personal mobility vehicle reserved by the requestor when the requestor is within a range of the short-range communication protocol. For example, the requestor may be very close to (almost at) the location of the personal mobility vehicle but may not be able to locate the personal mobility vehicle. In some implementations, the use of a global positioning system (GPS) signals for geolocation information may not be precise enough to pinpoint a location of a personal mobility vehicle because, for example, buildings and mountains may block some GPS signals. Therefore, GPS signals may be imprecise in many environments (e.g., urban area) that may include many tall buildings and other structures that may block GPS signals.

The user interface of the requestor computing device may display a map based on GPS coordinates to help the requestor navigate from a location of the requestor to a location of the reserved personal mobility vehicle. The requestor, however, may find it difficult to pinpoint the location of the reserved personal mobility vehicle by using the map based on the GPS coordinates. Though the information provided by the GPS signals may indicate that the requestor is at the location of the personal mobility vehicle, the imprecision of the GPS signals may not be able to direct the requestor to the exact location of the personal mobility vehicle.

The requestor may locate the reserved personal mobility vehicle if the requestor is provided with location information for the personal mobility vehicle that is at a greater precision that that provided by the GPS signals. For example, when the requestor computing device is within a short-range communication range of the personal mobility vehicle computing device, angle of arrival calculations of the requestor computing device to the personal mobility vehicle computing device may be possible using antennas included in the personal mobility vehicle computing device that can support such calculations (e.g., directional antennas, phased array antennas). For example, the requestor computing device may establish a wireless communication connection (e.g., Bluetooth, Bluetooth LE, Bluetooth 5, WiFi, wireless local area network (WLAN), near field communications (NFC), etc.) to the personal mobility vehicle computing device by way of antenna(s) included in (installed in or coupled to) the personal mobility vehicle computing device.

In some implementations, the antenna(s) included in the personal mobility vehicle may be leveraged to perform angle of arrival calculations of the requestor computing device to the personal mobility vehicle computing device based on wireless signals and communications between the personal mobility vehicle computing device and the requestor computing device. In no particular order, the following may be determined: (i) a distance between the personal mobility vehicle computing device and the requestor computing device based a measured signal strength of a wireless signal between the personal mobility vehicle computing device and the requestor computing device, (ii) an angle of arrival of a wireless signal from the requestor computing device to the antenna(s), and (iii) an orientation of the antenna(s) (e.g., based on a sensed orientation of the personal mobility vehicle). Each individually, or any combination of, the personal mobility vehicle computing device, the requestor computing device and a dynamic transportation matching system communicatively coupled to the personal mobility vehicle computing device and the requestor computing device may use the distance between the personal mobility vehicle computing device and the requestor computing device, the angle of arrival of the wireless signal from the requestor computing device to the antenna(s), and the orientation of the antenna(s) to determine a bearing of the personal mobility vehicle with respect to the requestor computing device. In some implementations, a personal mobility vehicle computing device and a requestor computing device may form a peer-to-peer network using short-range communications to determine a bearing of the personal mobility vehicle with respect to the requestor computing device.

The requestor computing device may receive and/or determine the bearing of the personal mobility vehicle computing device with respect to the requestor computing device. The requestor computing device may use the bearing information to provide a user interface on a display device of the requestor computing device that may navigate (direct) the requestor to the exact location of the personal mobility vehicle. For example, the user interface may be a compass-like indicator that directs the requestor to the personal mobility vehicle. In addition, or in the alternative, for example, the user interface may display a GPS-mapped location of the personal mobility vehicle that may be refined as the requestor travels towards the personal mobility vehicle. In addition, or in the alternative, the determined distance between the personal mobility vehicle computing device and the requestor computing device may be displayed in the user interface providing the requestor with additional location information for the personal mobility vehicle. For example, an augmented-reality display may be used to show the location of the personal mobility vehicle as the requestor travels towards the personal mobility vehicle.

In some situations, other personal mobility vehicles may be nearby the reserved personal mobility vehicle. The other nearby personal mobility vehicles may each include (have mounted on) a computing device that each include antenna(s) also leveraged to perform angle of arrival calculations. When the requestor computing device is within a short-range communication range of each of the other nearby personal mobility vehicle computing devices, angle of arrival calculations of the requestor computing device to the respective personal mobility vehicle computing device may also be possible using the antenna(s) included in the respective personal mobility vehicle computing device. In addition, or in the alternative, each of the personal mobility vehicle computing devices may be configured to communicate with one another. In these situations, the other nearby personal mobility vehicles may provide corroborating bearing and/or distance information about the location of the computing device of the reserved personal mobility vehicle with respect to the requestor computing device using similar short-range communications with the requestor computing device.

FIG. 1 is an illustration of an example of a first scenario 100 of a transportation requestor 102 requesting to be matched with (reserve) a personal mobility vehicle (e.g., one of the personal mobility vehicles 104*a-c*) for use in fulfilling a transportation request. A requestor 102 may request transportation using a personal mobility vehicle. The requestor 102, however, may be at a location 106 (e.g., home, work, a venue, a friend's house) where a personal mobility vehicle may not be located. To fulfill the request, the requestor 102 may be directed to a location (e.g., a nearest location, a location that the requestor may easily walk to) where at least one personal mobility vehicle may be available for use. Using a mobile computing device (e.g., requestor computing device 108), the requestor 102 may launch an application for a transportation provider. This will be described in more detail referring, at least, to FIG. 4. The provider application may facilitate the matching (reserving) of a nearby personal mobility vehicle for use by the requestor 102. In the example shown in FIG. 1, more than one (e.g., two or more) personal mobility vehicles (e.g., personal mobility vehicles 104*a-c*) may be available for use by the requestor. The provider application may facilitate the matching (reserving) of one of the personal mobility vehicles 104*a-c*. For example, the provider application may match the requestor 102 with personal mobility vehicle 104*c*. The provider application may assist the user in finding the personal mobility vehicle 104*c* by providing directions to the personal mobility vehicles 104*a-c* and then by, for example, providing a visual and/or audio indication of which of the personal mobility vehicles 104*a-c* the requestor 102 has reserved.

Figure 2:
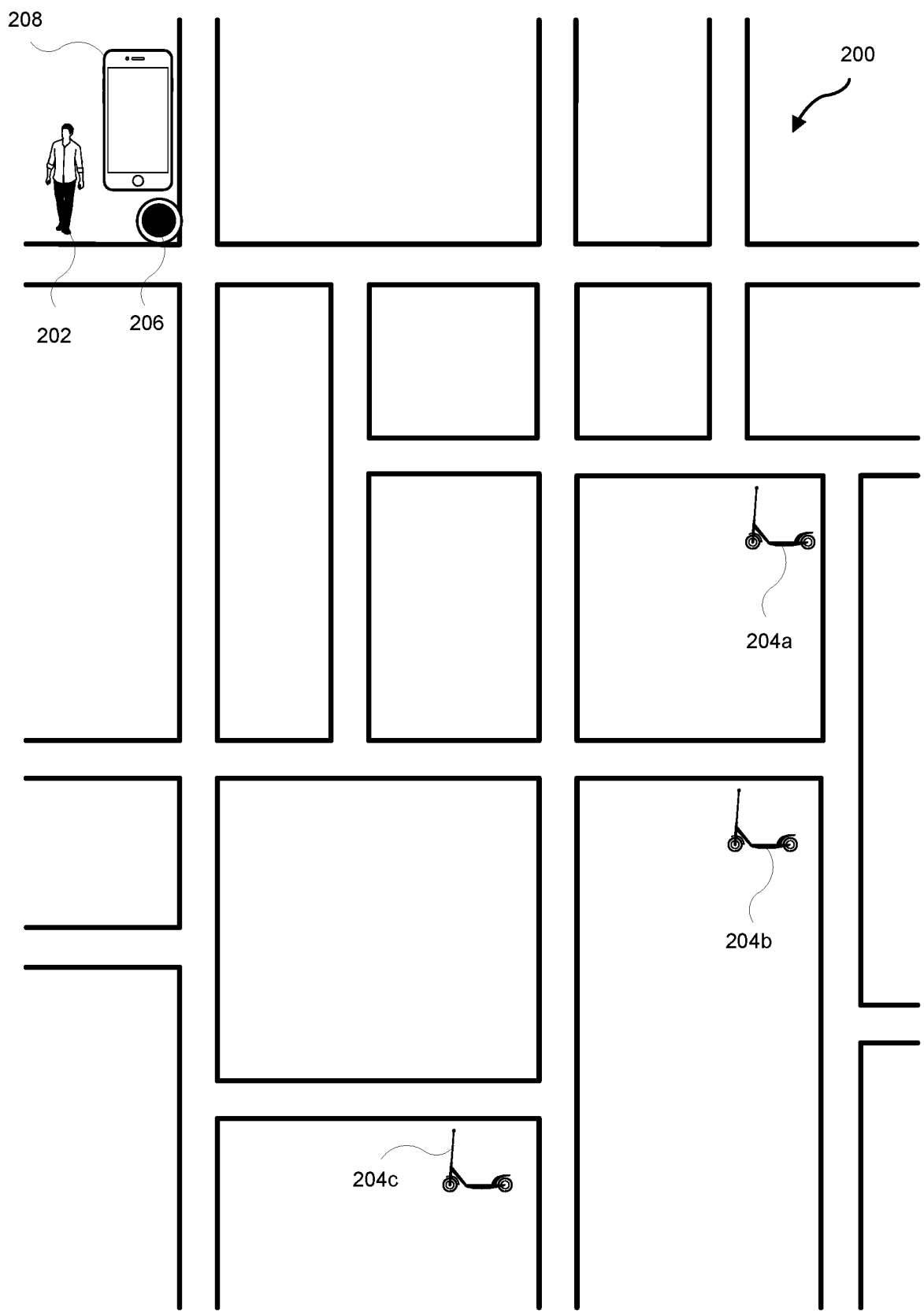
FIG. 2 is an illustration of an example of a second scenario of a transportation requestor requesting to be matched with (reserve) a personal mobility vehicle for use in fulfilling a transportation request.

FIG. 2 is an illustration of an example of a second scenario 200 of a transportation requestor 202 requesting to be matched with (reserve) a personal mobility vehicle (e.g., one of the personal mobility vehicles 204*a-c*) for use in fulfilling a transportation request. A requestor 202 may request transportation using a personal mobility vehicle. As in the first scenario 100, the requestor 202 may be at a location 206 where a personal mobility vehicle may not be located and may be directed to a location of an available personal mobility vehicle.

Using a mobile computing device (e.g., requestor computing device 208), the requestor 202 may launch the provider application. In the example shown in FIG. 2, more than one (e.g., two or more) personal mobility vehicles (e.g., personal mobility vehicles 204*a-c*) may be available for use by the requestor where each of the personal mobility vehicles are available at different locations proximate to the requestor 202.

In one example, the provider application may match the requestor 202 to a nearest (or closest) personal mobility vehicle. In another example, the provider application may match the requestor 202 to a personal mobility vehicle that the requestor 202 may more easily walk to (e.g., the route from the requestor 202 to the personal mobility vehicle has sidewalks). In all examples, the provider application may assist the user in finding the personal mobility vehicle 104*c* by providing directions to the personal mobility vehicle.

Figure 3:
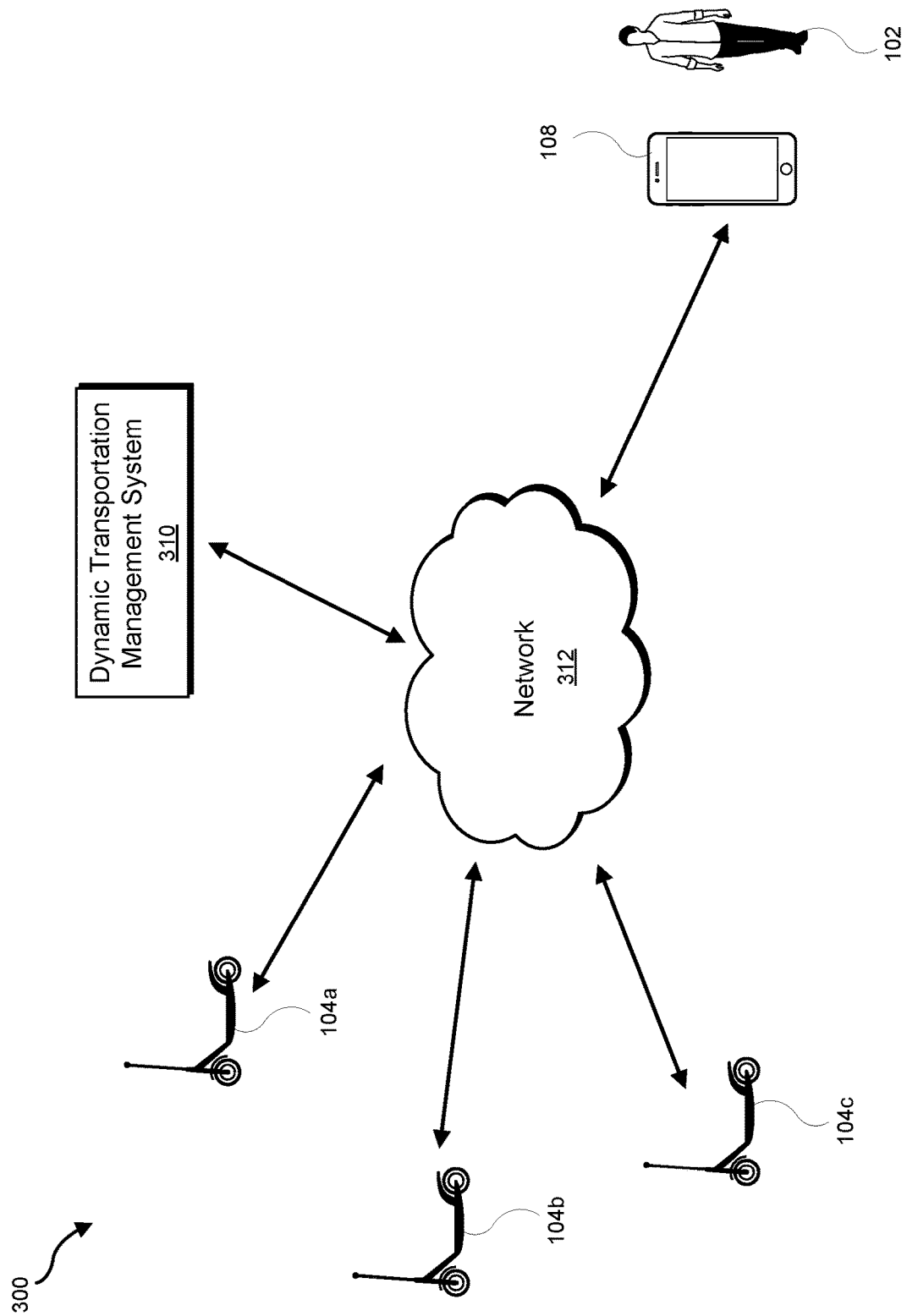
FIG. 3 is an illustration of an example network interface for use by a transportation provider when matching (reserving) a personal mobility vehicle for use by a transportation requestor.

FIG. 3 is an illustration of an example network interface 300 for use by a transportation provider when matching (reserving) a personal mobility vehicle for use by a transportation requestor. For example, referring to FIG. 1, a dynamic transportation matching system 310 of a transportation provider may interface with a network 312. A respective computing device coupled to (mounted on) each of the personal mobility vehicles 104*a-c* may communicate with the dynamic transportation matching system 310 by way of the network 312. The requestor computing device 108 may also communicate with the dynamic transportation matching system 310 by way of the network 312. The dynamic transportation matching system 310 may facilitate the matching of a personal mobility vehicle (e.g., one of the personal mobility vehicles 104*a-c*) with the requestor 102 based on communications with the personal mobility vehicles 104*a-c* as well as communications with the requestor computing device 108. For example, a provider application running (executing) on the requestor computing device 108 may communicate with the dynamic transportation matching system 310 when reserving a personal mobility vehicle. Once reserved, the requestor computing device 108 may communicate with the dynamic transportation matching system 310 for directions from the location of the requestor (e.g., location 106) to a location of the personal mobility vehicle. More details of the example network interface 300 will be described, at least, with reference to FIG. 30.

Figure 4:
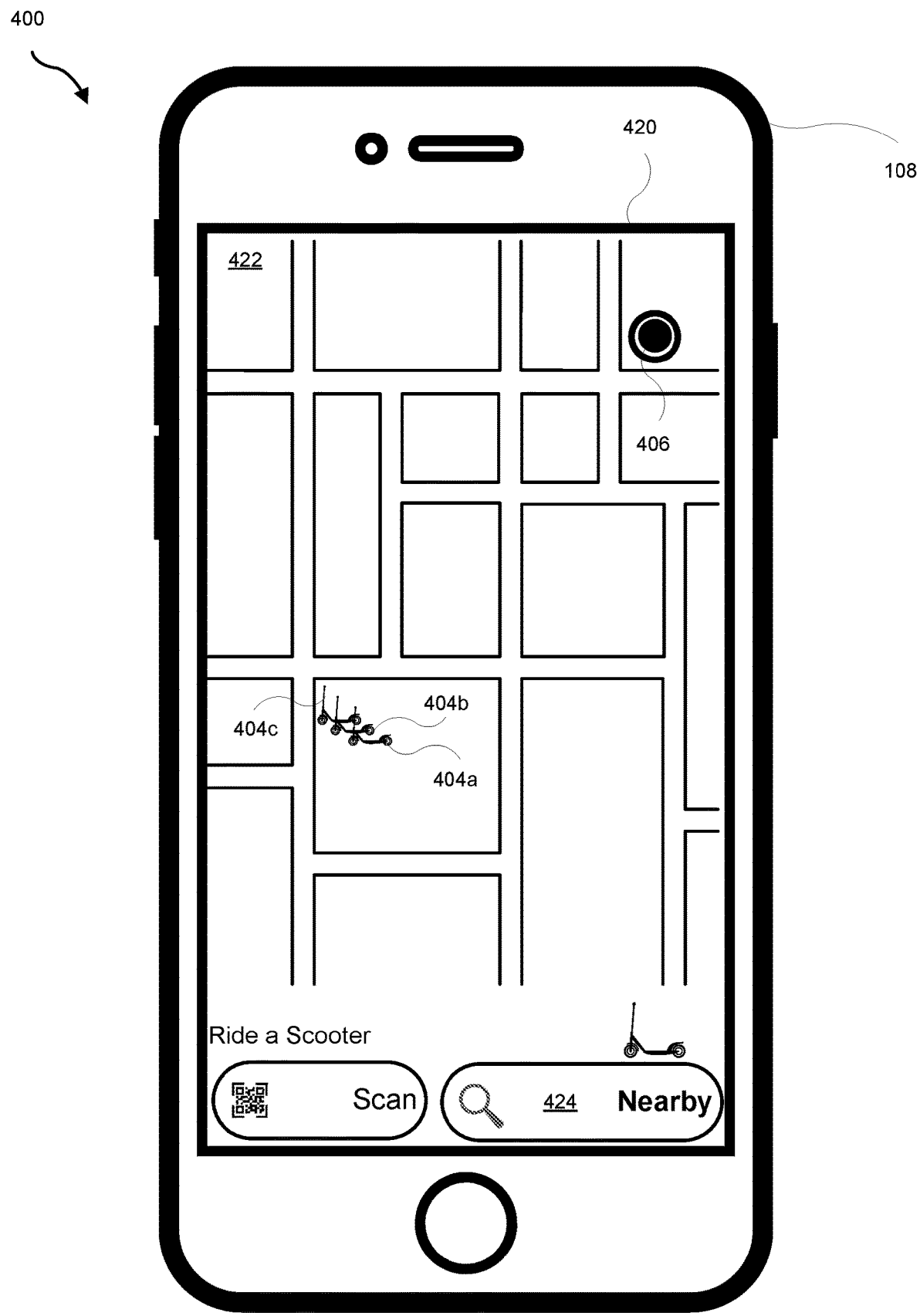
FIG. 4 is an illustration of a first example graphical user interface for a provider application executing on a requestor computing device as displayed on a display device of the requestor computing device.

FIG. 4 is an illustration of a first example graphical user interface (GUI) 400 for a provider application executing on a requestor computing device (e.g., the requestor computing device 108) as displayed on a display device 420 of the requestor computing device (e.g., the requestor computing device 108). For example, a requestor (e.g., the requestor 102) may select a nearby button 424. On selection, the provider application may determine one or more personal mobility vehicles available for use by a requestor that are nearby (proximate to) a current location of the requestor. For example, the provider application may display a map 422 in the GUI 400 that shows indications of locations of available personal mobility vehicles (e.g., personal mobility vehicle indicators 404a-c). Referring, for example to FIG. 1, each personal mobility vehicle indicator 404a-c is associated with a respective personal mobility vehicle 104a-c. The map 422 may show a location indicator 406 associated with a location of a requestor (e.g., the location 106 of the requestor 102 (the location 106 of the requestor computing device 108)). In some cases, the requestor 102 may select one of the available personal mobility vehicles to be matched with in order to satisfy the request. In some cases, the provider application may match the requestor 102 with a particular personal mobility vehicle.

Referring to FIG. 3, the provider application executing on the requestor computing device 108 may communicate with the dynamic transportation matching system 310 by way of the network 312. The dynamic transportation matching system 310 may match the personal mobility vehicle 104a with the requestor 102. In some implementations, the dynamic transportation matching system 310, by way of the network 312, may provide the map 422 to the requestor computing device 108 for display on the display device 420. In some implementations, the dynamic transportation matching system 310, by way of the network 312, may provide location information for use by the provider application to generate and display the map 422 on the display device 420 of the requestor computing device 108. In some implementations, the dynamic transportation matching system 310, by way of the network 312, may provide location information for the personal mobility vehicles 104a-c and the requestor computing device 108, knowing its current location and the location of the personal mobility vehicles 104a-c, may generate and display the map 422 on the display device 420 of the requestor computing device 108.

Figure 5:
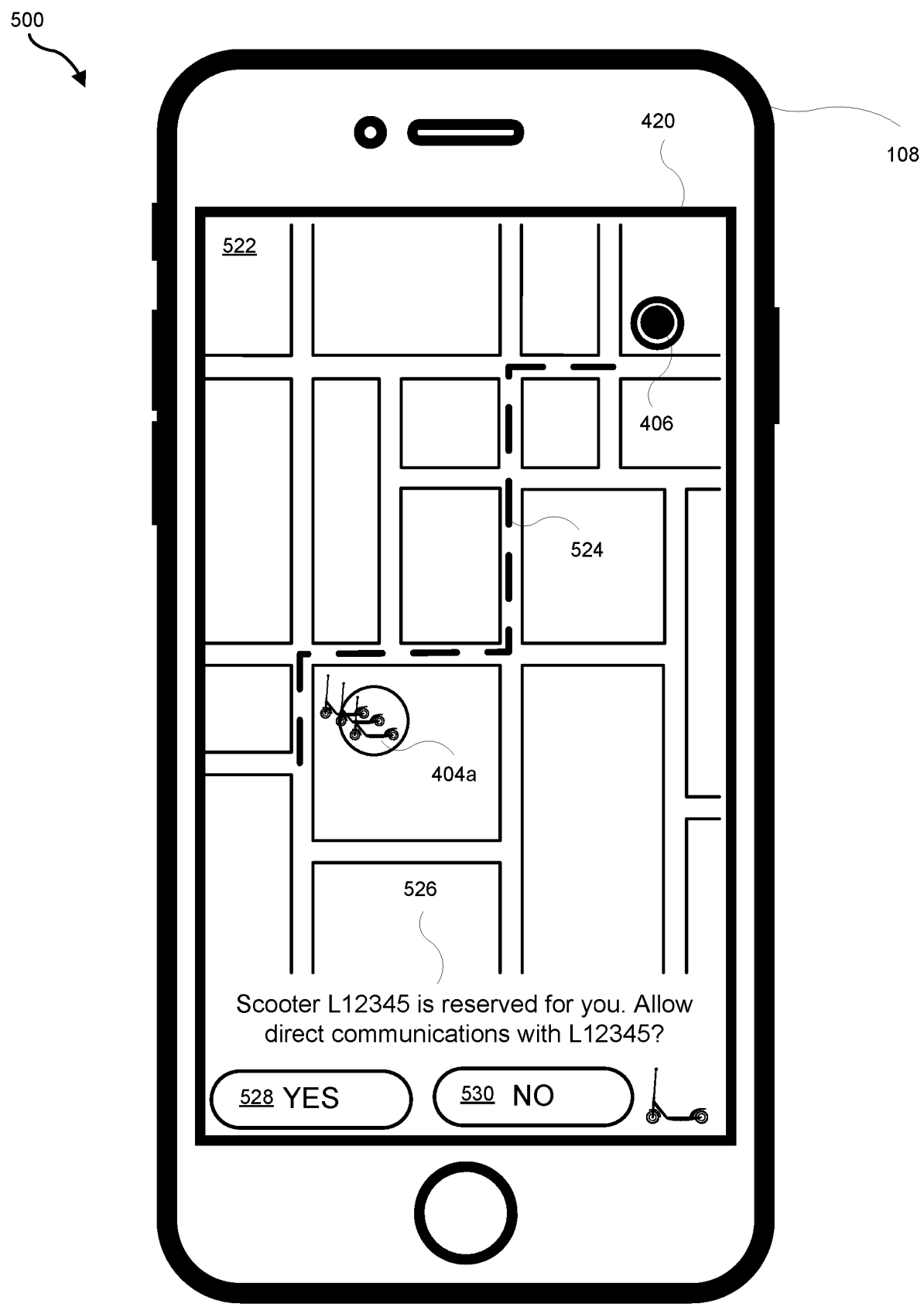
FIG. 5 is an illustration of a second example graphical user interface for a provider application executing on a requestor computing device as displayed on a display device of the requestor computing device.

FIG. 5 is an illustration of a second example graphical user interface (GUI) 500 for a provider application executing on a requestor computing device (e.g., the requestor computing device 108) as displayed on a display device 420 of the requestor computing device (e.g., the requestor computing device 108). A requestor may reserve (be matched with) a personal mobility vehicle. The GUI 500 may display a map 522 that highlights, emphasizes, or otherwise provides a mechanism for indicating the personal mobility vehicle matched with the requestor to satisfy a transportation request. For example, referring to FIG. 1, the requestor 102 may be matched with the personal mobility vehicle 104a. The personal mobility vehicle indicator 404a may be highlighted (e.g., displayed in a different color, circled, bolded) or displayed in such a way that indicates the reserving of the personal mobility vehicle 104a by the requestor 102. The map 522 may also show the location indicator 406 and a route 524 for travel of a requestor (e.g., the requestor 102) from the location of the requestor (e.g., the location 106) to a location of the personal mobility vehicle 104a.

Information area 526 may display a message to the requestor 102 regarding the matching of the personal mobility vehicle 104a with the requestor 102. For example, the requestor 102 may allow (e.g., select the YES button 528) or not allow (e.g., select the NO button 530) the possibility of direct communications to be established between the requestor computing device 108 and a computing device coupled to (mounted on) the personal mobility vehicle 104a when the requestor computing device 108 and the computing device coupled to (mounted on) the personal mobility vehicle 104a are within a range of short-range communications.

Referring to FIG. 3, the provider application executing on the requestor computing device 108 may communicate with the dynamic transportation matching system 310 by way of the network 312. The dynamic transportation matching system 310, by way of the network 312, may provide information for the route of travel from the location of the requestor (e.g., location 106) to the location of the personal mobility vehicle 104a. The provider application may use the information to show the route 524 on the map 522.

In addition, the dynamic transportation matching system 310 may communicate with a computing device coupled to (mounted on) the personal mobility vehicle 104a by way of the network 312. The communications may inform the computing device of the personal mobility vehicle 104a that the personal mobility vehicle 104a is reserved and is no longer available for matching to another requestor. In some implementations, the computing device of the personal mobility vehicle 104a may include one or more visual indicators that may be illuminated or otherwise controlled to indicate that the personal mobility vehicle 104a is reserved.

Figure 6:
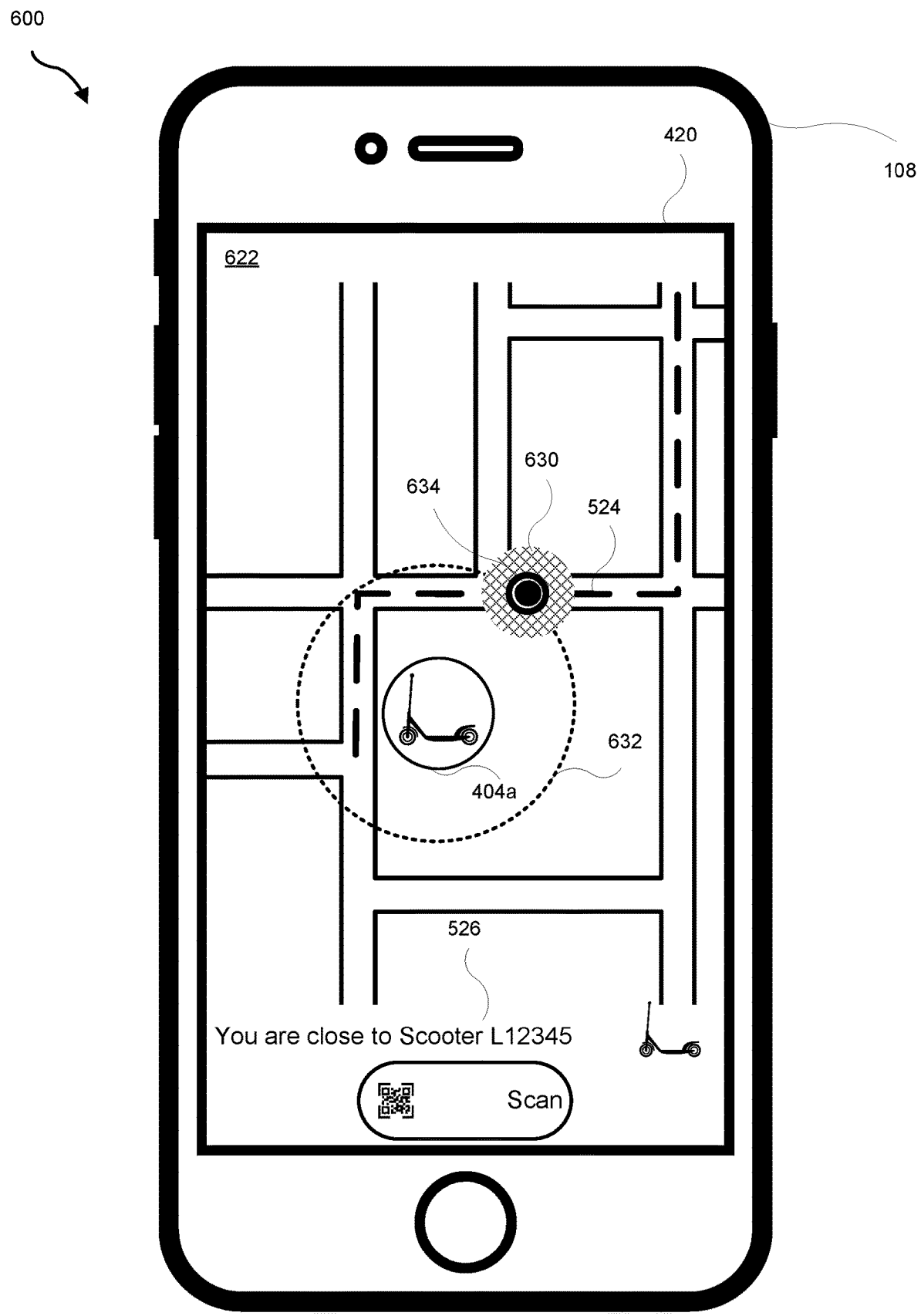
FIG. 6 is an illustration of a third example graphical user interface for a provider application executing on a requestor computing device as displayed on a display device of the requestor computing device.

FIG. 6 is an illustration of a third example graphical user interface (GUI) 600 for a provider application executing on a requestor computing device (e.g., the requestor computing device 108) as displayed on a display device 420 of the requestor computing device (e.g., the requestor computing device 108). Referring to FIG. 5, a requestor (e.g., the requestor 102) may follow a direction of travel along the route 524. The provider application may track the travel of the requestor 102 towards the personal mobility vehicle 104a by monitoring the location of the requestor computing device 108. A GUI may display a map that shows indications of the travel of the requestor 102 towards the personal mobility vehicle 104a by showing progress of a requestor location indicator 630 towards the personal mobility vehicle indicator 404a.

The GUI 600 may display a map 622 that provides a visual indication of when a requestor (a computing device of a requestor) is within a short-range communication range of a computing device coupled to (mounted on) a personal mobility vehicle reserved for use by the requestor. For example, the location indicator 630 may provide a visual indication to the requestor 102 that the requestor computing device 108 is within a short-range communication range of a computing device coupled to (mounted on) the personal mobility vehicle 104a at a location 634. For example, area indicator 632 may be displayed providing a visual indication of the short-range communication range of the computing device coupled to (mounted on) the personal mobility vehicle 104a. In some implementations, in addition to or as an alternative to the area indicator 632, the requestor computing device 108 may provide audio and/or haptic indicators when the requestor computing device 108 is within (enters) a short-range communication range of a computing device coupled to (mounted on) the personal mobility vehicle 104a.

Figure 7:
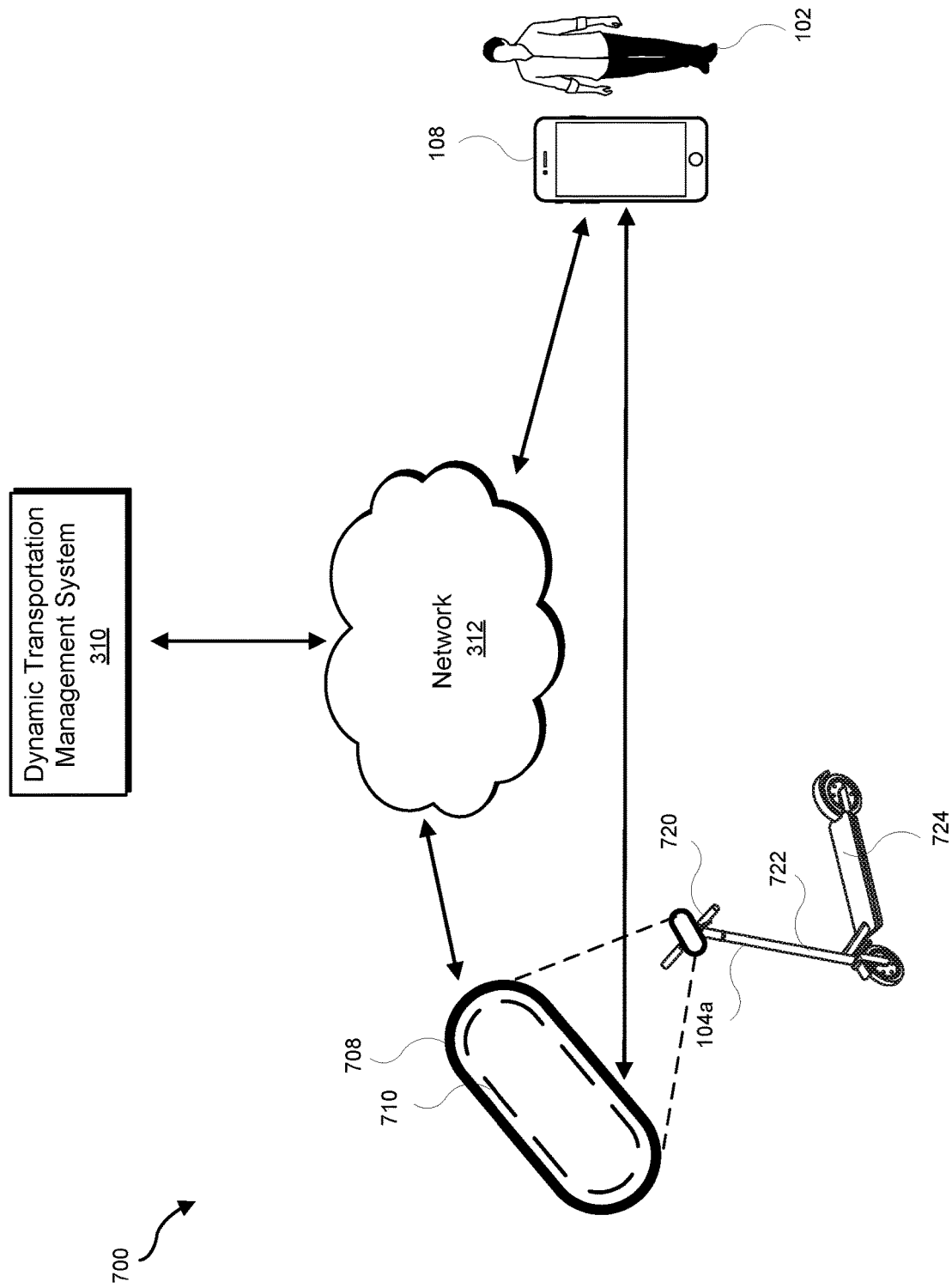
FIG. 7 is an illustration of an example network interface showing peer-to-peer communications between a personal mobility vehicle computing device and a requestor computing device.

FIG. 7 is an illustration of an example network interface 700 showing peer-to-peer communications between a personal mobility vehicle computing device and a requestor computing device. For example, referring to FIG. 3, the dynamic transportation matching system 310, the requestor computing device 108, and a personal mobility vehicle computing device 708 coupled to (mounted on) the personal mobility vehicle 104a reserved by (matched to) the requestor 102 may communicate with each other by way of the network 312. In addition, or in the alternative, the requestor computing device 108 and the personal mobility vehicle computing device 708 may communicate directly with one another using peer-to-peer communications based on a short-range communication protocol when, as shown in FIG. 6, the requestor computing device 108 and the personal mobility vehicle computing device 708 are within the range of short-range communications for the protocol.

In some implementations, the network 312 may be a public communications network (e.g., the Internet, a cellular data network). In some implementations, the requestor computing device 108 and/or the personal mobility vehicle computing device 708 may communicate with the network 312 using wireless communications protocols (e.g., 802.11 variations, WiFi, TCP/IP/UDP, peer-to-peer (P2P, point-to-point (PPP), object exchange protocol (OBEX), wireless application environment (WAE), wireless application protocol (WAP), etc.). The requestor computing device 108 and/or the personal mobility vehicle computing device 708 may communicate with the network 312 using a wireless communication system and protocol for long-range communications with the network 312. For example, the network 312 may be a cellular network that includes multiple cell sites where each site may have a maximum range of up to approximately one-half mile (1600 meters). In some situations, each site may have a maximum range of up to approximately five miles (8000 meters).

In addition, or in the alternative, the requestor computing device 108 and the personal mobility vehicle computing device 708 may communicate with one another using peer-to-peer communications. For example, the requestor computing device 108 and the personal mobility vehicle computing device 708 may communicate with one another wirelessly, using a wireless communication system and protocol for short-range communications once the requestor computing device 108 is within the range of the short-range communication protocol.

For example, the requestor computing device 108 and the personal mobility vehicle computing device 708 may use wireless local area network (WLAN) communication technology standards (e.g., IEEE 802.11 based standards) to communicate with one another. The use of WLAN communication technology standards may enable the establishment of secure short-range (e.g., having a maximum range of approximately 70 meters) communications between the requestor computing device 108 and the personal mobility vehicle computing device 708. In some cases, the maximum range of the short-range communications between two WLAN enabled computing devices may be greater than 70 meters. In some cases, the maximum range of the short-range communications between two WLAN enabled computing devices may be less than 70 meters. On average, however, two WLAN enabled computing devices can communicate with one another when they are located less than approximately 70 meters from each other.

In another example, the requestor computing device 108 and the personal mobility vehicle computing device 708 may use the WiFi wireless technology standard (e.g., IEEE 802.11x) to communicate with one another. The WiFi wireless technology standard may encompass all versions of WiFi. For example, the requestor computing device 108 may enable WiFi communications and may be configured to recognize other computing devices (e.g., the personal mobility vehicle computing device 708) with WiFi-enabled communications when the computing devices are within a particular short-range distance from one another.

In another example, the requestor computing device 108 and the personal mobility vehicle computing device 708 may use the Bluetooth wireless technology standard to communicate with one another. The Bluetooth wireless technology standard may encompass all versions of the Bluetooth standard. The Bluetooth wireless technology standard may include Classic Bluetooth and Bluetooth Low Energy (Bluetooth LE). The use of Bluetooth may enable the establishment of secure short-range (e.g., having a maximum range of approximately 100 meters) communications between the requestor computing device 108 and the personal mobility vehicle computing device 708. In some cases, the maximum range of the short-range communications between two Bluetooth enabled computing devices may be greater than 100 meters. In some cases, the maximum range of the short-range communications between two Bluetooth enabled computing devices may be less than 100 meters. On average, however, two Bluetooth enabled computing devices can communicate with one another when they are located approximately 100 meters from each other.

A computing device using Bluetooth LE may consume less power than a computing device using Classic Bluetooth or other types of wireless communication systems and protocols. It may be advantageous, therefore, when a computing device's power may be limited (e.g., it operates on a battery) to use Bluetooth LE. In cases where a Bluetooth LE enabled computing device may be frequently "searching" for other Bluetooth LE enabled devices (e.g., the Bluetooth LE capability of the computing device may be always on or active), power consumption can be an issue in order for the frequent searching to not drain the battery of the computing device. In addition, the use of Bluetooth may add functionality for other types of connectionless services such as location-based navigation. For example, Bluetooth may allow a measure of a signal strength between computing devices to indicate a relative distance between the computing devices. In addition, or in the alternative, Bluetooth may allow angle of arrival (AoA) and/or angle of departure (AoD) calculations which may be used for location tracking and distance measurements between computing devices.

In general, each computing device (e.g., the requestor computing device 108 and the personal mobility vehicle computing device 708) may be configured to communicate wirelessly, using a wireless communication system and protocol for short-range communication, with one or more other computing devices. For example, the requestor 102 using the provider application may enable or disable the short-range communication capabilities of the requestor computing device 108. For example, the transportation provider may enable or disable the short-range communication capabilities of the personal mobility vehicle computing device 708. Referring to FIG. 5 and FIG. 6, the personal mobility vehicle matched to the requestor 102 (e.g., personal mobility vehicle 104a) may have an associated designation or name (e.g., "L12345"). The associated designation may be displayed in the GUI 500 and the GUI 600 in a text area of the user interface that provides information about the ride to the requestor 102 (e.g., information area 526). As described with reference to FIG. 5, the requestor 102 may choose whether to allow short-range communications between the requestor computing device 108 and the personal mobility vehicle computing device 708.

In some implementations, the personal mobility vehicle computing device 708 may "discover" the requestor computing device 108 when the requestor computing device 108 is within the range of the short-range communication system utilized by both the requestor computing device 108 and the personal mobility vehicle computing device 708. Because the requestor 102 has allowed (enabled) communications with the personal mobility vehicle computing device 708, once discovered by the personal mobility vehicle computing device 708 the requestor computing device 108 may connect to and begin short-range communications with the personal mobility vehicle computing device 708.

Once connected, the personal mobility vehicle computing device 708 may provide information to and/or exchange information with the requestor computing device 108. The information may include location information (e.g., geocoordinates, orientation) for both the personal mobility vehicle computing device 708 and the requestor computing device 108. In addition, or in the alternative, the information may include information about the personal mobility vehicle 104a reserved by the requestor 102 such as characteristics of the personal mobility vehicle 104a that may make finding it easier for the requestor 102 such as color, size, etc.

In some implementations, once the personal mobility vehicle computing device 708 discovers and connects to the requestor computing device 108, information shared between the requestor computing device 108 and the personal mobility vehicle computing device 708 may be through the dynamic transportation matching system 310 by way of the network 312. For example, once the requestor computing device 108 is within the short-range communication distance of the personal mobility vehicle computing device 708, directional information provided by the requestor computing device 108 in the user interface may be finer and more detailed than previous directional information. The dynamic transportation matching system 310 may use the information received from the requestor computing device 108 and the personal mobility vehicle computing device 708 by way of the network 312 to determine and generate the more detailed directional information.

In some implementations, once the personal mobility vehicle computing device 708 discovers and connects to the requestor computing device 108, information may be directly shared between the requestor computing device 108 and the personal mobility vehicle computing device 708 by way of the short-range communication channel (e.g., Bluetooth, WiFi, etc.) using, for example, peer-to-peer communications. For example, once the requestor computing device 108 is within the short-range communication distance of the personal mobility vehicle computing device 708, directional information provided by the requestor computing device 108 in the user interface may be finer and more detailed than previous directional information. In some implementations, the requestor computing device 108 may generate the more detailed directional information for display in a user interface. In some implementations, the personal mobility vehicle computing device 708 may generate the more detailed directional information and provide it to the requestor computing device 108 for display in a user interface.

In some implementations, a measured strength of the signal between the requestor computing device 108 and the personal mobility vehicle computing device 708 may be correlated with a distance between the requestor computing device 108 and the personal mobility vehicle computing device 708. For example, the stronger the strength of the signal (e.g., the larger the measured signal value) between the requestor computing device 108 and the personal mobility vehicle computing device 708, the closer the requestor computing device 108 is to the personal mobility vehicle computing device 708. In some implementations, a measured value of the signal strength may be correlated with a distance value between the requestor computing device 108 and the personal mobility vehicle computing device 708.

In some implementations, the personal mobility vehicle computing device 708 may include one or more antenna(s) 710. For example, the antenna(s) 710 may be used in short-range communications (e.g., a WiFi antenna). In addition, or in the alternative, the antenna(s) may be used to determine an angle of arrival (AoA) of the requestor computing device 108 at various locations along the route of travel of the requestor 102 from the initial discovery and connection of the requestor computing device 108 and the personal mobility vehicle computing device 708 at the location 634 (referring to FIG. 6) to the location of the personal mobility vehicle 104a.

For example, the antenna(s) 710 may be an array of antennas controlled by a computing device included in the personal mobility vehicle computing device 708. The array of antennas may be electronically scanned to create a beam of radio waves that may be steered to point in different directions without the need to physically move each antenna in the array. The antenna(s) 710 may be antenna(s) that can support angle of arrival (AoA) calculations such as, for example, directional antennas or phased array antennas. When the requestor computing device 108 is within a short-range communication range of the personal mobility vehicle computing device 701, angle of arrival calculations of the requestor computing device 108 to the personal mobility vehicle computing device 708 may be possible because using the antenna(s) 710 supports such calculations.

For example, the antenna(s) 710 may be an array of antenna elements powered by a transmitter. A feed current for each antenna element may be provided by way of a phase shifter controlled by the personal mobility vehicle computing device 708. Each antenna element may emit a spherical wavefront that may partially overlap with a spherical wavefront of an adjacent antenna element creating a beam of radio waves traveling in a first direction, where the beam of radio waves may be considered a plane wave directed at a first angle to an axis of the antenna. The personal mobility vehicle computing device 708, by controlling the phase shifter, may change the direction of travel of the beam of radio waves, for example, creating a beam of radio waves traveling in a second direction, where the beam of radio waves may be considered a plane wave directed at a second angle to an axis of the antenna. Angle of arrival calculations using signals received by one or more of the antenna elements (e.g., signals transmitted by the requestor computing device 108 and received by the personal mobility vehicle computing device 708) may be used to determine directional information of the arrival of the requestor computing device 108 to the personal mobility vehicle computing device 708.

The antennas may be used to determine a direction of the requestor computing device 108 towards the personal mobility vehicle computing device 708 (e.g., an AoA). The AoA may be used to determine finer and more precise directional information that may be presented to the requestor 102 for use in helping the requestor 102 navigate towards and pinpoint the exact location of the personal mobility vehicle 104a. The array of antennas may use the short-range communication signals between the requestor computing device 108 and the personal mobility vehicle computing device 708 to determine (compute) an AoA of the requestor computing device 108 towards the personal mobility vehicle computing device 708.

As shown in FIG. 7, the personal mobility vehicle computing device 708 may be coupled to or mounted on a handle bar 720 of the personal mobility vehicle 104a. In some implementations, the personal mobility vehicle computing device 708 may be coupled to or mounted on the personal mobility vehicle 104*a* at other locations on the personal mobility vehicle 104*a* such as on a bar 722, a platform 724, or any other location on the personal mobility vehicle 104*a* that may accommodate the personal mobility vehicle computing device 708. In some implementations, the personal mobility vehicle computing device 708 may be removably coupled to the personal mobility vehicle 104*a*. For example, the personal mobility vehicle computing device 708 may be placed into a bracket or other type of mounting device for coupling (mounting) the personal mobility vehicle computing device 708 to the personal mobility vehicle 104*a*. In some implementations, the personal mobility vehicle computing device 708 may be mounted on or coupled to the personal mobility vehicle 104*a* where mounting and/or removal of the personal mobility vehicle computing device 708 from the personal mobility vehicle 104*a* may require the use of tools or other devices to aid in the mounting and/or removal of the personal mobility vehicle computing device 708 from the personal mobility vehicle 104*a*.

Figure 8:
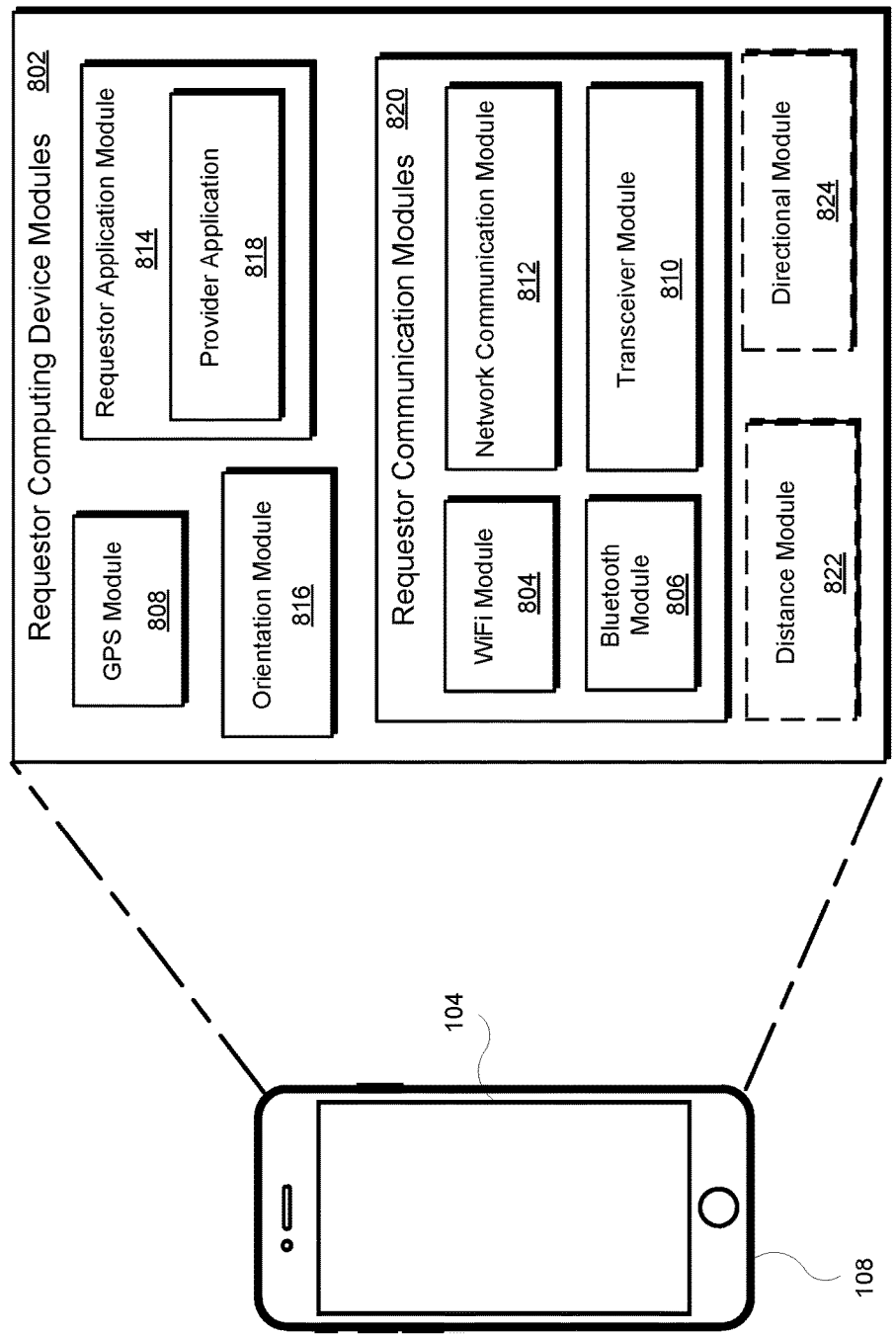
FIG. 8 is an illustration of example modules included in a requestor computing device.

FIG. 8 is an illustration of example modules 802 included in a requestor computing device (e.g., the requestor computing device 108). Referring to FIG. 1, the modules 802 may be used by a requestor computing device (e.g., the requestor computing device 108) to help navigate a requestor (e.g., the requestor 102) to a reserved personal mobility vehicle (e.g., the personal mobility vehicle 104*a*). The requestor computing device modules 802 include requestor computing device communication modules 820, a global positioning system (GPS) module 808, an orientation module 816, and a requestor application module 814. The requestor computing device communication modules 820 include a WiFi module 804, a Bluetooth module 806, a transceiver module 810, and a network communication module 812.

The WiFi module 804 maybe hardware, firmware, and/or software configured to implement WiFi communications between the requestor computing device 108 and other WiFi enabled devices. The WiFi module 804 may interface with a WiFi antenna included in the requestor computing device 108.

The Bluetooth module 806 may be hardware, firmware, and/or software configured to implement Bluetooth communications between the requestor computing device 108 and other Bluetooth enabled devices. The transceiver module 810 may include hardware and/or software and may be configured to implement wireless communications between the requestor computing device 108 and other computing devices by wirelessly interfacing with or connecting to a cellular telecommunications network.

The network communication module 812 may be hardware, firmware, and/or software configured to implement wired and/or wireless communications between the requestor computing device 108 and other computing devices connected to or interfaced with a network. For example, referring to FIG. 3 and FIG. 7, the network communication module 812 may implement wired and/or wireless communications between the requestor computing device 108, the dynamic transportation matching system 310, and/or the personal mobility vehicle computing device 708 by way of the network 312.

The GPS module 808 may be hardware, firmware, and/or software configured to receive and use GPS coordinates to determine a location (e.g., latitude/longitude) of the requestor computing device 108. The orientation module 816 may be hardware, firmware, and/or software configured to determine an orientation of the requestor computing device 108. For example, the orientation module 816 may determine a current direction of travel (e.g., north, south, east, west, or any combination) of the requestor computing device 108 based on a current orientation of the requestor computing device 108. For example, the requestor computing device 108 may include one or more multi-axis gyroscopes, one or more accelerometers, and/or other devices that may be used to determine motion and/or orientation of the requestor computing device 108. The orientation module 816 may use information and data received from one or more of the one or more motion and/or orientation devices to determine an orientation of the requestor computing device 108.

The requestor application module 814 may be hardware, firmware, and/or software. The requestor computing device 108 may run (execute) a provider application 818 (the provider application as described herein). The requestor application module 814 may interface with the WiFi module 804, the Bluetooth module 806, the transceiver module 810, the network communication module 812, the GPS module 808, the orientation module 816, the distance module 822, and the directional module 824. For example, referring at least to FIGS. 4-6, the requestor application module 814 may generate and control a graphical user interface (GUI or user interface as described herein) for display on the display device 420 of the requestor computing device 108.

The requestor computing device modules 802 may include a distance module 822 and a directional module 824. The distance module 822 may be hardware, firmware, and/or software configured to determine a distance between the requestor computing device 108 and a computing device coupled to a reserved personal mobility vehicle (e.g., the personal mobility vehicle computing device 708). For example, the personal mobility vehicle computing device 708 may provide the requestor computing device 108 with information and/or data related to a signal strength of a short-range communication signal between the requestor computing device 108 and the personal mobility vehicle computing device 708. The distance module 822 may use the information and/or data to determine a value for a distance between the requestor computing device 108 and the personal mobility vehicle computing device 708. The distance module 822 may provide the distance value to the requestor application module 814 for display in the GUI.

The directional module 824 may be hardware, firmware, and/or software configured to determine an AoA of the requestor computing device 108 to a computing device coupled to a reserved personal mobility vehicle (e.g., the personal mobility vehicle computing device 708). For example, in some implementations, the personal mobility vehicle computing device 708 may provide the requestor computing device 108 with information and/or data related to signal measurements gathered from the antenna(s) 710. The directional module 824 may use the information and/or data to determine a value for AoA of the requestor computing device 108 to the personal mobility vehicle computing device 708. The directional module 824 may provide the AoA value to the requestor application module 814. The requestor application module 814 may use the AoA value to provide more detailed directional information to the requestor 102 for display in the GUI.

Figure 9:
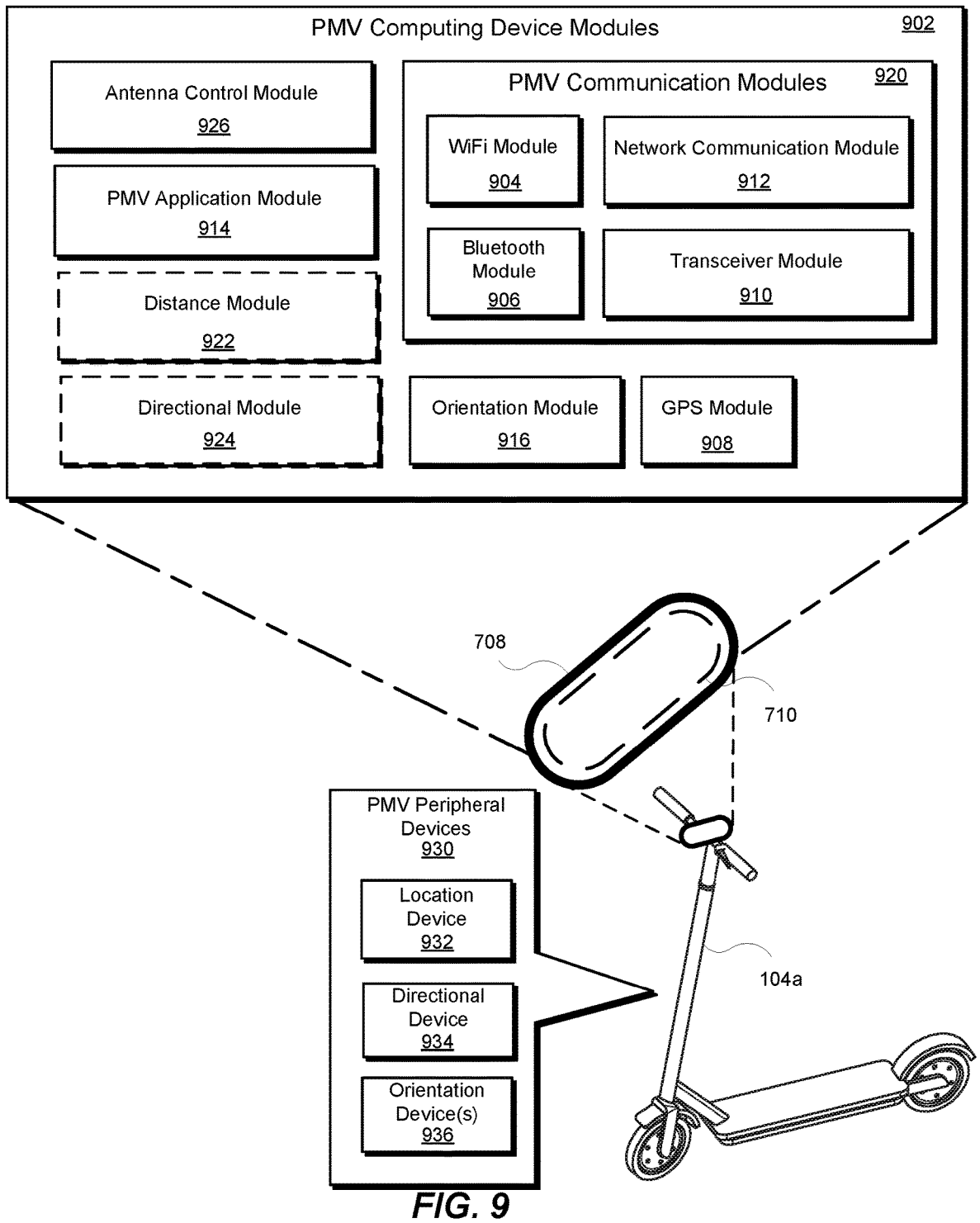
FIG. 9 is an illustration of examples modules included in a personal mobility vehicle computing device.

FIG. 9 is an illustration of examples modules 902 included in a personal mobility vehicle computing device (e.g., the personal mobility vehicle computing device 708). Referring to FIG. 7, the modules 902 may be used by a personal mobility vehicle computing device (e.g., the personal mobility vehicle computing device 708) coupled to a reserved personal mobility vehicle (e.g., the personal mobility vehicle 104a) to help navigate a requestor (e.g., the requestor 102) to the reserved personal mobility vehicle (e.g., the personal mobility vehicle 104a). The personal mobility vehicle computing device modules 902 may include personal mobility vehicle communication modules 920, a personal mobility vehicle application module 914, an orientation module 916, and an antenna control module 926. The personal mobility vehicle communication modules 920 may include a WiFi module 904, a Bluetooth module 906, a transceiver module 910, and a network communication module 812. The personal mobility vehicle 104a may include personal mobility vehicle peripheral devices 930 that may be coupled to (mounted on) the personal mobility vehicle 104a.

The WiFi module 904 maybe hardware, firmware, and/or software configured to implement WiFi communications between the personal mobility vehicle computing device 708 and other WiFi enabled devices. The WiFi module 904 may interface with the antenna control module 926 and with the antenna(s) 710.

The Bluetooth module 906 may be hardware, firmware, and/or software configured to implement Bluetooth communications between the personal mobility vehicle computing device 708 and other Bluetooth enabled devices. For example, the Bluetooth module 906 may configure the personal mobility vehicle computing device 708 to act as a beacon that may "listen" for broadcasts from other Bluetooth-enabled computing devices. In addition, or in the alternative, the Bluetooth module 906 may include one or more applications that enable Bluetooth communications between the personal mobility vehicle computing device 708 and other Bluetooth-enabled devices (e.g., the requestor computing device 108).

Referring to FIG. 8, when the requestor computing device 108 is within the short-range communication range of the personal mobility vehicle computing device 708, the personal mobility vehicle computing device 708 may receive a broadcast of an identifier (a wireless identifier) from the requestor computing device 108. Recognizing the broadcasted identifier, the personal mobility vehicle computing device 708 may initiate peer-to-peer communications between the requestor computing device 108 and the personal mobility vehicle computing device 708. In some implementations, referring to FIG. 5 and FIG. 7, when the requestor 102 enables (allows) direct communications between the requestor computing device 108 and the personal mobility vehicle computing device 708, the requestor computing device 108 may provide an identifier for the requestor computing device 108 to the dynamic transportation matching system 310 by way of the network 312. The dynamic transportation matching system 310 may provide the identifier to the personal mobility vehicle computing device 708 by way of the network 312.

In addition, or in the alternative, referring to FIG. 8, when the requestor computing device 108 is within the short-range communication range of the personal mobility vehicle computing device 708, the requestor computing device 108 may receive a broadcast of an identifier from the personal mobility vehicle computing device 708. Recognizing the broadcasted identifier, the requestor computing device 108 may initiate peer-to-peer communications between the requestor computing device 108 and the personal mobility vehicle computing device 708. For example, referring to FIG. 5 and FIG. 7, when the requestor 102 enables (allows) direct communications between the requestor computing device 108 and the personal mobility vehicle computing device 708, the personal mobility vehicle computing device 708 may provide an identifier for the personal mobility vehicle computing device 708 to the dynamic transportation matching system 310 by way of the network 312. The dynamic transportation matching system 310 may provide the identifier to the requestor computing device 108 by way of the network 312.

For example, when using Bluetooth communications, the Bluetooth module 806 and/or the Bluetooth module 906 may include hardware, software, and/or firmware for use in establishing a Bluetooth wireless connection between the requestor computing device 108 and the personal mobility vehicle computing device 708. In some implementations, the antenna(s) 710 may be additional antennas used to determine bearing and/or distance information of the personal mobility vehicle computing device 708 relative to the requestor computing device 108.

The transceiver module 910 may include hardware and/or software and may be configured to implement wireless communications between the personal mobility vehicle computing device 708 and other computing devices by wirelessly interfacing with or connecting to a cellular telecommunications network.

The network communication module 912 may be hardware, firmware, and/or software configured to implement wired and/or wireless communications between the personal mobility vehicle computing device 708 and other computing devices connected to or interfaced with a network. For example, referring to FIG. 3 and FIG. 7, the network communication module 912 may implement wired and/or wireless communications between the requestor computing device 108, the dynamic transportation matching system 310, and/or the requestor computing device 108 by way of the network 312

The antenna control module 926 may be hardware, firmware, and/or software configured to interface with and/or control the operation of the antenna(s) 710. For example, the antenna(s) 710 may be an array of antennas and the antenna control module 926 may provide the controls for the array of antennas for use as a phased array. The antenna control module 926 may electronically steer a beam of radio waves to point in multiple directions. For example, each antenna element in the array of antennas may include a transmitter/receiver unit controlled by the antenna control module 926. Each antenna element may continually transmit and receive signals. For example, based on the direction of signals transmitted by the personal mobility vehicle computing device 708 and received from the requestor computing device 108, an AoA of the requestor computing device 108 to the personal mobility vehicle computing device 708 may be determined (calculated).

The GPS module 908 may be hardware, firmware, and/or software configured to receive and use GPS coordinates to determine a location (e.g., latitude/longitude) of the personal mobility vehicle computing device 708.

The orientation module 916 may be hardware, firmware, and/or software configured to determine an orientation of the personal mobility vehicle computing device 708. One or more orientation device(s) 936 may be included in the personal mobility vehicle peripheral devices 930 and/or the personal mobility vehicle computing device 708. The orientation device(s) 936 may include one or more multi-axis gyroscopes, one or more accelerometers, and/or other devices that may be used to determine motion and/or orientation of the personal mobility vehicle computing device 708. The orientation module 916 may use information and data received from one or more of the one or more motion and/or orientation devices to determine an orientation of the personal mobility vehicle computing device 708.

In some implementations, a directional module 924 may be hardware, firmware, and/or software configured to determine (calculate) the AoA. Referring to FIG. 8, the personal mobility vehicle computing device 708 may provide the calculated AoA to the requestor computing device 108. The requestor computing device 108 (e.g., the requestor application module 814) may use the AoA value to provide more detailed directional information to the requestor 102 for display in the GUI.

The personal mobility vehicle application module 914 may be hardware, firmware, and/or software. The personal mobility vehicle computing device 708 may run (execute) one or more applications for use in controlling the personal mobility vehicle computing device 708 and, in some implementations, for use in controlling the personal mobility vehicle peripheral devices 930. The personal mobility vehicle application module 914 may interface with the WiFi module 904, the Bluetooth module 806, the transceiver module 810, the network communication module 812, the antenna control module 926, a distance module 822, the directional module 824, and the personal mobility vehicle peripheral devices 930.

The personal mobility vehicle computing device modules 902 may include a distance module 922 and the directional module 924. The distance module 922 may be hardware, firmware, and/or software configured to determine a distance between the personal mobility vehicle computing device 708 and the requestor computing device 108 by measuring a strength of a signal between the personal mobility vehicle computing device 708 and the requestor computing device 108. The distance module 822 may determine a value for a distance between the requestor computing device 108 and the personal mobility vehicle computing device 708 based on the measured signal strength. The personal mobility vehicle computing device 708 may provide the distance value to the requestor computing device 108 for use by the requestor application module 814 for display in the GUI.

The personal mobility vehicle peripheral devices 930 may include a location device 932, a directional device 934, and the orientation device(s) 936. For example, the directional device 934 may determine a current direction of travel (e.g., north, south, east, west, or any combination) based on a current orientation of the personal mobility vehicle 104a. The location device 932 may identify a current location of the personal mobility vehicle 104a in geolocation coordinates (e.g., latitude, longitude, global positioning system (GPS) coordinates).

Figure 10:
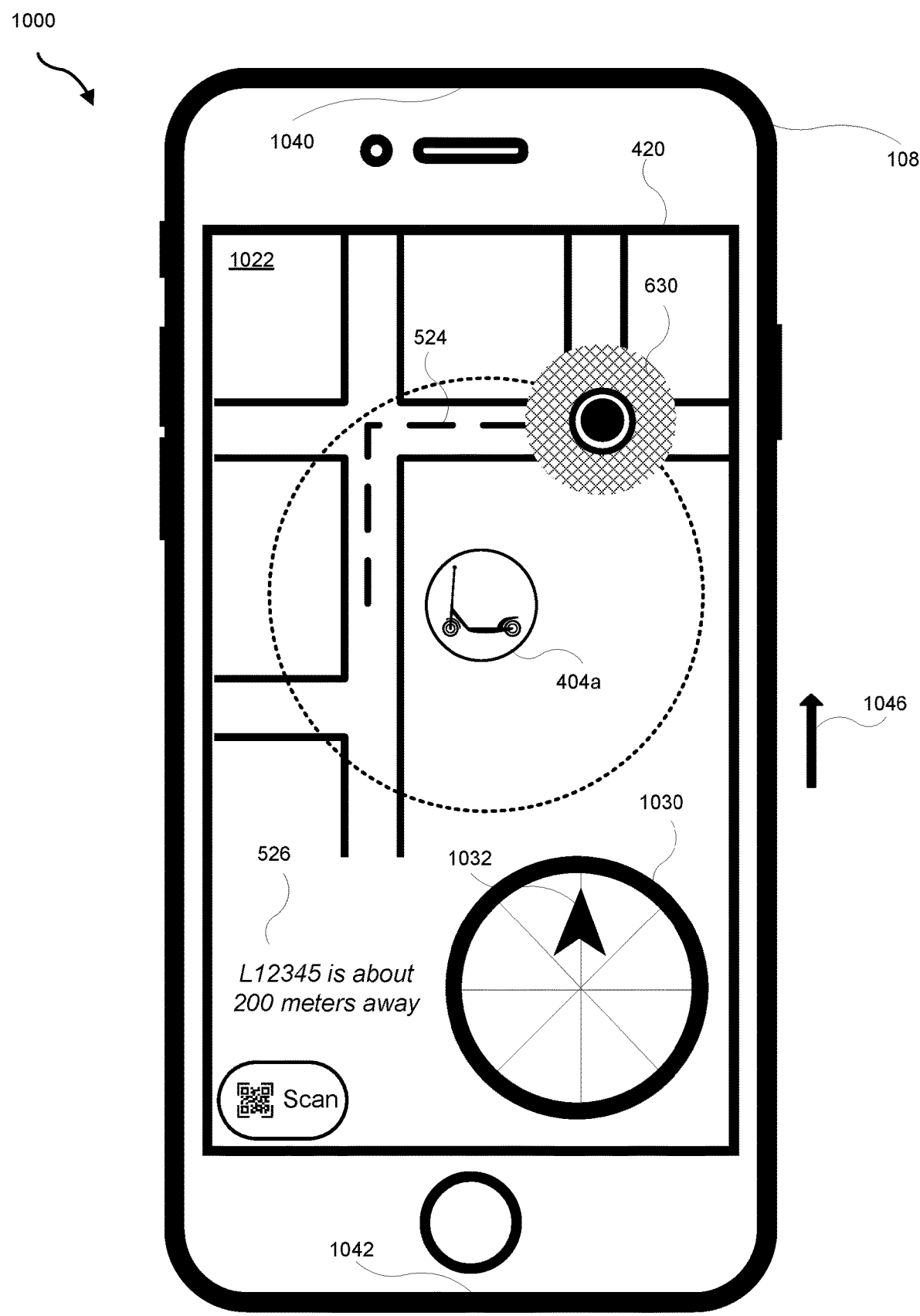
FIG. 10 is an illustration of a fourth example graphical user interface for a provider application executing on a requestor computing device as displayed on a display device of the requestor computing device.

FIG. 10 is an illustration of a fourth example graphical user interface (GUI) 1000 for a provider application executing on a requestor computing device (e.g., the requestor computing device 108) as displayed on a display device 420 of the requestor computing device (e.g., the requestor computing device 108). Referring to FIG. 6, the requestor computing device 108 is within short-range communication range of the personal mobility vehicle computing device 708 of the personal mobility vehicle 104a. As described herein, the requestor computing device 108 and the personal mobility vehicle computing device 708 may establish short-range communications. Based on the short-range communications, a travel distance between the requestor computing device 108 and the personal mobility vehicle computing device 708 may be determined and displayed in the information area 526 of the GUI 1000. The GUI 1000 may display a map 1022 that shows a relative location of the requestor computing device 108 (e.g., the location indicator 630), a relative location of the personal mobility vehicle 104a (e.g., personal mobility vehicle indicator 404a), and the route 524 of travel for the requestor 102 to reach the personal mobility vehicle 104a.

An orientation of the requestor computing device 108 may be determined as described herein. For example, a top 1040 of the requestor computing device 108 and a bottom 1042 of the requestor computing device 108 may be orientated in an orientation direction (as shown by arrow 1046) so that the requestor 102 may view the GUI 1000 as shown in FIG. 10 as the requestor 102 travels along the route 524 towards the personal mobility vehicle 104a. Using the orientation of the requestor computing device 108, the current location of the requestor computing device 108, and the direction of travel along the route 524 towards the personal mobility vehicle 104a, the user interface may display a directional indicator 1030 that may provide a visual indication of a direction of travel 1032 for use by the requestor 102. For example, the directional indicator 1030 may be a type of digital compass.

Figure 11:
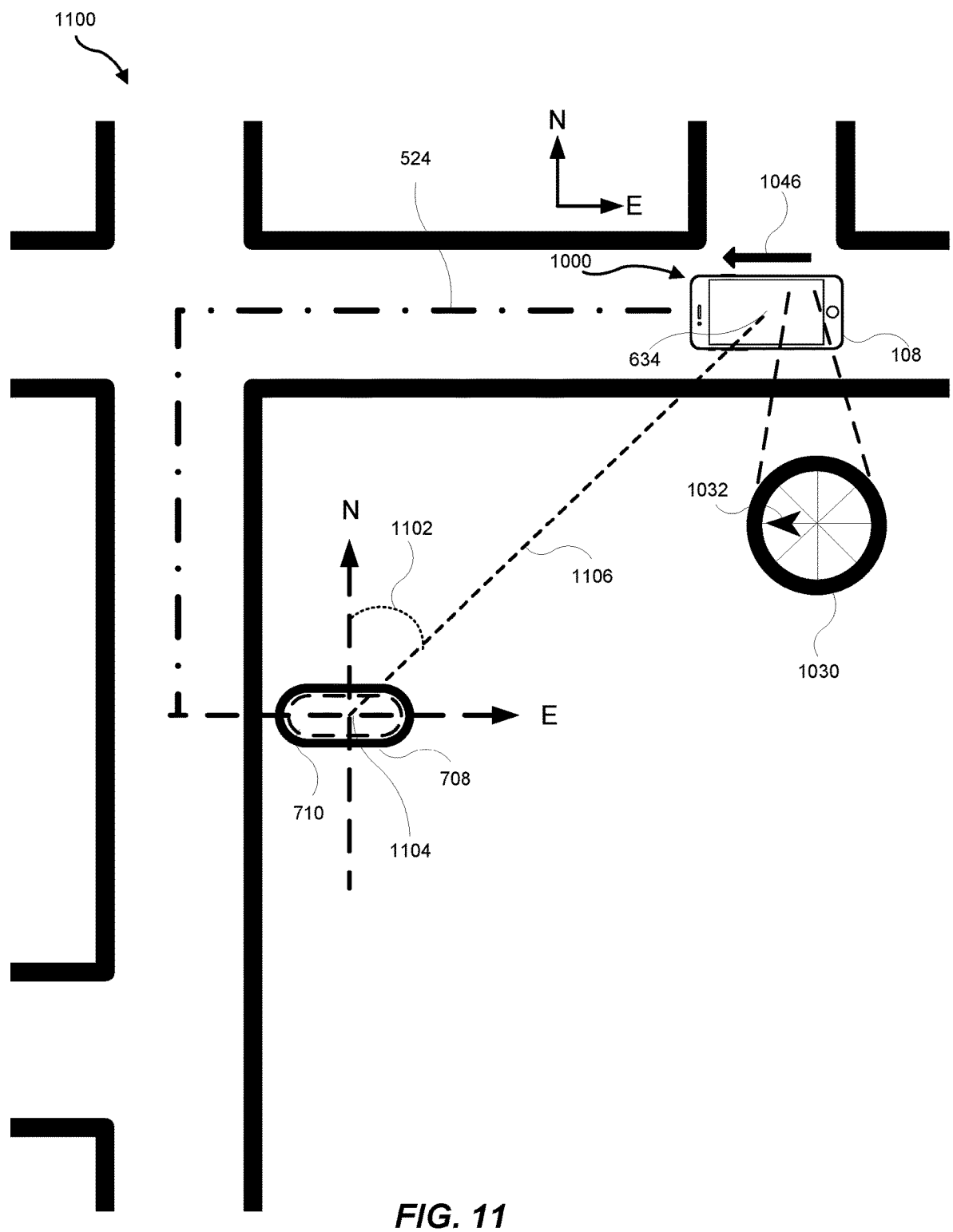
FIG. 11 is an illustration of a first map showing an angle of arrival of a requestor computing device to a personal mobility vehicle computing device.

FIG. 11 is an illustration of a first map 1100 showing an angle of arrival (AoA) 1102 of a requestor computing device (e.g., the requestor computing device 108) to a personal mobility vehicle computing device (e.g., the personal mobility vehicle computing device 708). Referring to FIG. 6 and FIG. 10, the map 1100 shows the requestor device 108 at the location 634 where the requestor computing device 108 may be initially discovered by the personal mobility vehicle computing device 708 because the requestor computing device 108 is within a short-range communication range of the personal mobility vehicle computing device 708.

As described with reference to FIG. 10, an orientation of the requestor computing device 108 may be determined. It may be assumed that in the example shown in FIG. 11, the requestor 102 is holding the requestor computing device 108 such that the requestor 102 may read the GUI 1000 on the display device 420 of the requestor computing device 108 while traveling (e.g., walking) in the direction shown by the arrow 1046. An orientation of the personal mobility vehicle computing device 708 may be determined.

For example, the requestor 102 is directed to travel in the direction as indicated by the direction of travel 1032 on the directional indicator 1030 based on the location of the requestor computing device 108 (location 634) and the location of the personal mobility vehicle 104a (location 1104). For example, each of the location 634 and the location 1104 may be associated with respective geolocation coordinates (e.g., latitude/longitude coordinates). The AoA 1102 may be determined (calculated) based on the orientation of the requestor computing device 108, the location 1104, and the location 634. Once the AoA 1102 is determined, the location for display of the direction of travel 1032 in the directional indicator 1030 may be determined.

In the example shown in FIG. 10 and FIG. 11, because the requestor 102 may continue to travel on the route 524 to reach the location 1104, the direction of travel 1032 on the directional indicator 1030 indicates that the requestor 102 continue travel along the route 524. In some implementations, in addition, or in the alternative, the determination to direct the requestor 102 to continue travel along the route 524 may be further based on a measured distance between the location 634 of the requestor computing device 108 and the location 1104 of the personal mobility vehicle computing device 708. For example, referring to FIG. 10, a measured distance (a measured direct distance along line 1106) may be 50 meters. The best way for the requestor 102, however, to travel closer and towards the location 1104 of the personal mobility vehicle 104a may be to continue to follow the route 524 until the requestor 102 is closer to the location 1104 of the personal mobility vehicle 104a. In addition, in some cases, the requestor 102 may not be able to travel along a direct route (e.g., along the line 1106) from the location 634 to the location 1104.

Referring also to FIG. 9, the antenna control module 926 may control the operations of the antenna(s) 710 when determining the AoA 1102. For example, the antenna control module 926 may control each of the elements included in the antenna(s) 710 to transmit signals to and/or receive signals from the requestor computing device 108. Based on one or more of a received signal strength and angle of arrival of a signal to a particular antenna element, one or more of the distance module 922, the directional module 924, and the orientation modules 916 may determine (calculate) the AoA 1102 as described herein.

Figure 12:
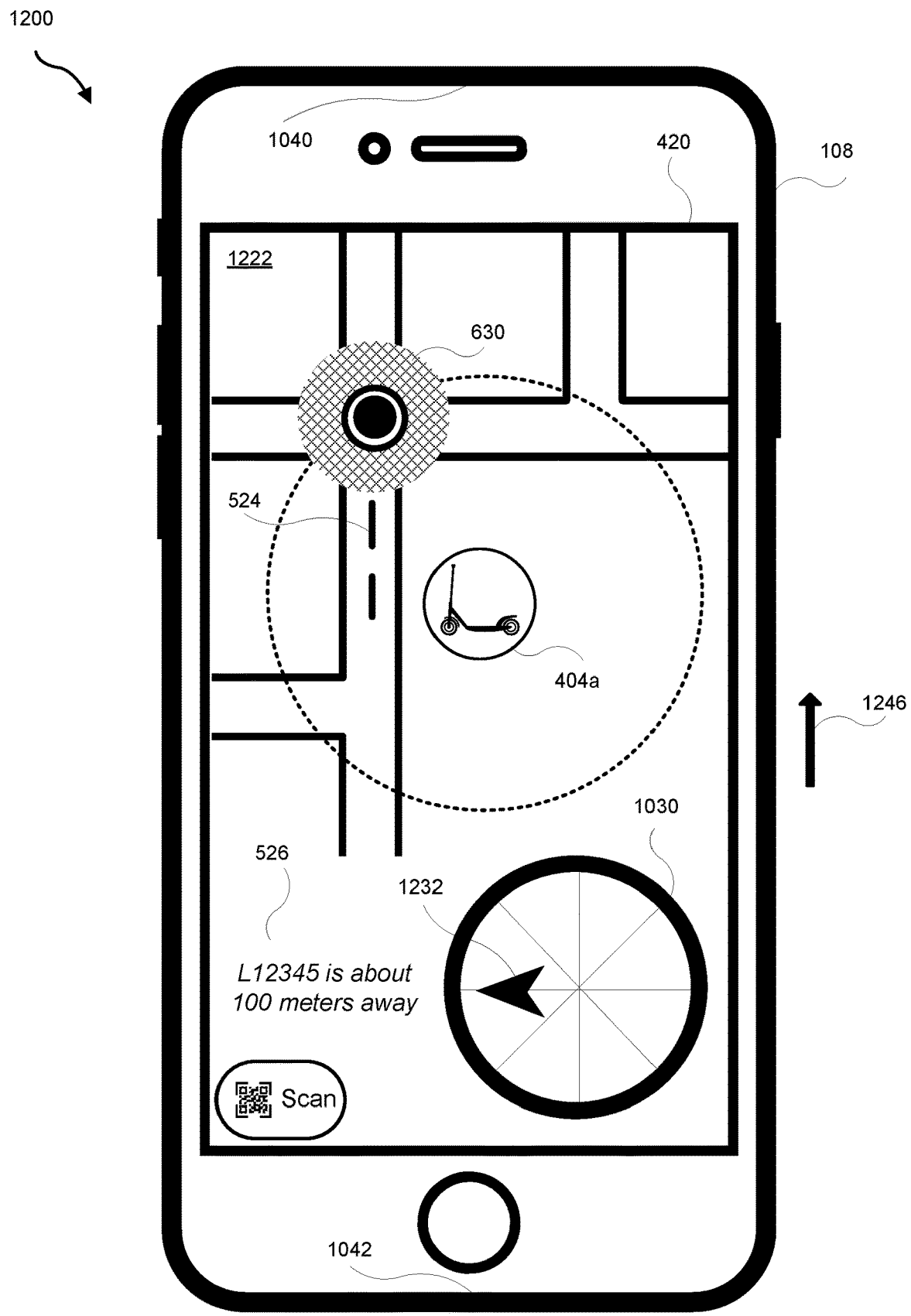
FIG. 12 is an illustration of a fifth example graphical user interface for a provider application executing on a requestor computing device as displayed on a display device of the requestor computing device.

FIG. 12 is an illustration of a fifth example graphical user interface (GUI) 1200 for a provider application executing on a requestor computing device (e.g., the requestor computing device 108) as displayed on a display device 420 of the requestor computing device (e.g., the requestor computing device 108). Referring to FIG. 6, the requestor computing device 108 continues to remain within short-range communication range of the personal mobility vehicle computing device 708 of the personal mobility vehicle 104a. Based on the short-range communications, a distance between the requestor computing device 108 and the personal mobility vehicle computing device 708 may be determined and displayed in the information area 526 of the GUI 1200. The GUI 1200 may display a map 1222 that shows a relative location of the requestor computing device 108 (e.g., the location indicator 630), a relative location of the personal mobility vehicle 104a (e.g., personal mobility vehicle indicator 404a), and the route 524 of travel for the requestor 102 to reach the personal mobility vehicle 104a.

An orientation of the requestor computing device 108 may be determined as described herein. For example, the top 1040 of the requestor computing device 108 and the bottom 1042 of the requestor computing device 108 may be orientated in an orientation direction (as shown by arrow 1246) so that the requestor 102 may view the GUI 1200 as shown in FIG. 12 as the requestor 102 travels along the route 524 towards the personal mobility vehicle 104a. Using the orientation of the requestor computing device 108, the current location of the requestor computing device 108, and the direction of travel along the route 524 towards the personal mobility vehicle 104a, the directional indicator 1030 may be updated to provide a visual indication of a direction of travel 1232 for use by the requestor 102.

Figure 13:
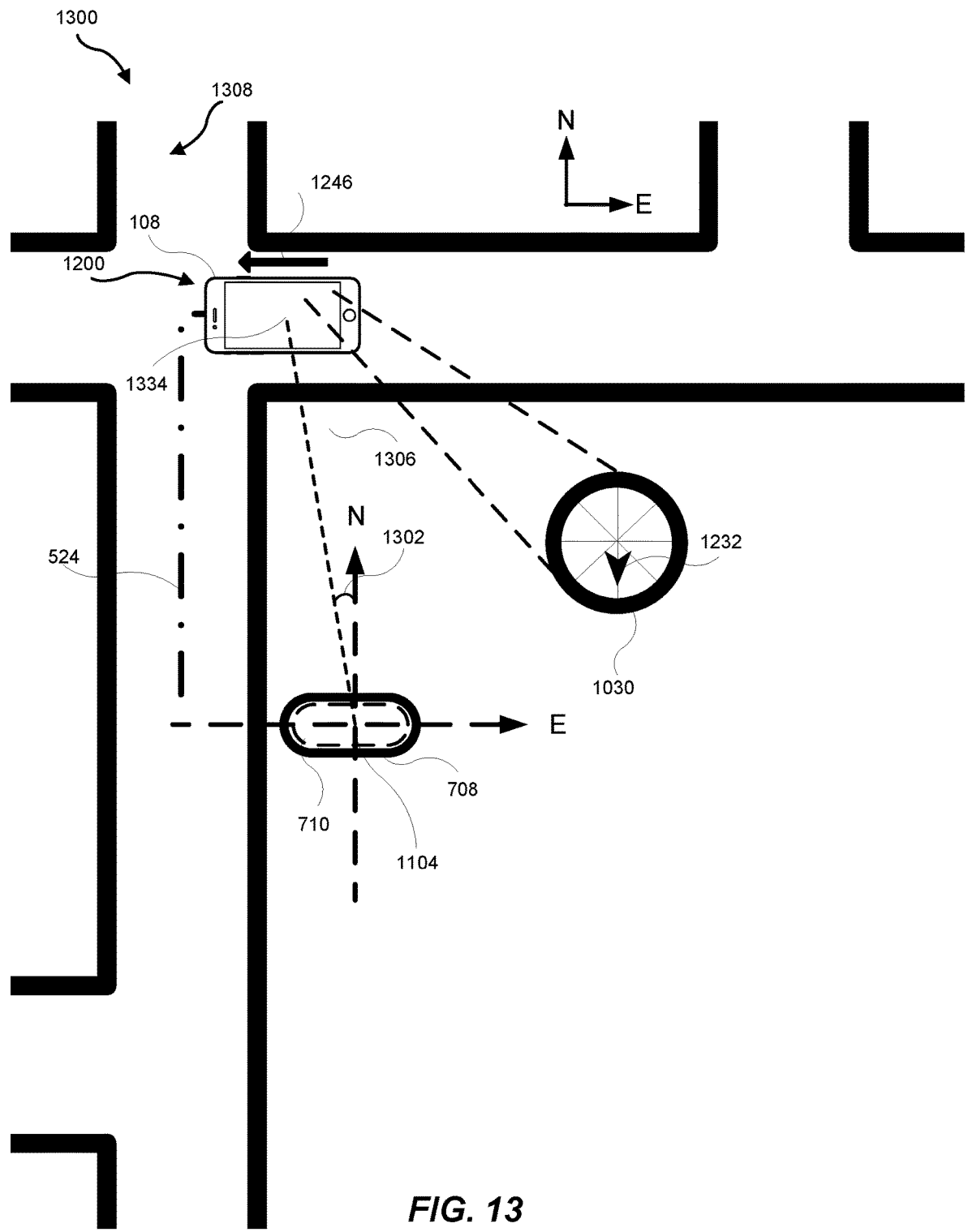
FIG. 13 is an illustration of a second map showing an angle of arrival of a requestor computing device to a personal mobility vehicle computing device.

FIG. 13 is an illustration of a second map 1300 showing an angle of arrival (AoA) 1302 of a requestor computing device (e.g., the requestor computing device 108) to a personal mobility vehicle computing device (e.g., the personal mobility vehicle computing device 708). Referring to FIG. 6 and FIG. 12, the map 1300 shows the requestor device 108 at a location 1334. As described with reference to FIG. 12, an orientation of the requestor computing device 108 may be determined. It may be assumed that in the example shown in FIG. 13, the requestor 102 is holding the requestor computing device 108 such that the requestor 102 may read the GUI 1200 on the display device 420 of the requestor computing device 108 while traveling (e.g., walking) in the direction shown by the arrow 1246.

For example, the requestor 102 is directed to continue to travel in the direction as indicated by the direction of travel 1232 on the directional indicator 1030 based on the location of the requestor computing device 108 (location 1334) and the location of the personal mobility vehicle 104a (location 1104). For example, each of the location 634 and the location 1104 may be associated with respective geolocation coordinates (e.g., latitude/longitude coordinates). The AoA 1102 may be determined (calculated) based on the orientation of the requestor computing device 108, the location 1104, and the location 1334. Once the AoA 1102 is determined, the location for display of the direction of travel 1232 in the directional indicator 1030 may be determined.

Referring also to FIG. 9, the antenna control module 926 may control the operations of the antenna(s) 710 when determining the AoA 1302. For example, the antenna control module 926 may control each of the elements included in the antenna(s) 710 to transmit signals to and/or receive signals from the requestor computing device 108. Based on one or more of a received signal strength and angle of arrival of a signal to a particular antenna element, one or more of the distance module 922, the directional module 924, and the orientation modules 916 may determine (calculate) the AoA 1302 as described herein.

In the example shown in FIG. 12 and FIG. 13, the requestor 102 is directed to turn left at intersection 1308. In some implementations, in addition, or in the alternative, the determination to direct the requestor 102 to continue travel along the route 524 may be further based on a measured distance between the location 1334 of the requestor computing device 108 and the location 1104 of the personal mobility vehicle computing device 708. For example, referring to FIG. 12, a measured distance (a measured direct distance along line 1306) may be 25 meters. The best way for the requestor 102, however, to travel closer and towards the location 1104 of the personal mobility vehicle 104a may be to continue to follow the route 524 and to turn left at the intersection 1308. In addition, in some cases, the requestor 102 may not be able to travel along a direct route (e.g., along the line 1306) from the location 1334 to the location 1104.

Figure 14:
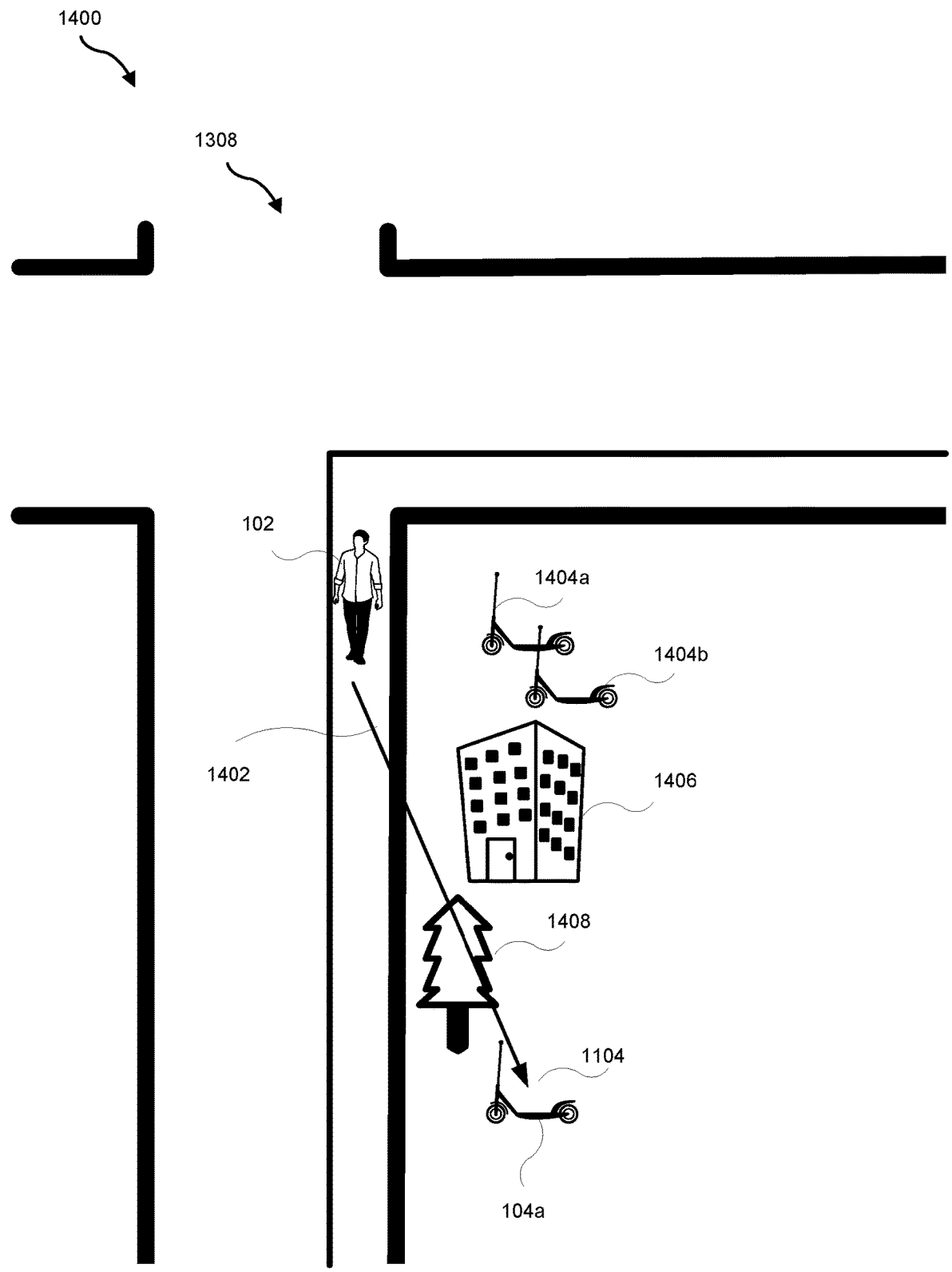
FIG. 14 is an illustration of a first detailed map showing a requestor traveling towards a reserved personal mobility vehicle.

FIG. 14 is an illustration of a first detailed map 1400 showing the requestor 102 traveling towards the reserved personal mobility vehicle 104a after turning left at the intersection 1308. Arrow 1402 shows a direct line of sight of the personal mobility vehicle 104a from the requestor 102. As shown in FIG. 14, however, as the requestor 102 approaches the location 1104 of the personal mobility vehicle 104a, the requestor 102 may not be able to see the personal mobility vehicle 104a. For example, though personal mobility vehicles 1404a-b may be visible to the requestor 102 neither were reserved by the requestor 102. In addition, building(s) or other structures (e.g., building 1406) and/or other objects (e.g., tree 1408) may obstruct a view of the personal mobility vehicle 104a. In some implementations, a GUI on the display device 420 of the requestor computing device 108 may not be able to show the finer details of the environment proximate to the personal mobility vehicle 104a to aid the requestor 102 in finding the personal mobility vehicle 104a.

Figure 15:
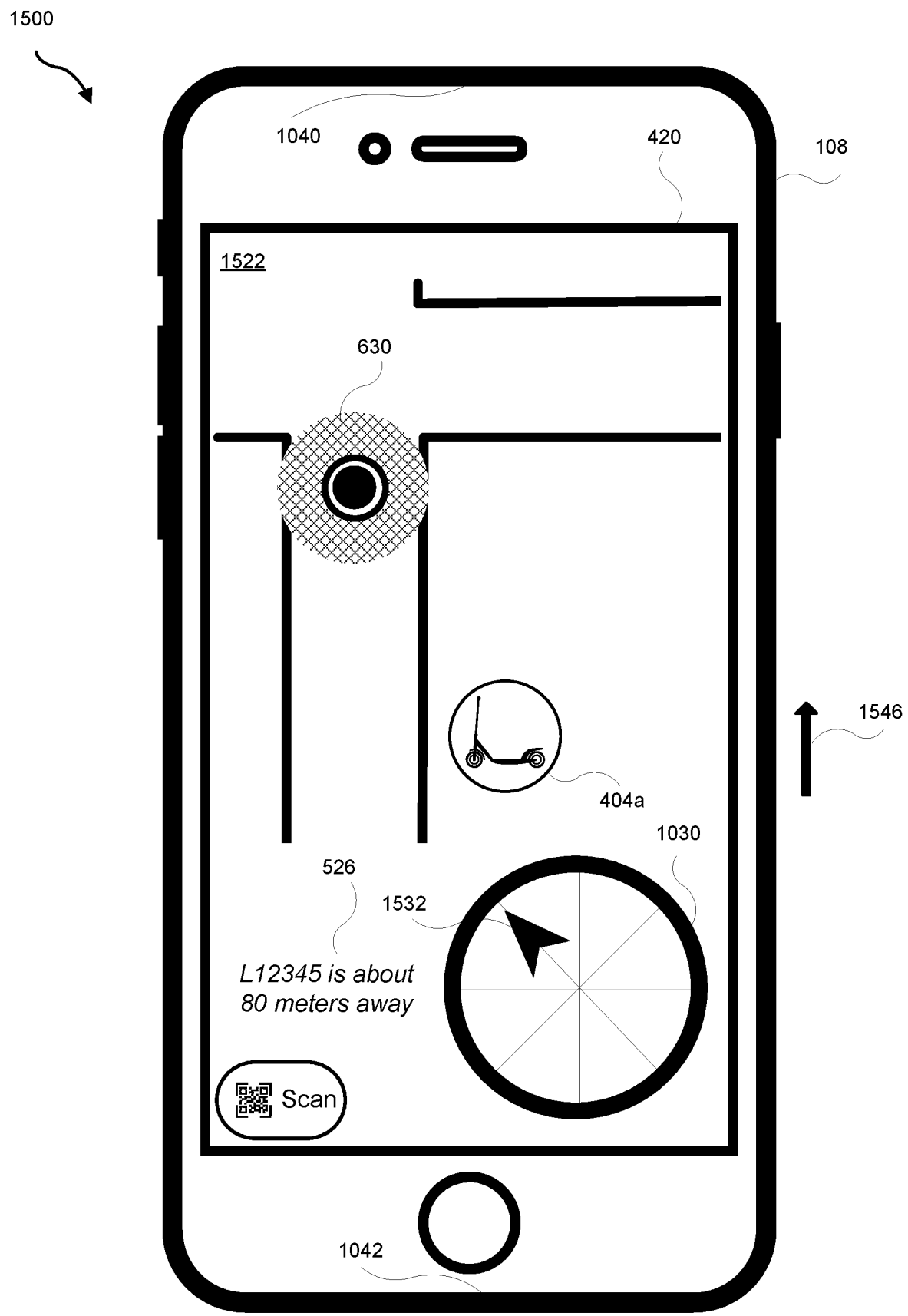
FIG. 15 is an illustration of a sixth example graphical user interface for a provider application executing on a requestor computing device as displayed on a display device of the requestor computing device.

FIG. 15 is an illustration of a sixth example graphical user interface (GUI) 1500 for a provider application executing on a requestor computing device (e.g., the requestor computing device 108) as displayed on a display device 420 of the requestor computing device (e.g., the requestor computing device 108). Referring to FIG. 6, the requestor computing device 108 continues to remain within short-range communication range of the personal mobility vehicle computing device 708 of the personal mobility vehicle 104*a*. Based on the short-range communications, a distance between the requestor computing device 108 and the personal mobility vehicle computing device 708 may be determined and displayed in the information area 526 of the GUI 1500. The GUI 1500 may display a map 1522 that shows a relative location of the requestor computing device 108 (e.g., the location indicator 630) and a relative location of the personal mobility vehicle 104*a* (e.g., personal mobility vehicle indicator 404*a*.

Referring to FIG. 14, the GUI 1500 may show the personal mobility vehicle indicator 404*a*. In some cases, the GUI 1500 may be able to show some level of detail of the surrounding area near the location 1104 of the personal mobility vehicle 104*a*. The GUI 1500, however, may not be able to show a sufficient level of detail (e.g., as shown by the first detailed map 1400) at a close distance (e.g., twenty-five or less meters) combined with directional information to help the requestor 102 pinpoint the location 1104 of the personal mobility vehicle 104*a*.

An orientation of the requestor computing device 108 may be determined as described herein. For example, the top 1040 of the requestor computing device 108 and the bottom 1042 of the requestor computing device 108 may be orientated in an orientation direction (as shown by arrow 1546) so that the requestor 102 may view the GUI 1500 as shown in FIG. 15 as the requestor 102 travels toward the personal mobility vehicle 104*a*. Using the orientation of the requestor computing device 108, the current location of the requestor computing device 108, and the direction of travel towards the personal mobility vehicle 104*a*, the directional indicator 1030 may be updated to provide a visual indication of a direction of travel 1532 for use by the requestor 102.

At this point in the travel of the requestor 102 to the personal mobility vehicle 104*a*, the use of geolocation coordinates may not provide enough detail to allow the requestor 102 to pinpoint the location of the personal mobility vehicle 104*a*. In addition, or in the alternative, the personal mobility vehicle 104*a* may not be visible to the requestor 102 as the requestor 102 approaches the location of the personal mobility vehicle 104*a*. Therefore, as described herein and with more detail with reference to FIG. 16, in order to guide the requestor 102 to the exact location of the personal mobility vehicle 104*a*, an AoA of the requestor computing device 108 to the personal mobility vehicle computing device 708 may be calculated and used along with a calculated distance between the requestor computing device 108 and the personal mobility vehicle computing device 708 to determine a finer and more precise location of the personal mobility vehicle 104*a* (and the personal mobility vehicle computing device 708) relative to the requestor 102 (and the requestor computing device 108). In addition, an orientation of the requestor computing device 108 may be considered in order to provide a visual indication of a direction of travel to the personal mobility vehicle 104*a* for display on the display device 420 of the requestor computing device 108 for use by the requestor 102.

Figure 16:
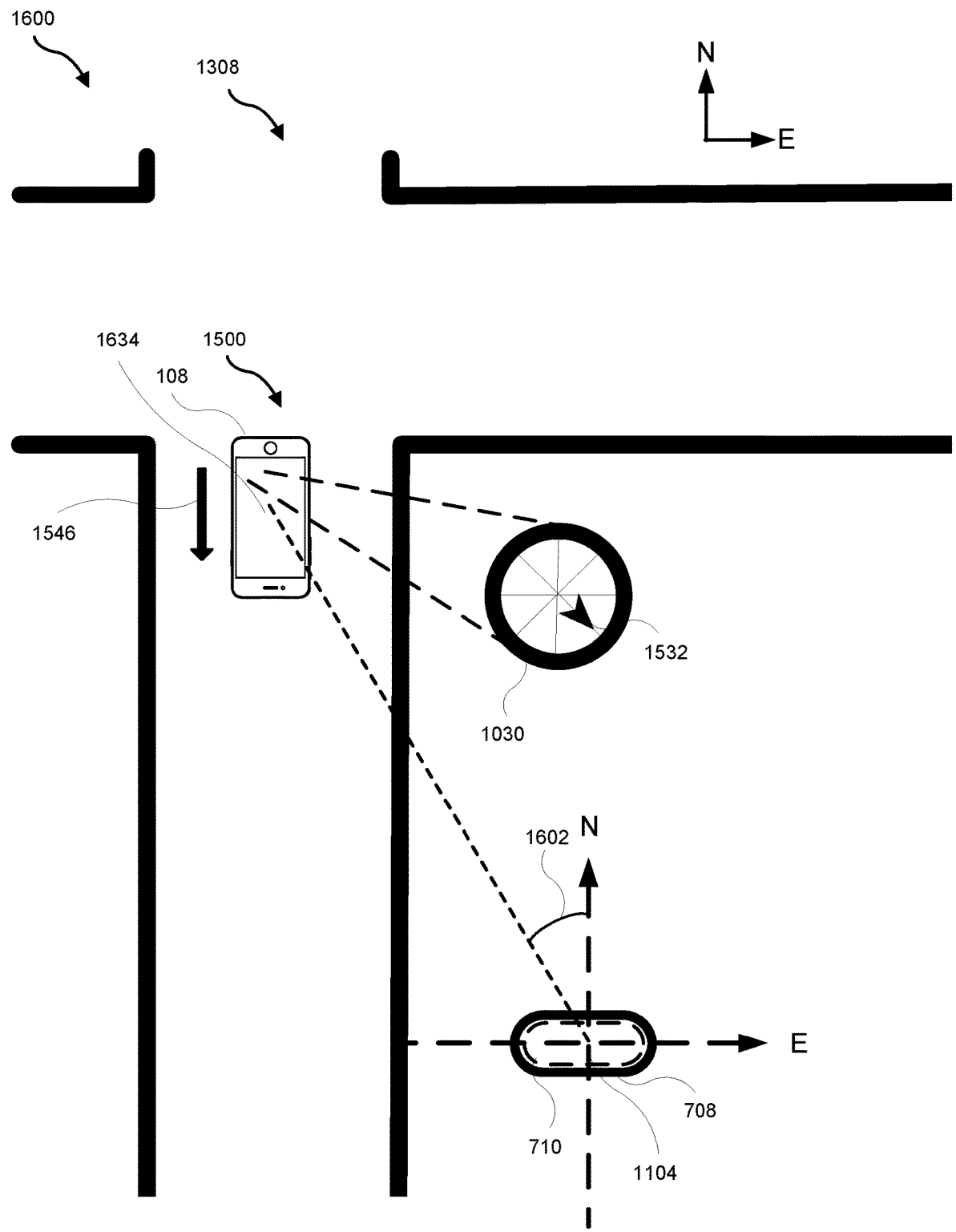
FIG. 16 is an illustration of a third map showing an angle of arrival of a requestor computing device to a personal mobility vehicle computing device.

FIG. 16 is an illustration of a third map 1600 showing an angle of arrival (AoA) 1602 of a requestor computing device (e.g., the requestor computing device 108) to a personal mobility vehicle computing device (e.g., the personal mobility vehicle computing device 708). Referring to FIG. 6 and FIG. 15, the map 1600 shows the requestor device 108 at a location 1634. As described with reference to FIG. 15, an orientation of the requestor computing device 108 may be determined. It may be assumed that in the example shown in FIG. 15, the requestor 102 is holding the requestor computing device 108 such that the requestor 102 may read the GUI 1500 on the display device 420 of the requestor computing device 108 while traveling (e.g., walking) in the direction shown by the arrow 1546.

For example, the requestor 102 is directed to travel in the direction as indicated by the direction of travel 1532 on the directional indicator 1030 based on the location of the requestor computing device 108 (location 1634) and the location of the personal mobility vehicle 104*a* (location 1104). To determine the direction of travel 1532 on the directional indicator 1030, an AoA 1602 may be determined (calculated) based on the orientation of the requestor computing device 108, an orientation of the personal mobility vehicle computing device 708, the location 1104, and the location 1634. Once the AoA 1602 is determined, the location for display of the direction of travel 1232 in the directional indicator 1030 may be determined.

Referring also to FIG. 9, the antenna control module 926 may control the operations of the antenna(s) 710 when determining the AoA 1602. For example, the antenna control module 926 may control each of the elements included in the antenna(s) 710 to transmit signals to and/or receive signals from the requestor computing device 108. Based on one or more of a received signal strength and angle of arrival of a signal to a particular antenna element, one or more of the distance module 922, the directional module 924, and the orientation modules 916 may determine (calculate) the AoA 1602 as described herein.

In the example shown in FIG. 15 and FIG. 16, the requestor 102 is directed towards the location 1104 of the personal mobility vehicle 104*a*. In some situations, the requestor 102 may not be able to see the personal mobility vehicle 104*a*. Therefore, the direction of travel 1232 in the directional indicator 1030 may guide the requestor 102 in the right direction. The directional indicator 1030 may be updated in real-time as the requestor 102 travels towards the personal mobility vehicle 104*a* providing real-time directions to the personal mobility vehicle 104*a*.

Figure 17:
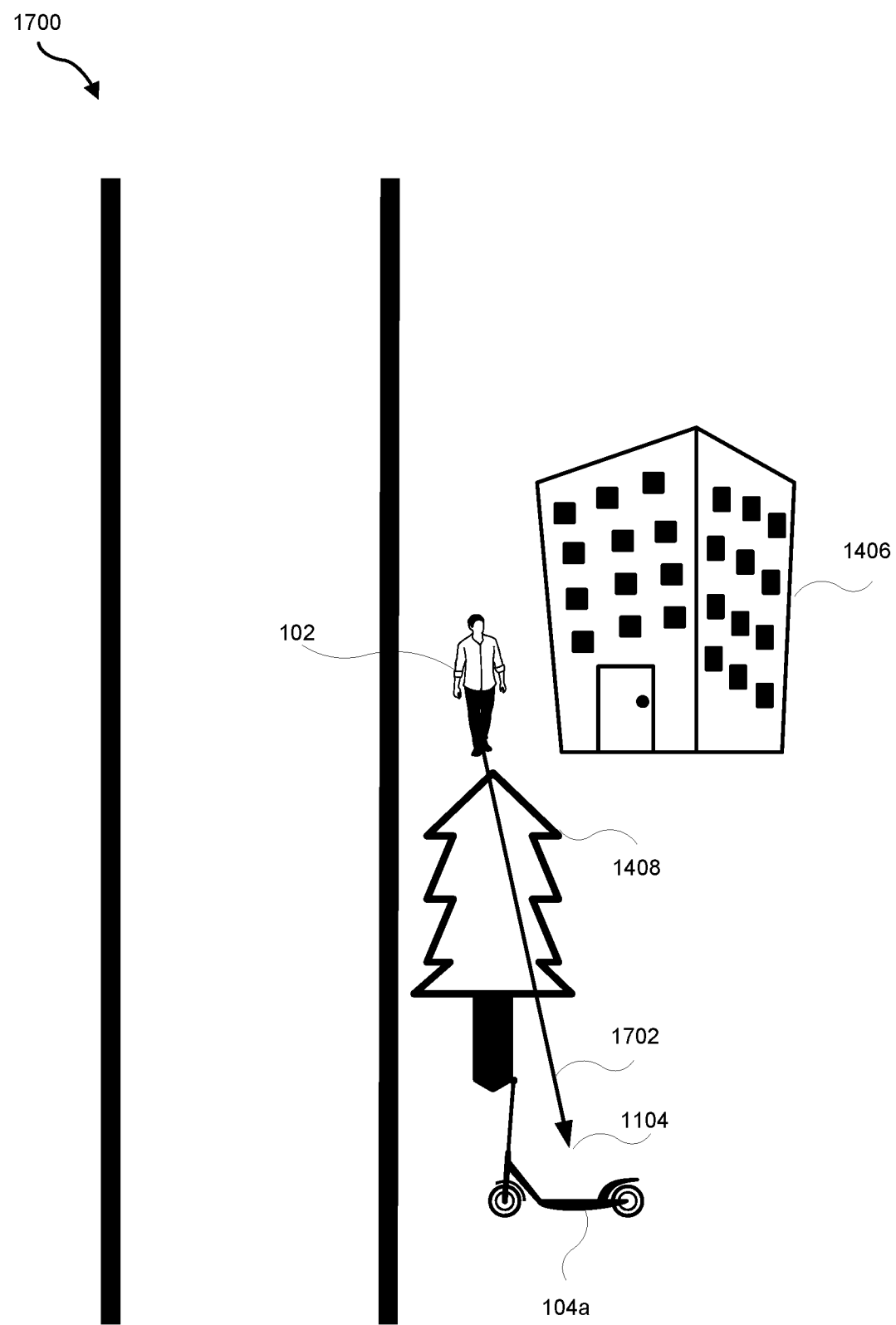
FIG. 17 is an illustration of a second detailed map showing a requestor traveling towards a reserved personal mobility vehicle.
Figure 18:
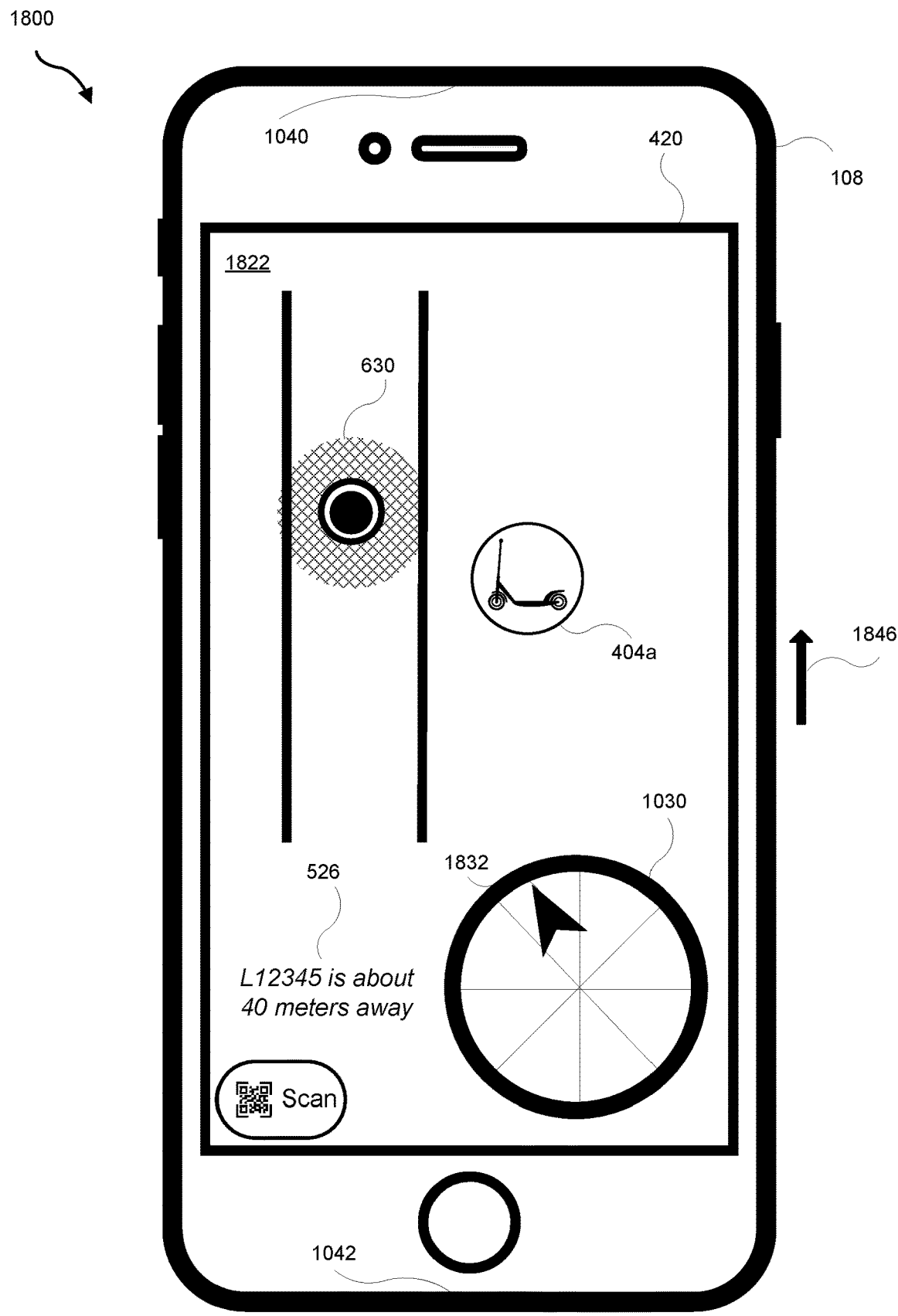
FIG. 18 is an illustration of a seventh example graphical user interface for a provider application executing on a requestor computing device as displayed on a display device of the requestor computing device.

FIG. 17 is an illustration of a second detailed map 1700 showing the requestor 102 traveling towards the reserved personal mobility vehicle 104*a* following the direction of travel 1232 in the directional indicator 1030 as shown in FIG. 12. The requestor 102 has followed the direction of travel 1232 and is standing by the building 1406. Arrow 1702 shows a direct line of sight of the personal mobility vehicle 104*a* from the requestor 102. As shown in FIG. 17, however, the requestor 102 may still be unable to see the personal mobility vehicle 104*a*. Referring to FIG. 18, the GUI 1800 may show the personal mobility vehicle indicator 404*a*, however, without any additional detail the requestor 102 may not be able to locate the personal mobility vehicle 104*a*.

FIG. 18 is an illustration of a seventh example graphical user interface (GUI) 1800 for a provider application executing on a requestor computing device (e.g., the requestor computing device 108) as displayed on a display device 420 of the requestor computing device (e.g., the requestor computing device 108). Referring to FIG. 6, the requestor computing device 108 continues to remain within short-range communication range of the personal mobility vehicle computing device 708 of the personal mobility vehicle 104*a*. Based on the short-range communications, a distance between the requestor computing device 108 and the personal mobility vehicle computing device 708 may be determined and displayed in the information area 526 of the GUI 1800. The GUI 1800 may display a map 1822 that shows a relative location of the requestor computing device 108

(e.g., the location indicator 630) and a relative location of the personal mobility vehicle 104a (e.g., personal mobility vehicle indicator 404a).

Referring to FIG. 17, the GUI 1800 may show the personal mobility vehicle indicator 404a. In some cases, the GUI 1800 may be able to show some level of detail of the surrounding area near the location 1104 of the personal mobility vehicle 104a. The GUI 1800, however, may not be able to show a sufficient level of detail (e.g., as shown by the second detailed map 1700) combined with directional information to help the requestor 102 pinpoint the location 1104 of the personal mobility vehicle 104a.

An orientation of the requestor computing device 108 may be determined as described herein. For example, the top 1040 of the requestor computing device 108 and the bottom 1042 of the requestor computing device 108 may be orientated in an orientation direction (as shown by arrow 1846) so that the requestor 102 may view the GUI 1800 as shown in FIG. 18 as the requestor 102 travels toward the personal mobility vehicle 104a. Using the orientation of the requestor computing device 108, the current location of the requestor computing device 108, and the direction of travel towards the personal mobility vehicle 104a, the directional indicator 1030 may be updated to provide a visual indication of a direction of travel 1832 for use by the requestor 102.

At this point in the travel of the requestor 102 to the personal mobility vehicle 104a, the use of geolocation coordinates may not provide enough detail to allow the requestor 102 to pinpoint the location of the personal mobility vehicle 104a. In addition, or in the alternative, the personal mobility vehicle 104a may not be visible to the requestor 102 as the requestor 102 approaches the location of the personal mobility vehicle 104a. Therefore, as described herein and with more detail with reference to FIG. 19, in order to guide the requestor 102 to the exact location of the personal mobility vehicle 104a, an AoA of the requestor computing device 108 to the personal mobility vehicle computing device 708 may be calculated and used along with a calculated distance between the requestor computing device 108 and the personal mobility vehicle computing device 708 to determine a finer and more precise location of the personal mobility vehicle 104a (and the personal mobility vehicle computing device 708) relative to the requestor 102 (and the requestor computing device 108). In addition, an orientation of the requestor computing device 108 may be considered in order to provide a visual indication of a direction of travel to the personal mobility vehicle 104a for display on the display device 420 of the requestor computing device 108 for use by the requestor 102.

Figure 19:
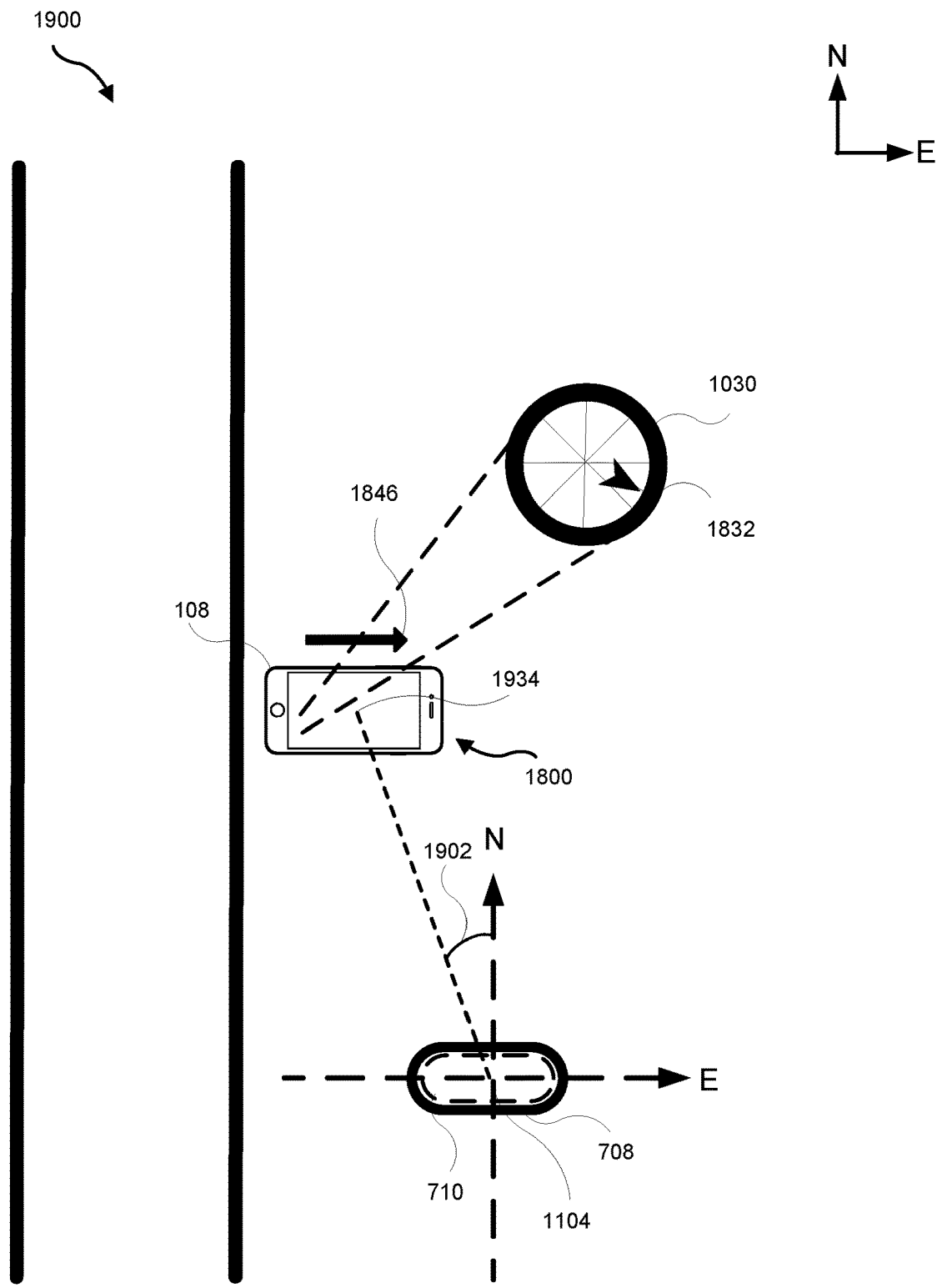
FIG. 19 is an illustration of a fourth map showing an angle of arrival of a requestor computing device to a personal mobility vehicle computing device.

FIG. 19 is an illustration of a fourth map 1900 showing an angle of arrival (AoA) 1902 of a requestor computing device (e.g., the requestor computing device 108) to a personal mobility vehicle computing device (e.g., the personal mobility vehicle computing device 708). Referring to FIG. 6 and FIG. 18, the map 1900 shows the requestor device 108 at a location 1934. As described with reference to FIG. 18, an orientation of the requestor computing device 108 may be determined. It may be assumed that in the example shown in FIG. 18 and referring to FIG. 17, the requestor 102 is holding the requestor computing device 108 such that the requestor 102 may read the GUI 1800 on the display device 420 of the requestor computing device 108 while standing in front of and facing the building 1406.

For example, the requestor 102 is directed to travel in the direction as indicated by the direction of travel 1832 on the directional indicator 1030 based on the location of the requestor computing device 108 (location 1934) and the location of the personal mobility vehicle 104a (location 1104). In order to determine the direction of travel 1832 on the directional indicator 1030, an AoA 1902 may be determined (calculated) based on the orientation of the requestor computing device 108, an orientation of the personal mobility vehicle computing device 708, the location 1104, and the location 1934. Once the AoA 1902 is determined, the location for display of the direction of travel 1832 in the directional indicator 1030 may be determined.

Referring also to FIG. 9, the antenna control module 926 may control the operations of the antenna(s) 710 when determining the AoA 1902. For example, the antenna control module 926 may control each of the elements included in the antenna(s) 710 to transmit signals to and/or receive signals from the requestor computing device 108. Based on one or more of a received signal strength and angle of arrival of a signal to a particular antenna element, one or more of the distance module 922, the directional module 924, and the orientation modules 916 may determine (calculate) the AoA 1902 as described herein.

In the example shown in FIG. 18 and FIG. 19, the requestor 102 is directed towards the location 1104 of the personal mobility vehicle 104a. In some situations, the requestor 102 may not be able to see the personal mobility vehicle 104a. Therefore, the direction of travel 1832 in the directional indicator 1030 may guide the requestor 102 in the right direction. The directional indicator 1030 may be updated in real-time as the requestor 102 travels towards the personal mobility vehicle 104a providing real-time directions to the personal mobility vehicle 104a.

Figure 20:
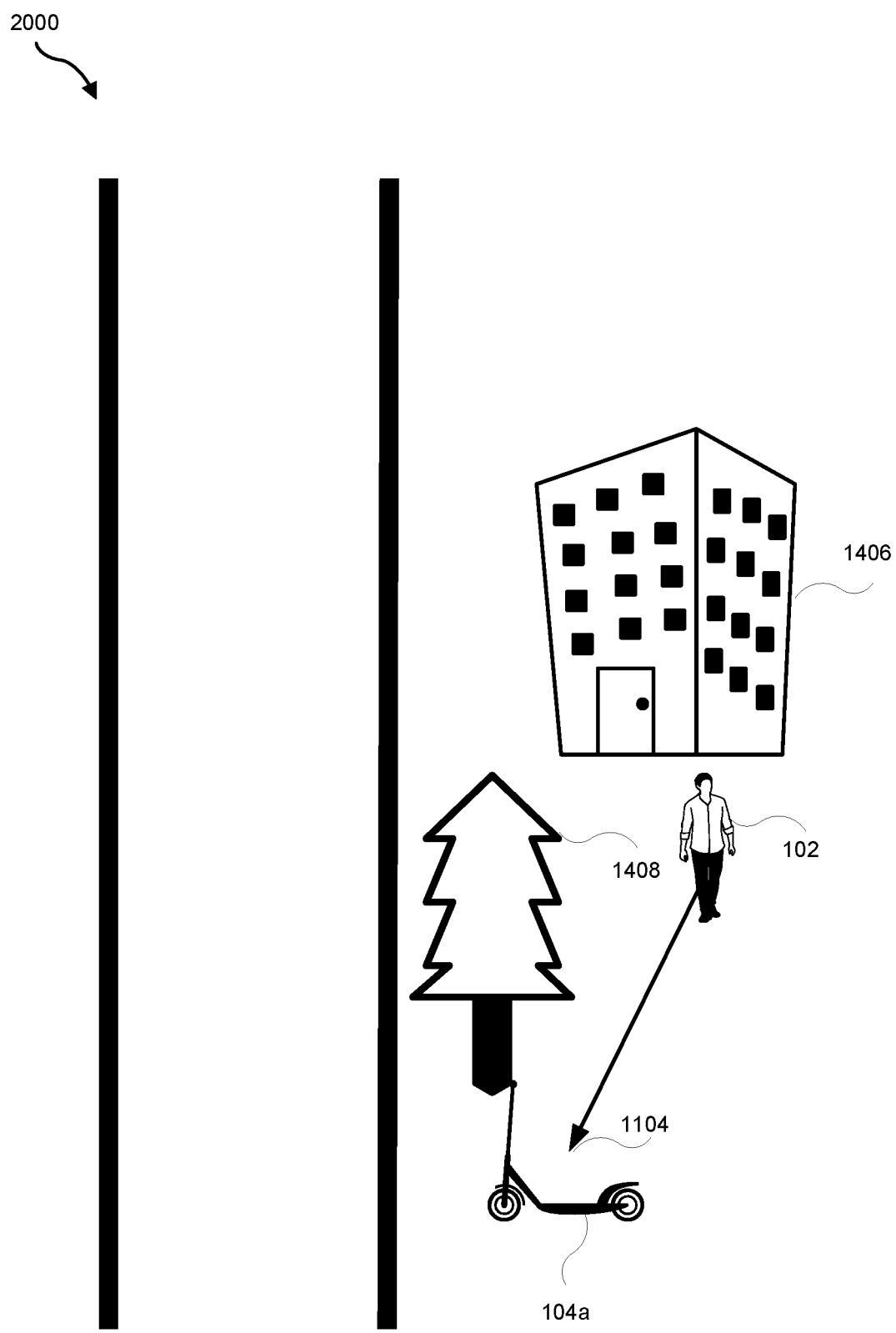
FIG. 20 is an illustration of a third detailed map showing a requestor traveling towards a reserved personal mobility vehicle.

FIG. 20 is an illustration of a third detailed map 2000 showing the requestor 102 traveling towards the reserved personal mobility vehicle 104a following the direction of travel 1232 in the directional indicator 1030 as shown in FIG. 12. The requestor 102 has followed the direction of travel 1232 and is standing by the building 1406. Arrow 1702 shows a direct line of sight of the personal mobility vehicle 104a from the requestor 102. As shown in FIG. 17, however, the requestor 102 may still be unable to see the personal mobility vehicle 104a. Referring to FIG. 18, the GUI 1800 may show the personal mobility vehicle indicator 404a, however, without any additional detail the requestor 102 may not be able to locate the personal mobility vehicle 104a.

Figure 21:
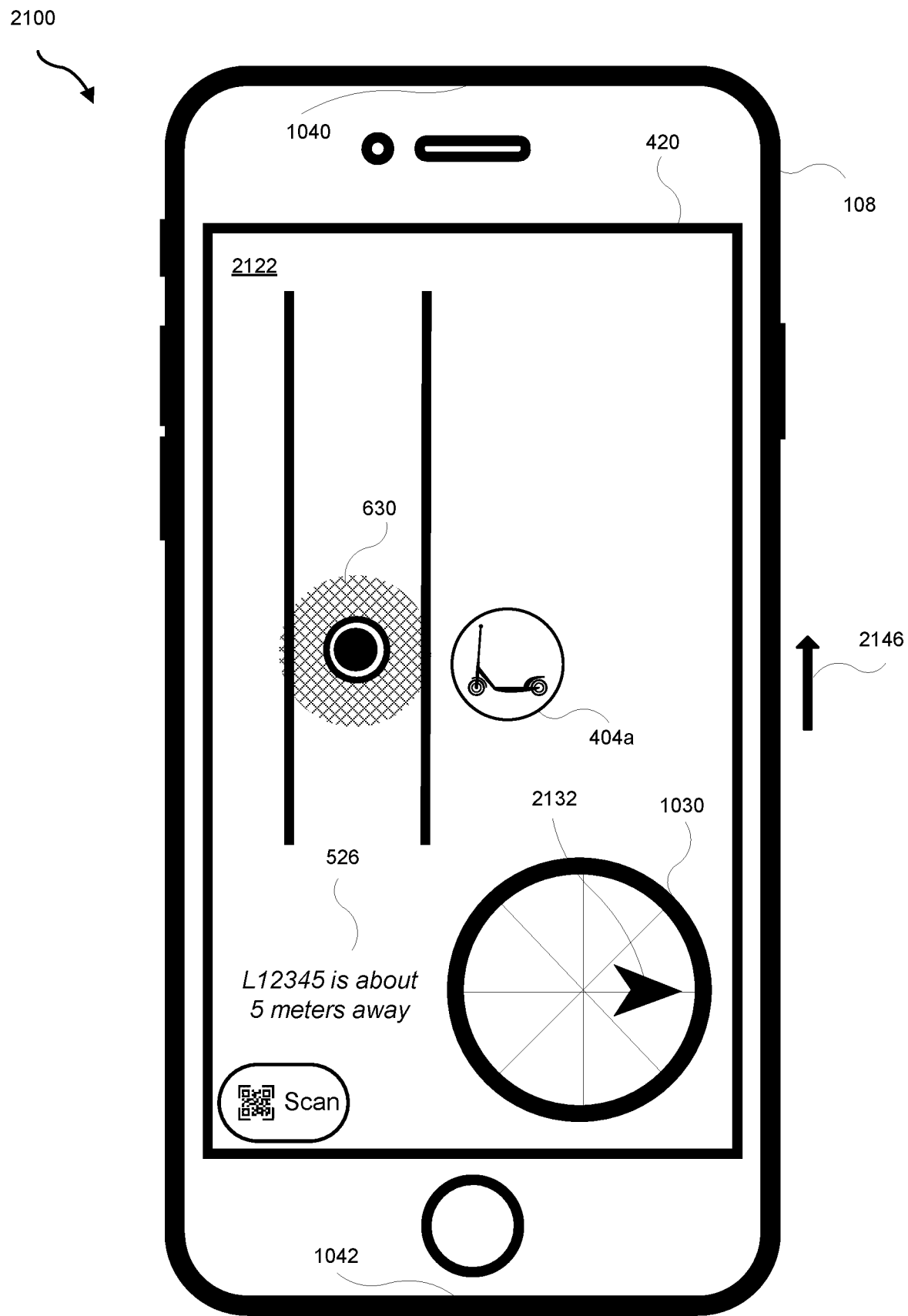
FIG. 21 is an illustration of an eighth example graphical user interface for a provider application executing on a requestor computing device as displayed on a display device of the requestor computing device.

FIG. 21 is an illustration of an eighth example graphical user interface (GUI) 2100 for a provider application executing on a requestor computing device (e.g., the requestor computing device 108) as displayed on a display device 420 of the requestor computing device (e.g., the requestor computing device 108). Referring to FIG. 6, the requestor computing device 108 continues to remain within short-range communication range of the personal mobility vehicle computing device 708 of the personal mobility vehicle 104a. Based on the short-range communications, a distance between the requestor computing device 108 and the personal mobility vehicle computing device 708 may be determined and displayed in the information area 526 of the GUI 2100. The GUI 2100 may display a map 2122 that shows a relative location of the requestor computing device 108 (e.g., the location indicator 630) and a relative location of the personal mobility vehicle 104a (e.g., personal mobility vehicle indicator 404a).

Referring to FIG. 20, the GUI 2100 may show the personal mobility vehicle indicator 404a. In some cases, the GUI 2100 may be able to show some level of detail of the surrounding area near the location 1104 of the personal mobility vehicle 104a. The GUI 2100, however, may not be able to show a sufficient level of detail (e.g., as shown by the third detailed map 2000) combined with directional information to help the requestor 102 pinpoint the location 1104 of the personal mobility vehicle 104*a*.

An orientation of the requestor computing device 108 may be determined as described herein. For example, the top 1040 of the requestor computing device 108 and the bottom 1042 of the requestor computing device 108 may be orientated in an orientation direction (as shown by arrow 2146) so that the requestor 102 may view the GUI 2100 as shown in FIG. 21 as the requestor 102 travels toward the personal mobility vehicle 104*a*. Using the orientation of the requestor computing device 108, the current location of the requestor computing device 108, and the direction of travel towards the personal mobility vehicle 104*a*, the directional indicator 1030 may be updated to provide a visual indication of a direction of travel 2132 for use by the requestor 102.

At this point in the travel of the requestor 102 to the personal mobility vehicle 104*a*, the use of geolocation coordinates may not provide enough detail to allow the requestor 102 to pinpoint the location of the personal mobility vehicle 104*a*. In addition, or in the alternative, though the personal mobility vehicle 104*a* may be visible to the requestor 102, as described herein and with more detail with reference to FIG. 22, in order to guide the requestor 102 to the exact location of the personal mobility vehicle 104*a*, an AoA of the requestor computing device 108 to the personal mobility vehicle computing device 708 may be calculated and used along with a calculated distance between the requestor computing device 108 and the personal mobility vehicle computing device 708 to determine a finer and more precise location of the personal mobility vehicle 104*a* (and the personal mobility vehicle computing device 708) relative to the requestor 102 (and the requestor computing device 108). In addition, an orientation of the requestor computing device 108 may be considered in order to provide a visual indication of a direction of travel to the personal mobility vehicle 104*a* for display on the display device 420 of the requestor computing device 108 for use by the requestor 102.

Figure 22:
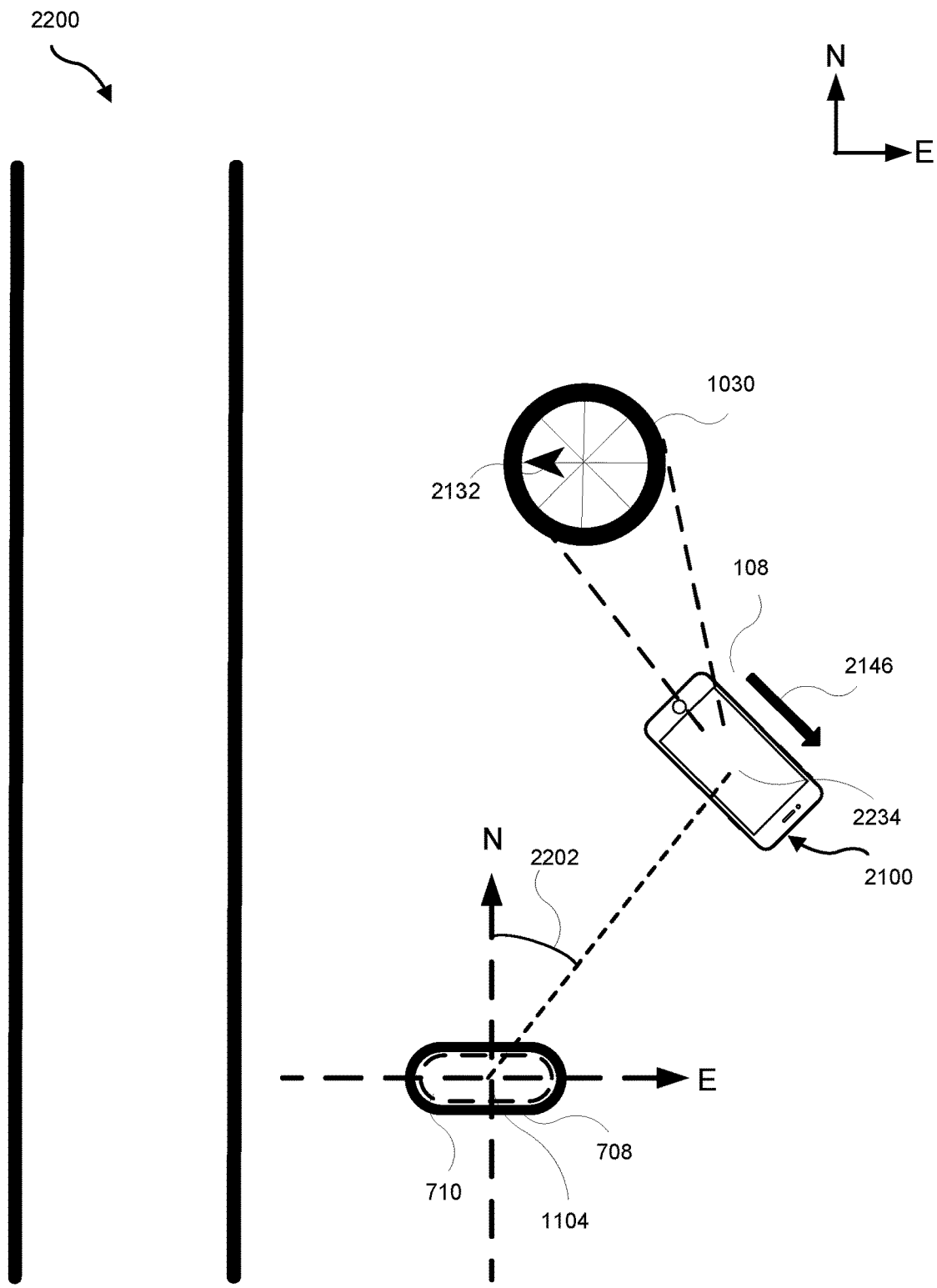
FIG. 22 is an illustration of a fifth map showing an angle of arrival of a requestor computing device to a personal mobility vehicle computing device.

FIG. 22 is an illustration of a fifth map 2200 showing an angle of arrival (AoA) 2202 of a requestor computing device (e.g., the requestor computing device 108) to a personal mobility vehicle computing device (e.g., the personal mobility vehicle computing device 708). Referring to FIG. 6 and FIG. 21, the map 2200 shows the requestor device 108 at a location 2234. As described with reference to FIG. 21, an orientation of the requestor computing device 108 may be determined. It may be assumed that in the example shown in FIG. 21 and referring to FIG. 20, the requestor 102 is holding the requestor computing device 108 such that the requestor 102 may read the GUI 2100 on the display device 420 of the requestor computing device 108 after walking between the building 1406 and the tree 1408.

For example, the requestor 102 is directed to travel in the direction as indicated by the direction of travel 2132 on the directional indicator 1030 based on the location of the requestor computing device 108 (location 2234) and the location of the personal mobility vehicle 104*a* (location 1104). In order to determine the direction of travel 2132 on the directional indicator 1030, an AoA 2202 may be determined (calculated) based on the orientation of the requestor computing device 108, an orientation of the personal mobility vehicle computing device 708, the location 1104, and the location 2234. Once the AoA 2202 is determined, the location for display of the direction of travel 2132 in the directional indicator 1030 may be determined.

Referring also to FIG. 9, the antenna control module 926 may control the operations of the antenna(s) 710 when determining the AoA 2202. For example, the antenna control module 926 may control each of the elements included in the antenna(s) 710 to transmit signals to and/or receive signals from the requestor computing device 108. Based on one or more of a received signal strength and angle of arrival of a signal to a particular antenna element, one or more of the distance module 922, the directional module 924, and the orientation modules 916 may determine (calculate) the AoA 2202 as described herein.

In the example shown in FIG. 21 and FIG. 22, the requestor 102 is directed towards the location 1104 of the personal mobility vehicle 104*a*. In some situations, though the requestor 102 may be within a line of sight of the personal mobility vehicle 104*a*, the requestor 102 may be oriented or looking in another direction and may not see the personal mobility vehicle 104*a*. Therefore, the direction of travel 2132 in the directional indicator 1030 may guide the requestor 102 in the right direction. The directional indicator 1030 may be updated in real-time as the requestor 102 travels towards the personal mobility vehicle 104*a* providing real-time directions to the personal mobility vehicle 104*a*.

Figure 23:
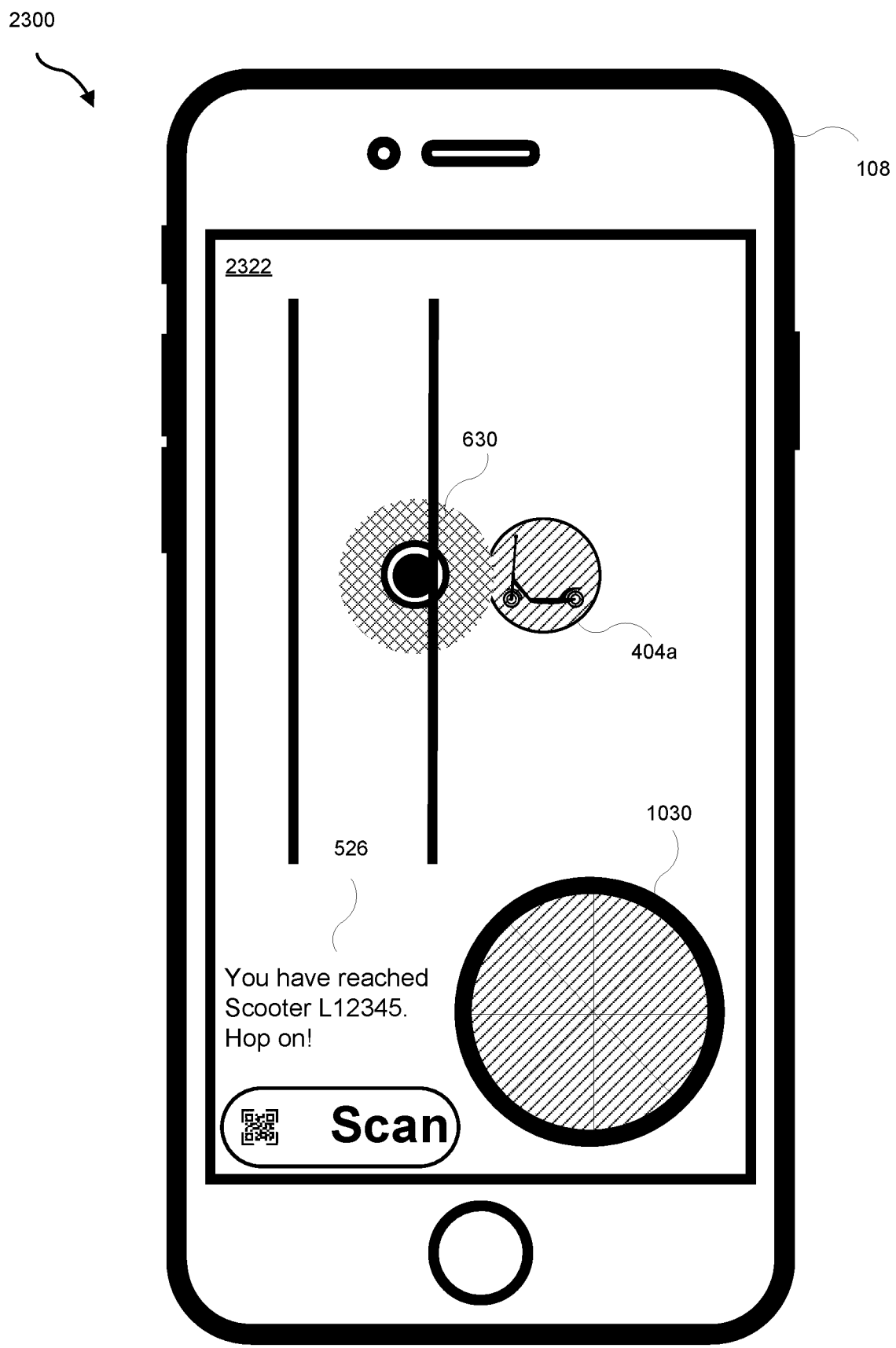
FIG. 23 is an illustration of a ninth example graphical user interface for a provider application executing on a requestor computing device as displayed on a display device of the requestor computing device.

FIG. 23 is an illustration of a ninth example graphical user interface (GUI) 2300 for a provider application executing on a requestor computing device (e.g., the requestor computing device 108) as displayed on a display device 420 of the requestor computing device (e.g., the requestor computing device 108). The GUI 2300 provides an indication that the requestor 102 has found the reserved personal mobility vehicle 104*a*. For example, a visual indication for the personal mobility vehicle indicator 404*a* and the directional indicator 1030 may be altered to match one another (e.g., highlighted the same, of the same color, etc.). In addition, or in the alternative, a message may be displayed in the information area 526 indicating that the requestor 102 has found the personal mobility vehicle 104*a*. In addition, or in the alternative, the location indicator 630 may be placed in the GUI 2300 to meet and/or overlap with the personal mobility vehicle indicator 404*a*. In some implementations, the location indicator 630 may also be altered to match the visual indications of the personal mobility vehicle indicator 404*a* and/or the directional indicator 1030. The GUI 2300 may display a map 2322 that shows a relative location of the requestor computing device 108 (e.g., the location indicator 630) and a relative location of the personal mobility vehicle 104*a* (e.g., personal mobility vehicle indicator 404*a*).

Figure 24:
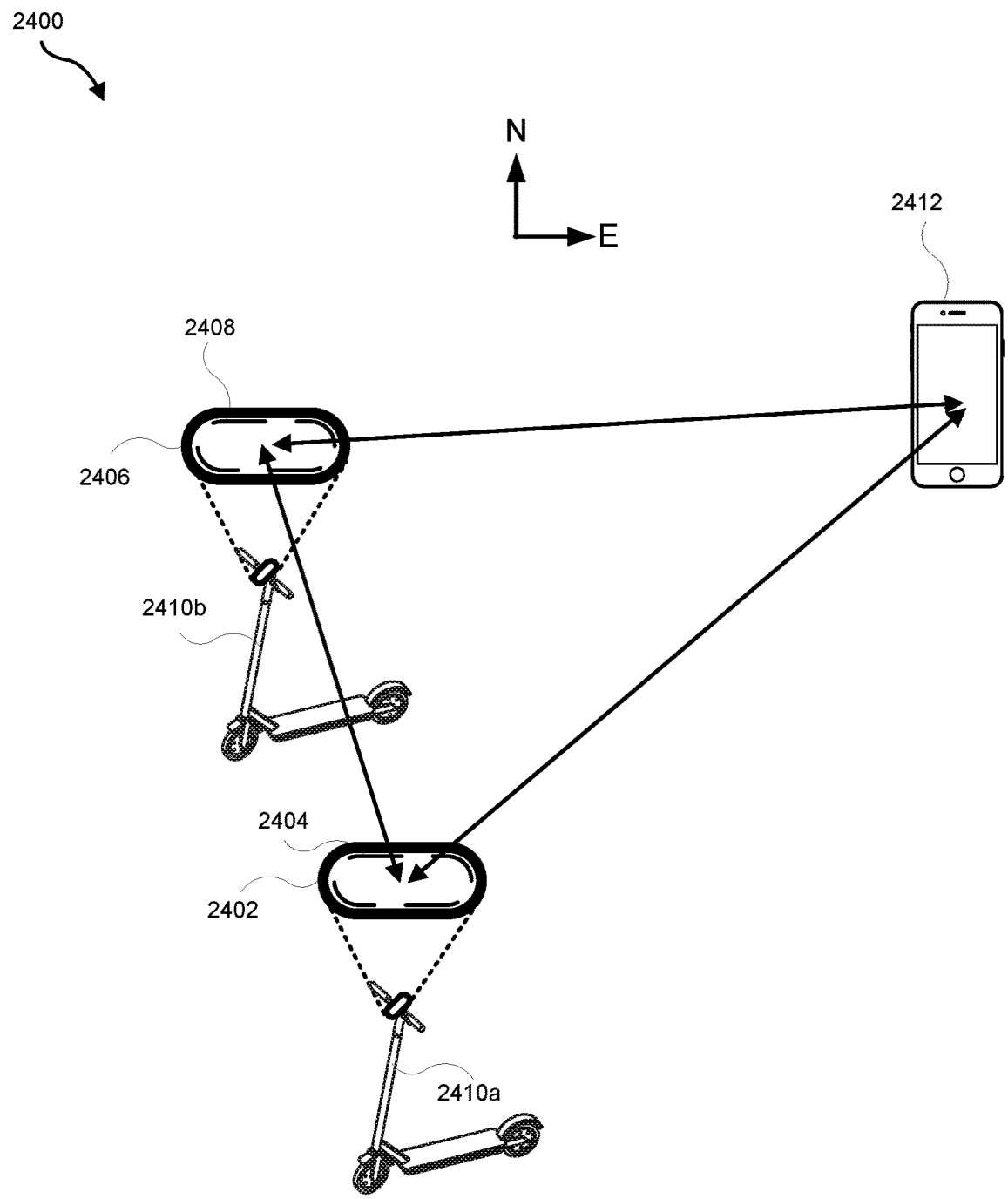
FIG. 24 is an illustration of an example use of triangulation when determining an angle of arrival of a requestor computing device to a personal mobility vehicle computing device.

FIG. 24 is an illustration of an example use of triangulation 2400 when determining an angle of arrival of a requestor computing device to a personal mobility vehicle computing device. For example, a personal mobility vehicle computing device 2402 may include one or more antenna(s) 2404. As described herein, the antenna(s) 2404 may be an array of antennas. Additionally, a personal mobility vehicle computing device 2406 may include one or more antenna(s) 2408. As described herein, the antenna(s) 2408 may be an array of antennas. Each of the personal mobility vehicle computing device 2402 and the personal mobility vehicle computing device 2406 may operate as, for example, the personal mobility vehicle computing device 708 as described herein. Each of the antenna(s) 2404 and the antenna(s) 2408 may operate as, for example, the antenna(s) 710 as described herein.

For example, a requestor may reserve personal mobility vehicle 2410*a* using a requestor computing device 2412. The personal mobility vehicle computing device 2402 may be coupled to (mounted on) the personal mobility vehicle

2410*a*. Personal mobility vehicle 2410*b* may be located near the personal mobility vehicle 2410*a*. Specifically, the personal mobility vehicle computing device 2406 that may be coupled to (mounted on) the personal mobility vehicle 2410*b* may be located within short-range communication range of the personal mobility vehicle computing device 2402 and the requestor computing device 2412.

As described herein, an angle of arrival of the requestor computing device 2412 to the personal mobility vehicle computing device 2402 may be determined (calculated). As described herein, an angle of arrival of the requestor computing device 2412 to the personal mobility vehicle computing device 2406 may be determined (calculated). As described herein, a distance between the personal mobility vehicle computing device 2402 and the requestor computing device 2412 may be determined (calculated). As described herein, a distance between the personal mobility vehicle computing device 2406 and the requestor computing device 2412 may be determined (calculated). As described herein, a distance between the personal mobility vehicle computing device 2402 and the personal mobility vehicle computing device 2406 may be determined (calculated). As described herein, an angle of arrival of the personal mobility vehicle computing device 2406 to the personal mobility vehicle computing device 2402 may be determined (calculated). As described herein, an orientation of the personal mobility vehicle computing device 2402 may be determined (calculated). As described herein, an orientation of the personal mobility vehicle computing device 2406 may be determined (calculated). As described herein, an orientation of the requestor computing device 2412 may be determined (calculated).

In some implementations, some or all of the determined (calculated) angle of arrival of the requestor computing device 2412 to the personal mobility vehicle computing device 2402, the angle of arrival of the requestor computing device 2412 to the personal mobility vehicle computing device 2406, the distance between the personal mobility vehicle computing device 2402 and the requestor computing device, the distance between the personal mobility vehicle computing device 2406 and the requestor computing device 2412, the distance between the personal mobility vehicle computing device 2402 and the personal mobility vehicle computing device 2406, the angle of arrival of the personal mobility vehicle computing device 2406 to the personal mobility vehicle computing device 2402, the orientation of the personal mobility vehicle computing device 2402, the orientation of the personal mobility vehicle computing device 2406, and the orientation of the requestor computing device 2412 may be used to provide more accurate directional information to a requestor.

Figure 25:
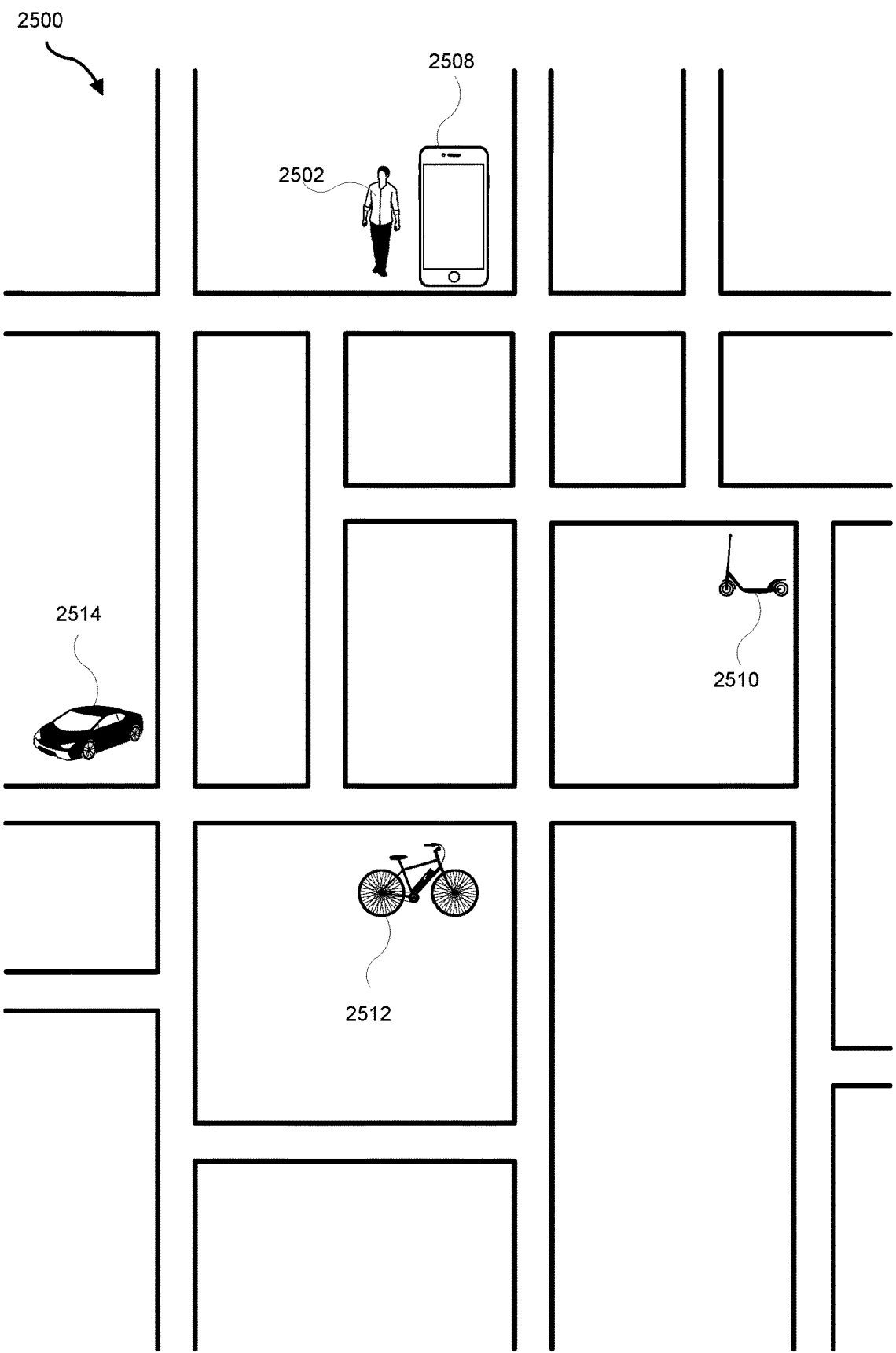
FIG. 25 is an illustration of an example of a scenario of a transportation requestor requesting to be matched with a vehicle for use in fulfilling a transportation request.

FIG. 25 is an illustration of an example of a scenario 2500 of a transportation requestor requesting to be matched with a vehicle for use in fulfilling a transportation request. A requestor 2502 may request transportation using a personal mobility vehicle such as a scooter 2510 or a bicycle 2512. The requestor 2502 may request transportation by way of a vehicle such as a car 2514. In some cases, the requestor 2502 may operate the scooter 2510 and the bicycle 2512 as transport for a trip. In some cases, another party may operate the car 2514 as transport for a trip.

In some implementations, the scooter 2510 may have a computing device such as the personal mobility vehicle computing device 708 coupled to (mounted on) the scooter 2510. In some implementations, the bicycle 2512 may have a computing device such as the personal mobility vehicle computing device 708 coupled to (mounted on) the bicycle 2512. In some implementations, the car 2514 may have a computing device such as the personal mobility vehicle computing device 708 coupled to (mounted on (inside or outside), placed inside of) the car 2514. In all cases, however, the requestor 2502 using a requestor computing device 2508 may need directions to a location of a vehicle for use in transport for a trip. The requestor 2502 may be directed to a location for the scooter 2510, the bicycle 2512, or the car 2514 using any of the systems, methods, processes, and techniques as described herein.

Figure 26:
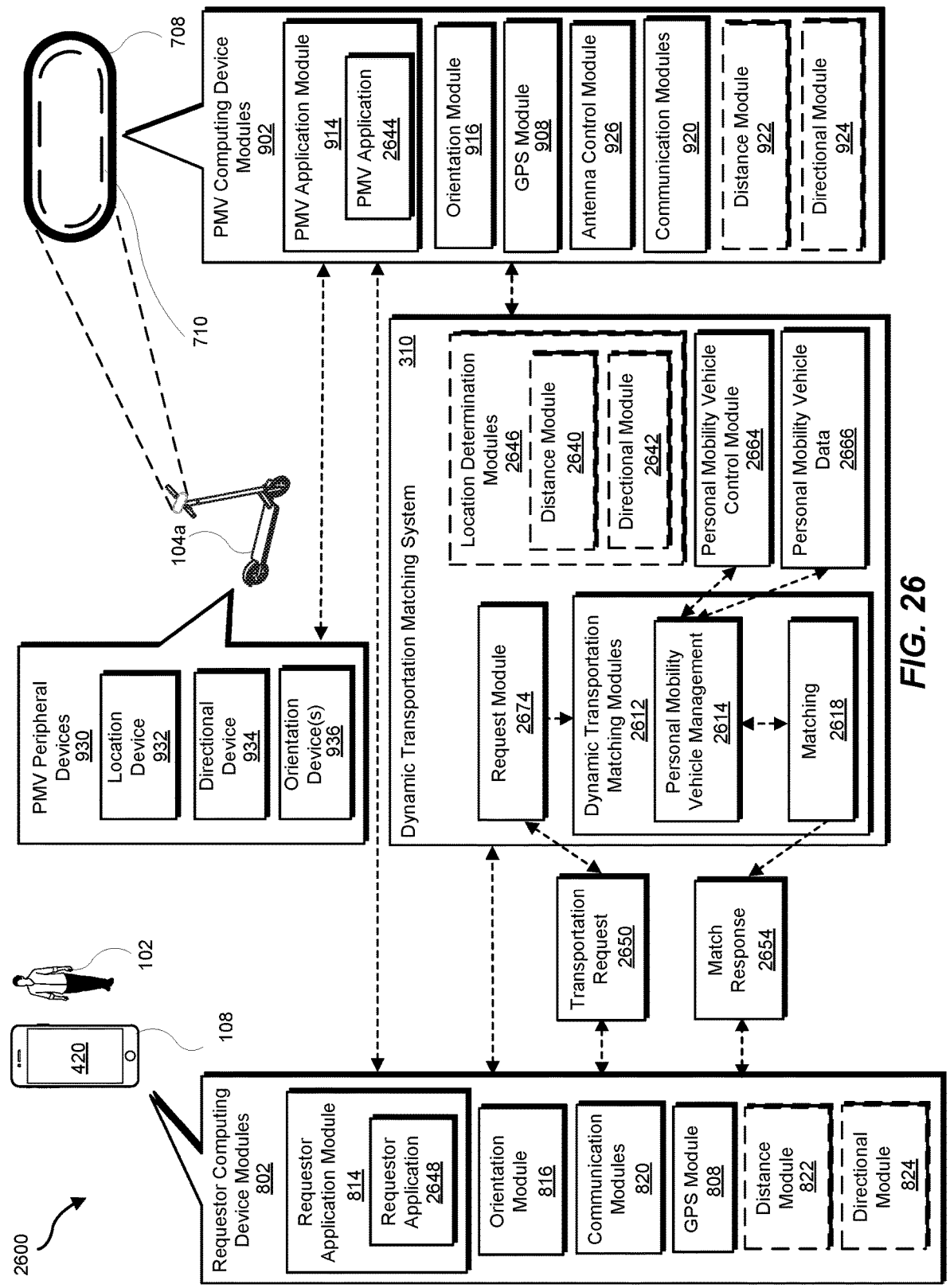
FIG. 26 is a block diagram of an example system for matching transportation requests with a dynamic transportation network that includes personal mobility vehicles with mounted computing devices that include one or more antennas.

FIG. 26 is a block diagram of an example system 2600 for matching transportation requests with a dynamic transportation network that includes personal mobility vehicles with mounted computing devices that include one or more antennas. Referring to FIG. 7, for example, the system 2600 shows requestor computing device 108 interacting/interfacing with the dynamic transportation matching system 310 that further interacts/interfaces with the personal mobility vehicle computing device 708 mounted on (coupled to) the personal mobility vehicle 104*a*.

As shown in FIG. 26, the dynamic transportation matching system 310 may be configured with one or more dynamic transportation matching modules 2612 that may perform one or more of the steps described herein. The dynamic transportation matching system 310 may represent any computing system and/or set of computing systems capable of matching transportation requests. The dynamic transportation matching system 310 may be in communication with the personal mobility vehicle computing device 708. In some implementations, the dynamic transportation matching system 310 may be in communication with more than one (e.g., two or more) personal mobility vehicle computing devices coupled to respective personal mobility vehicles.

The personal mobility vehicle 104*a* may represent any personal mobility vehicle that may fulfill transportation requests. In some examples, the personal mobility vehicle 104*a* may represent disparate personal mobility vehicle types and/or models. In some examples, the personal mobility vehicle 104*a* may represent standard commercially available personal mobility vehicles. In some examples, the personal mobility vehicle 104*a* may be human-operated. In some examples, the personal mobility vehicle 104*a* may also be partly autonomous (or fully autonomous). Accordingly, throughout the instant disclosure, references to a "transportation provider" (or "provider") may, where appropriate, refer to a vehicle piloted by a requestor, and/or an autonomous system for piloting a vehicle. While FIG. 26 does not specify a number of personal mobility vehicles, it may be readily appreciated that the systems described herein are applicable to hundreds of personal mobility vehicles, thousands of personal mobility vehicles, or more. In some examples, the personal mobility vehicle 104*a* may be included in a dynamic transportation network that may provide (supply) transportation on an on-demand basis to transportation requestors.

As described herein, the dynamic transportation matching system 310 may communicate with the requestor computing device 108 and the personal mobility vehicle computing device 708. The requestor computing device 108 and the personal mobility vehicle computing device 708 may be any suitable type of computing device. As described herein, the personal mobility vehicle computing device 708 may be mounted on or otherwise coupled to the personal mobility vehicle 104*a*. In some examples, the requestor computing device 108 and/or the personal mobility vehicle computing device 708 may be mobile devices. For example, the requestor computing device 108 and/or the personal mobility vehicle computing device 708 may be a smartphone.

Additionally, or alternatively, the requestor computing device 108 and/or the personal mobility vehicle computing device 708 may be tablet computers, personal digital assistants, or any other type or form of mobile computing device. According to some examples, the requestor computing device 108 and/or the personal mobility vehicle computing device 708 may include wearable computing devices (e.g., a driver-wearable computing device), such as smart glasses, smart watches, etc. In some examples, the requestor computing device 108 and/or the personal mobility vehicle computing device 708 may be a device suitable for temporarily mounting on a personal mobility vehicle (e.g., for use by a requestor and/or provider for a transportation matching application, a navigation application, and/or any other application suited for the use of requestors and/or providers). Additionally, or alternatively, the personal mobility vehicle computing device 708 may be a device suitable for permanently mounting on or coupling to a personal mobility vehicle that has a personal mobility vehicle application installed on the computer (e.g., a personal mobility vehicle application 2644 included in the personal mobility vehicle application module 914) to provide transportation services to transportation requestors and/or to communicate with the dynamic transportation matching system 310.

As shown in FIG. 26, referring to FIG. 9, the personal mobility vehicle computing device 708 may include one or more personal mobility vehicle computing device modules 902. The PMV application 2644 may represent any application, program, and/or module that may provide one or more services related to operating a personal mobility vehicle and/or providing transportation matching services. In addition, and as is described in greater detail herein, the PMV application may provide the dynamic transportation matching system 310 with information about the PMV (e.g., a current location of the personal mobility vehicle, an orientation of the personal mobility vehicle) to enable the dynamic transportation matching system 310 to provide dynamic transportation matching and/or management services for the provider and one or more requestors.

The personal mobility vehicle 104a may have one or more personal mobility vehicle peripheral devices 930 mounted on (coupled to) the personal mobility vehicle 104a. For example, referring to FIG. 9, the personal mobility vehicle peripheral devices 930 may include a location device 932 and/or a directional device 934 and/or one or more orientation device(s) 936. For example, the directional device 934 may determine a current direction of travel (e.g., north, south, east, west, or any combination) based on a current orientation of the personal mobility vehicle 104a as determined by information and data provided by the orientation device(s) 936. The location device 932 may identify a current location of the personal mobility vehicle 104a in geolocation coordinates (e.g., latitude, longitude, global positioning system (GPS) coordinates) using information and data provided by the GPS module 908.

For example, the location device 932 alone or in combination with the GPS module 908 may be used to identifying a current location of the personal mobility vehicle 104a. The personal mobility vehicle application 2644 may provide the current location of the personal mobility vehicle 104a to a personal mobility vehicle data module 2666 included in the dynamic transportation matching system 310. The personal mobility vehicle application 2644 may also provide availability information for the personal mobility vehicle 104a (e.g., if the personal mobility vehicle 104a is currently in use, if the personal mobility vehicle 104a is available for use (e.g., the personal mobility vehicle is not currently in use, a battery of the personal mobility vehicle is fully charged, etc.)).

Other personal mobility vehicle computing devices associated with respective personal mobility vehicles may also provide location and availability information of the respective personal mobility vehicle to the personal mobility vehicle data module 2666. A personal mobility vehicle management module 2614 may access the personal mobility vehicle data module 2666 when determining the availability of and locations of personal mobility vehicles. The personal mobility vehicle management module 2614 may interface with a matching module 2618 when matching a personal mobility vehicle with a requestor using the location and availability information.

In some examples, the PMV application 2644 included in the personal mobility vehicle application module 914 along with the communication modules 920 may coordinate communications and/or a payment with the dynamic transportation matching system 310. For example, the payment may be between the requestor 102 and the dynamic transportation matching system 310. According to some embodiments, the PMV application 2644 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for a ridesharing service, a ride sourcing service, an autonomous vehicle service, a personal mobility vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities), a mapping system, a navigation system (e.g., to help a requestor reach and/or locate a personal mobility vehicle, and/or to help a requestor reach a destination using a personal mobility vehicle), a reputation system (e.g., to rate and/or gauge the trustworthiness of a requestor), a payment system, and/or an autonomous or semi-autonomous driving system. The transportation matching system may be implemented on various platforms, including a requestor-owned mobile device, a server computer system, or any other hardware platform capable of providing transportation matching services to one or more requestors.

As shown in FIG. 26, the dynamic transportation matching system 310 may include dynamic transportation matching modules 2612, a request module 2674, a personal mobility vehicle control module 2664, a personal mobility vehicle data module 2666, and in some implementations, location determination modules 2646 that may perform one or more of the processes, methods, or steps described herein. In some embodiments, the request module 2674, the personal mobility vehicle control module 2664, and/or the personal mobility vehicle data module 2666 may be configured using a single module or multiple modules. In some embodiments, a distance module 2640 and/or a directional module 2642 included in the location determination modules may be configured using a single module or multiple modules.

The dynamic transportation matching system 310 may receive a transportation request 2650 at the request module 2674 from the requestor computing device 108 of the requestor 102. The requestor computing device 108 may include a requestor application 2648 included in the requestor application module 814. The requestor application 2648 may be an application, a program, and/or a module that may provide one or more services related to the providing of on-demand transportation and services that may include contacting a transportation service to request transportation and completing the transportation request and/or a trip using a personal mobility vehicle.

For example, a personal mobility vehicle (e.g. the PMV computing device 708 of the personal mobility vehicle 104a) may provide personal mobility vehicle data to the personal mobility vehicle data module 2666. The personal mobility vehicle data module 2666 may provide the data to the personal mobility vehicle management module 2614 for use by the dynamic transportation matching system 310. The personal mobility vehicle data can include information about the personal mobility vehicle 104a. The information can include, but is not limited to, a geographic location of the personal mobility vehicle 104a, the availability of the personal mobility vehicle 104a (e.g., has it been reserved, is it functional (e.g., battery is charged)), etc.

The matching module 2618 included in the dynamic transportation matching modules 2612 may match the requestor 102 with the personal mobility vehicle 104a as described herein, using information provided by the personal mobility vehicle management module 2614. The matching module 2618 may provide a match 2654 to the requestor computing device 108 that includes information about the personal mobility vehicle 104a for use in completing a transportation request and/or a trip.

Referring to FIG. 26, in some implementations a distance module and a directional module may be included in the personal mobility vehicle computing device modules 902 (e.g., the distance module 922 and the directional module 924, respectively). In some implementations, a distance module and a directional module may be included in the dynamic transportation matching system 310 (e.g., the distance module 2640 and the directional module 2642, respectively). In some implementations, a distance module and a directional module may be included in the requestor computing device modules 802 (e.g., the distance module 822 and the directional module 824, respectively). As described with reference to FIG. 8 and FIG. 9, the personal mobility vehicle computing device 708 and/or the requestor computing device 108 may provide one another and/or the dynamic transportation matching system 310 with the information and data needed for use by a distance module and a directional module. In some implementations, a distance module may be included in one of the personal mobility vehicle computing device modules 902, the dynamic transportation matching system 310, or the requestor computing device modules 802 while a directional module may be included in a different one of the personal mobility vehicle computing device modules 902, the dynamic transportation matching system 310, or the requestor computing device modules 802.

Figure 27:
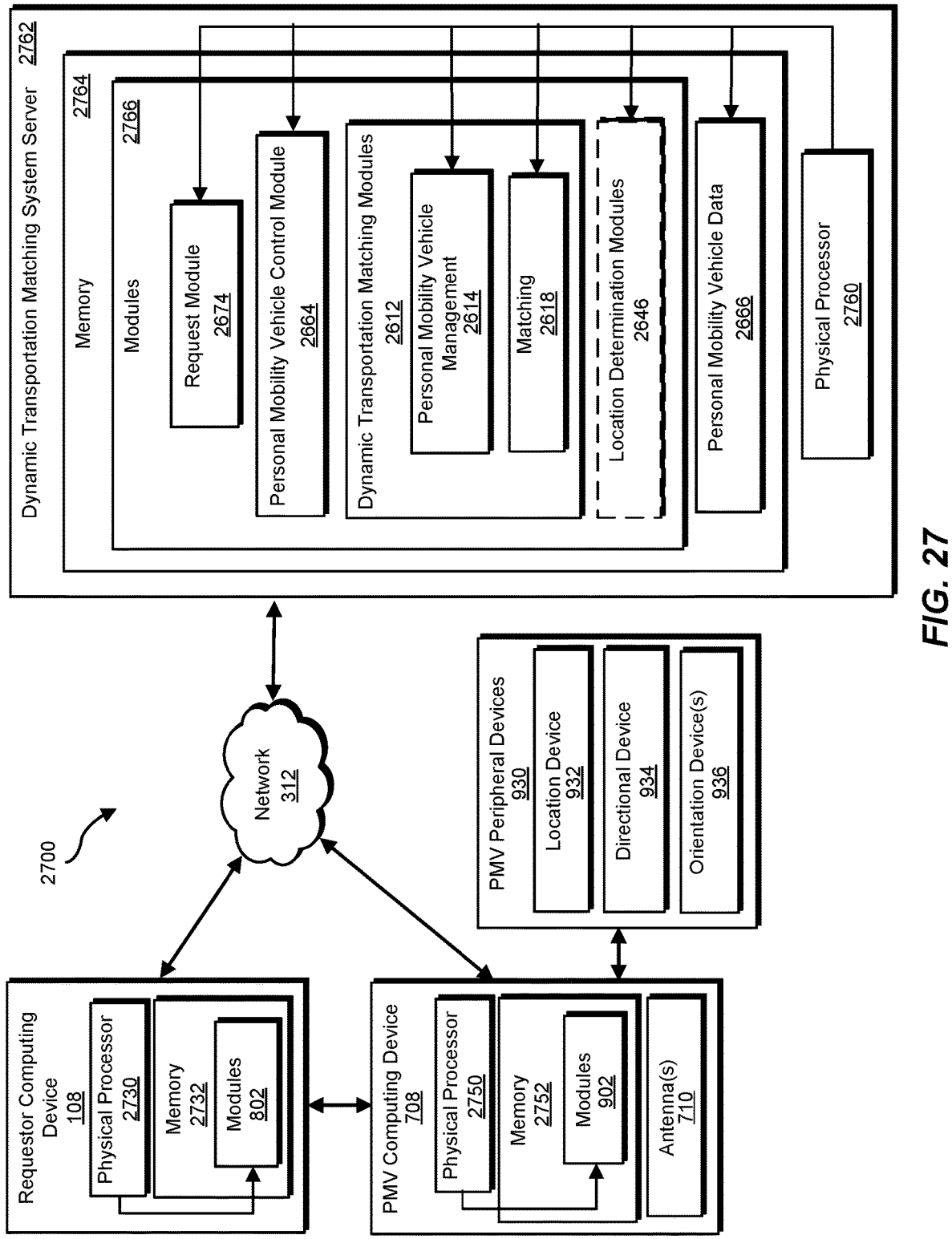
FIG. 27 is a block diagram of an example transportation management system that utilizes and controls personal mobility vehicles with mounted computing devices that include one or more antennas.

FIG. 27 is a block diagram of an example transportation management system 2700 that utilizes and controls personal mobility vehicles with mounted computing devices that include one or more antennas.

Referring at times to FIG. 26, the transportation management system 2700 may include a dynamic transportation matching system server 2762. The dynamic transportation matching system server 2762 may include a memory 2764 which may include one or more modules 2766 and the personal mobility vehicle data module 2666. The module(s) 2766 may include the dynamic transportation matching modules 2612, the request module 2674, the personal mobility vehicle control module 2664, and, in some implementations, the location determination modules 2646. The dynamic transportation matching system server 2762 may include at least one physical processor 2760. In some implementations, the dynamic transportation matching system 310 may be included as part of the dynamic transportation matching system server 2762.

The transportation management system 2700 may include the requestor computing device 108 that is communicatively coupled to the dynamic transportation matching system server 2762 by way of the network 312. The transportation management system 2700 may include the personal mobility vehicle computing device 708 that is communicatively coupled to the dynamic transportation matching system server 2762 by way of the network 312.

The requestor computing device 108 includes a memory 2732 which may include one or more of the modules 802. The requestor computing device 108 may include at least one physical processor 2730. The personal mobility vehicle computing device 708 includes a memory 2752 which may include one or more the modules 902 and the antenna(s) 710. The personal mobility vehicle computing device 708 may include at least one physical processor 2750.

As detailed above, the computing devices and systems described and/or illustrated herein broadly represent any type or form of computing device or system capable of executing computer-readable instructions, such as those contained within the modules and applications described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the applications and/or modules described herein. Examples of memory devices may include, but are not limited to, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory devices. In another example, a physical processor may execute computer-readable instructions included in one or more of the applications and/or modules stored in the above-described memory devices. Examples of physical processors may include, but are not limited to, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain implementations one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data regarding cancelled transportation requests to be transformed. One or more of the modules recited herein may transform the cancelled transportation request related data that may include information regarding external factors as well as progress information for a transportation provider. One or more of the modules recited herein may output a result of the transformation to create, update, and/or modify one or more data-driven models using machine learning. One or more of the modules recited herein may use the result of the transformation to identify a transportation requestor matched with a first transportation provider whose match is eligible for cancellation. One or more of the modules recited herein may use the result of the transformation to identify a second transportation provider for matching with the transportation requestor responsive to the cancellation of the matching of the transportation requestor with the first transportation provider. One or more of the modules recited herein may store the result of the transformation. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

Figure 28:
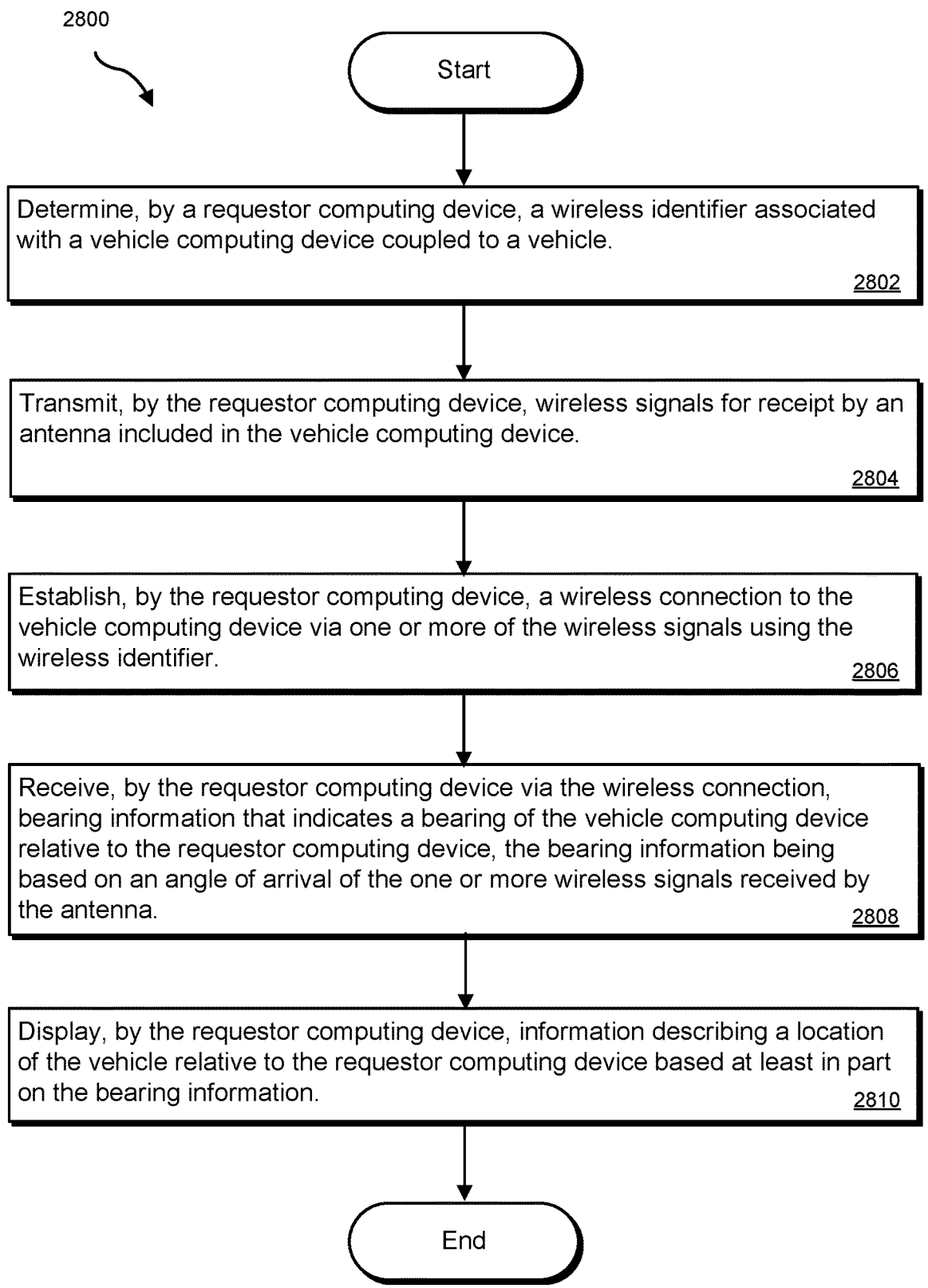
FIG. 28 is a flow diagram of an exemplary computer-implemented method for providing information describing a location of a vehicle relative to a requestor computing device.

FIG. 28 is a flow diagram of an exemplary computer-implemented method 2800 for providing information describing a location of a vehicle (e.g., a personal mobility vehicle) relative to a requestor computing device. The steps shown in FIG. 28 may be performed by any suitable computer-executable code and/or computing system, including the system(s) illustrated in FIGS. 3, 7-9, 26, and 27. In one example, each of the steps shown in FIG. 28 may represent an algorithm whose structure includes and/or is represented by multiple sub-steps, examples of which will be provided in greater detail below.

As illustrated in FIG. 28, at step 2802 one or more of the systems described herein may determine, by a requestor computing device, a wireless identifier associated with a vehicle computing device coupled to a vehicle. For example, referring to FIGS. 3, 7-9, 26, and 27, the requestor computing device 108 may determine a wireless identifier associated with the personal mobility vehicle 104a (e.g., associated with the personal mobility vehicle computing device 708). As described, referring to FIG. 8, for example, when the requestor computing device 108 is within the short-range communication range of the personal mobility vehicle computing device 708, the requestor computing device 108 may receive a broadcast of an identifier from the personal mobility vehicle computing device 708.

The systems described herein may perform step 2802 in a variety of ways. In one example, one or more of the requestor communication modules may be used to determine a wireless identifier associated with a vehicle.

As illustrated in FIG. 28, at step 2804 one or more of the systems described herein may transmit, by the requestor computing device, wireless signals for receipt by an antenna included in the vehicle computing device. For example, referring to FIGS. 3, 7-9, 26, and 27, once the requestor 102 enables (allows) direct communications between the requestor computing device 108 and the personal mobility vehicle computing device 708, the requestor computing device 108 may transmit wireless signals, such as WiFi and/or Bluetooth signals. For example, referring to FIG. 9, the Bluetooth module 906 may configure the personal mobility vehicle computing device 708 to act as a beacon that may "listen" for broadcasts from other Bluetooth-enabled computing devices, such as a broadcast from the requestor computing device 108. In another example, the requestor computing device 108 may enable WiFi communications and may be configured to be recognized by the personal mobility vehicle computing device 708 using WiFi-enabled communications when the personal mobility vehicle computing device 708 receives a WiFi signal from the requestor computing device 108.

The systems described herein may perform step 2804 in a variety of ways. In one example, the requestor computing device 108 may broadcast via Bluetooth the wireless identifier for receipt by the personal mobility vehicle computing device 708. In another example, the requestor computing device 108 enable WiFi communications with other computing devices (e.g., the personal mobility vehicle computing device 708).

As illustrated in FIG. 28, at step 2806 one or more of the systems described herein may establish, by the requestor computing device, a wireless connection to the vehicle computing device via one or more of the wireless signals using the wireless identifier. For example, referring to FIGS. 3, 7-9, 26, and 27, when the requestor 102 enables (allows) direct communications between the requestor computing device 108 and the personal mobility vehicle computing device 708, the personal mobility vehicle computing device 708 may provide an identifier for the personal mobility vehicle computing device 708 to the dynamic transportation matching system 310 by way of the network 312. The dynamic transportation matching system 310 may provide the identifier to the requestor computing device 108 by way of the network 312. The requestor computing device 108 may use the identifier to establish a wireless connection to the vehicle computing device via an antenna included in the vehicle computing device.

The systems described herein may perform step 2806 in a variety of ways. In one example, recognizing the wireless identifier, the requestor computing device 108 may initiate peer-to-peer communications using a wireless connection between the requestor computing device 108 and the personal mobility vehicle computing device 708. The wireless connection may utilize the antenna(s) 710 included in the personal mobility vehicle computing device 708. In some implementations, dependent on the wireless communication protocol of the wireless connection, the wireless connection may utilize one or more antennas included in the requestor computing device 108 to establish the wireless connection between the two computing devices.

As illustrated in FIG. 28, at step 2806 one or more of the systems described herein may receive, by the requestor computing device via the wireless connection, bearing information that indicates a bearing of the vehicle computing device relative to the requestor computing device, wherein the bearing information is based on an angle of arrival of the one or more wireless signals received by the antenna. For example, referring to FIGS. 3, 7-9, 26, and 27, location determination modules (a distance module and a directional module) included in the personal mobility vehicle computing device 708, the requestor computing device 108, and/or the dynamic transportation matching system 310 may be used to determine the bearing information.

The systems described herein may perform step 2806 in a variety of ways. In one example, referring to FIGS. 5-22, a distance module may determine a distance between the requestor computing device 108 and the personal mobility vehicle computing device 708 as described herein. A directional module may determine an angle of arrival of the requestor computing device 108 to the personal mobility vehicle computing device 708 based on information and/or data related to signal measurements gathered from the antenna(s) 710. An orientation of the personal mobility vehicle computing device 708 and an orientation of the requestor computing device 108 may be used when determining the bearing information. A determined distance between the personal mobility vehicle computing device 708 and the requestor computing device 108 may also be used when determining the bearing information.

As illustrated in FIG. 28, at step 2810 one or more of the systems described herein may display, by the requestor computing device, information describing a location of the vehicle relative to the requestor computing device based at least in part on the bearing information. For example, referring to FIG. 8, the requestor application module 814 may generate and control a graphical user interface (GUI or user interface as described herein with reference to FIGS. 4-6, 10, 12, 18, and 21) for display on the display device 420 of the requestor computing device 108.

The systems described herein may perform step 2810 in a variety of ways. In one example, based on the short-range communications, a distance between a requestor computing device and a personal mobility vehicle computing device may be determined and displayed in an information area of a GUI. The GUI may display a map that shows a relative location of the requestor computing device as an indicator on the map, a relative location of the personal mobility vehicle as another indicator on the map, and a route of travel for a requestor to reach a personal mobility vehicle. Using an orientation of the requestor computing device, the current location of the requestor computing device, and the direction of travel along the route towards the personal mobility vehicle, a directional indicator included in the GUI may provide a visual indication of a direction of travel for use by the requestor.

In one example, a computer-implemented method may include determining a wireless identifier associated with a vehicle computing device coupled to a vehicle, transmitting wireless signals for receipt by an antenna included in the vehicle computing device, establishing a wireless connection to the vehicle computing device via one or more of the wireless signals using the wireless identifier, receiving, via the wireless connection, bearing information that indicates a bearing of the vehicle computing device relative to the requestor computing device, the bearing information being based on an angle of arrival of the one or more wireless signals received by the antenna, and displaying information describing a location of the vehicle relative to the requestor computing device based at least in part on the bearing information.

In some examples, the antenna may be an array of computer-controlled antennas. electronically scanned to create a beam of radio waves that are steered to point in different directions, the steering enabling the array of computer-controlled antennas to receive one or more of the wireless signals.

In some examples, the angle of arrival of the wireless signals may be relative to an orientation of the vehicle computing device.

In some examples, the computer-implemented method may further include identifying, by the requestor computing device, an orientation of the requestor computing device.

In some examples, displaying information describing the location of the vehicle relative to the requestor computing device may include displaying an indication of a direction of travel of the requestor computing device to the vehicle based on the bearing information, the orientation of the requestor computing device, and the orientation of the vehicle computing device.

In some examples, the computer-implemented method may further include determining, by the requestor computing device, a distance between the vehicle computing device and the requestor computing device based on a strength of the one or more of the wireless signals.

In some examples, the computer-implemented method may further include determining, by the requestor computing device, whether the distance is within a threshold distance.

In some examples, establishing the wireless connection to the vehicle computing device may be based at least in part on determining that the distance is within the threshold distance.

In some examples, the computer-implemented method may further include determining that the requestor computing device is traveling towards the location of the vehicle based at least in part on the strength of the one or more of the wireless signals.

In some examples, the computer-implemented method may further include determining, by the requestor computing device, whether the distance indicates that the requestor computing device is at the location of the vehicle computing device.

In some examples, displaying the information describing the location of the vehicle relative to the requestor computing device may further include providing an indication that the requestor computing device is at the location of the vehicle.

In some examples, the computer-implemented method may further include based on establishing the wireless connection, providing, by the requestor computing device, one of a haptic feedback, an audio feedback, or a visual indication.

A corresponding system may include one or more physical processors and one or more memories coupled to one or more of the physical processors, the one or more memories including instructions operable when executed by the one or more physical processors to cause the system to perform operations including determining a wireless identifier associated with a vehicle computing device coupled to a vehicle, transmitting wireless signals for receipt by an antenna included in the vehicle computing device, establishing a wireless connection to the vehicle computing device via one or more of the wireless signals using the wireless identifier, receiving, via the wireless connection, bearing information that indicates a bearing of the vehicle computing device relative to the requestor computing device, the bearing information being based on an angle of arrival of the one or more wireless signals received by the antenna, and displaying information describing a location of the vehicle relative to the requestor computing device based at least in part on the bearing information.

A corresponding non-transitory computer-readable storage medium may include computer-readable instructions that, when executed by at least one processor of a requestor computing device, cause the requestor computing device to determine a wireless identifier associated with a vehicle computing device coupled to a vehicle, transmit wireless signals for receipt by an antenna included in the vehicle computing device, establish a wireless connection to the vehicle computing device via one or more of the wireless signals using the wireless identifier, receive, via the wireless connection, bearing information that indicates a bearing of the vehicle computing device relative to the requestor computing device, the bearing information being based on an angle of arrival of the one or more wireless signals received by the antenna, and display information describing a location of the vehicle relative to the requestor computing device based at least in part on the bearing information.

Figure 29:
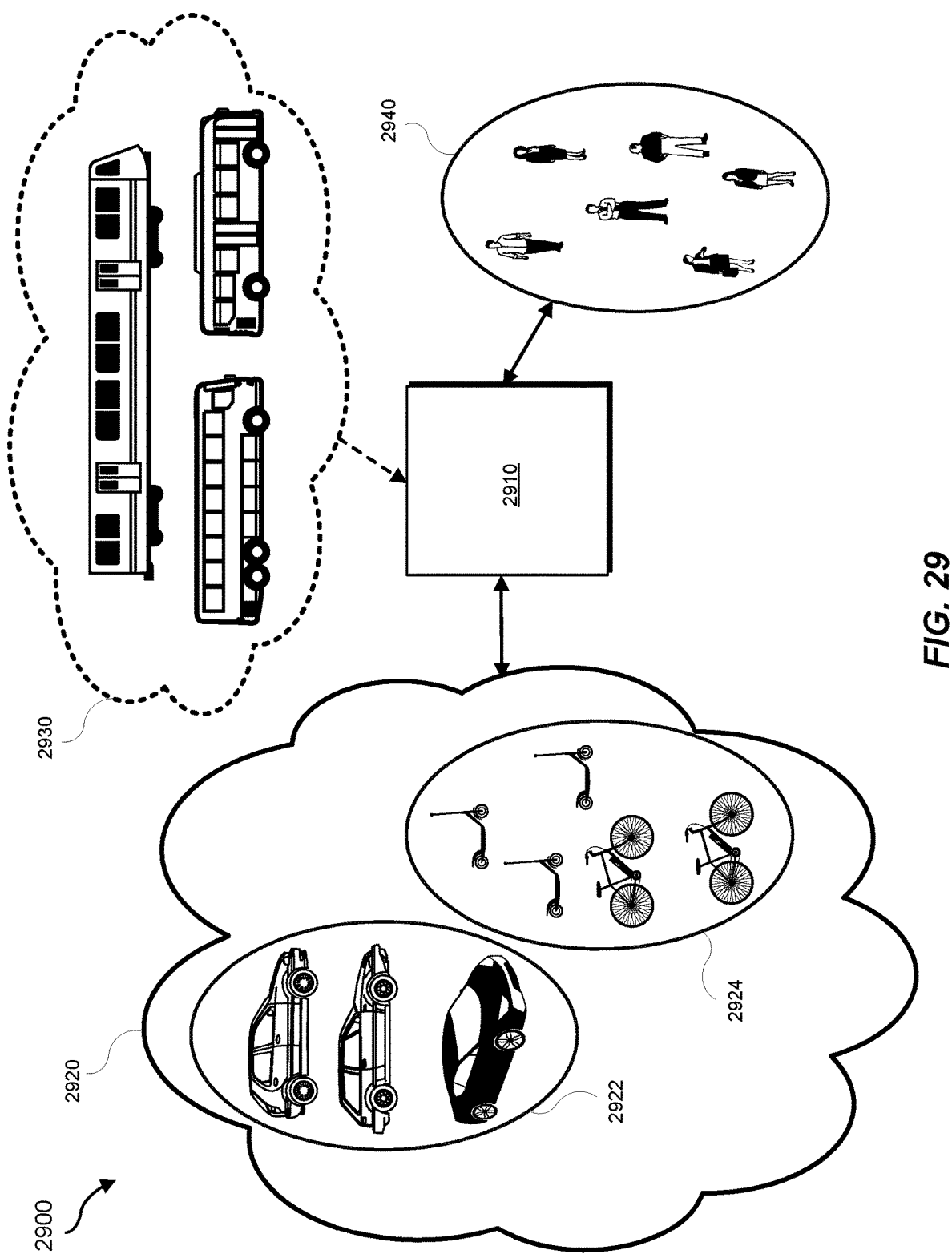
FIG. 29 is an illustration of an example system for providing dynamic transportation with a dynamic transportation network that includes personal mobility vehicles.

FIG. 29 is an illustration of an example system 2900 for providing dynamic transportation with a dynamic transportation network that includes personal mobility vehicles. As shown in FIG. 29, vehicles 2920 may include lane-constrained vehicles 2922 (e.g., automobiles and/or cars) as well as personal mobility vehicles 2924 (e.g., electronic scooters (referred to also as scooters) and electronic bicycles (referred to also as bicycles)). For example, the personal mobility vehicles 2924 may also include any motorized device (e.g., electric, gas, propane, diesel, human-powered, etc.) that includes a computing device that may be mounted on the personal mobility vehicle. The computing device may be used for management and interaction with the dynamic transportation network. A lane-constrained vehicle may be operated by a driver and a transportation requestor may be a passenger in the lane-constrained vehicle. In some implementations, the driver may be a person. In some implementations, a lane-constrained vehicle may be an autonomous vehicle. The transportation requestor may operate a personal mobility vehicle.

The vehicles 2920 may operate as part of a dynamic transportation network managed by a dynamic transportation matching system 2910. Thus, the dynamic transportation matching system 2910 may be in communication with the vehicles 2920 (and/or provider devices associated with the vehicles 2920) to receive information relevant to making transportation matches (e.g., location information, availability information, etc.) as well as to provide matching instructions once transportation matches have been made.

In addition to the vehicles 2920, in some examples, the dynamic transportation matching system 2910 may also be in communication with vehicles 2930. In some examples, vehicles 2930 may not operate as a part of the dynamic transportation network. For example, the dynamic transportation matching system 2910 may not manage or direct the vehicles 2930. Instead, the vehicles 2930 may provide predictable and/or reliable transportation upon which the dynamic transportation matching system 2910 may rely when making matches. For example, the vehicles 2930 may include buses, subways, trains, and the like that may (i) run on fixed schedules known to the dynamic transportation matching system 2910 and/or (ii) make available information to the dynamic transportation matching system 2910 allowing the dynamic transportation matching system 2910 to predict departure and arrival times. While the dynamic transportation matching system 2910 may not manage or control the vehicles 2930, in some examples, the dynamic transportation matching system 2910 may interact with systems that may manage transportation provided by the vehicles 2930. For example, the dynamic transportation matching system 2910 may procure tickets to ride one or more of the vehicles 2930 on behalf of one or more of requestors 2940 and/or may notify one or more of the vehicles 2930 of the status of one or more of the requestors 2940. When the dynamic transportation matching system 2910 receives transportation requests from one or more of the requestors 2940, the dynamic transportation matching system 2910 may match the transportation request with one or more providers among the vehicles 2920 and/or the vehicles 2930 based on any of a variety of factors.

For example, the dynamic transportation matching system 2910 may match the transportation request based on the current and/or projected location of and/or the current and/or projected availability of each candidate provider. In some examples, the dynamic transportation matching system 2910 may match the transportation requestor to a first provider instead of a second provider in order to maintain availability of the second provider for another current or prospective requestor. In some examples, the dynamic transportation matching system 2910 may match the transportation requestor based on a suitability of a candidate provider for completing the transportation request. For example, the dynamic transportation matching system 2910 may determine that a long-distance trip is suited for a lane-constrained vehicle but may determine that a relatively short trip is suited for a personal mobility vehicle. In some examples, the dynamic transportation matching system 2910 may match a transportation requestor to multiple providers. For example, the dynamic transportation matching system 2910 may match a lane-constrained vehicle to one leg of a trip, a mass transit vehicle to another leg of the trip, and a personal mobility vehicle to a third leg of the trip.

Figure 30:
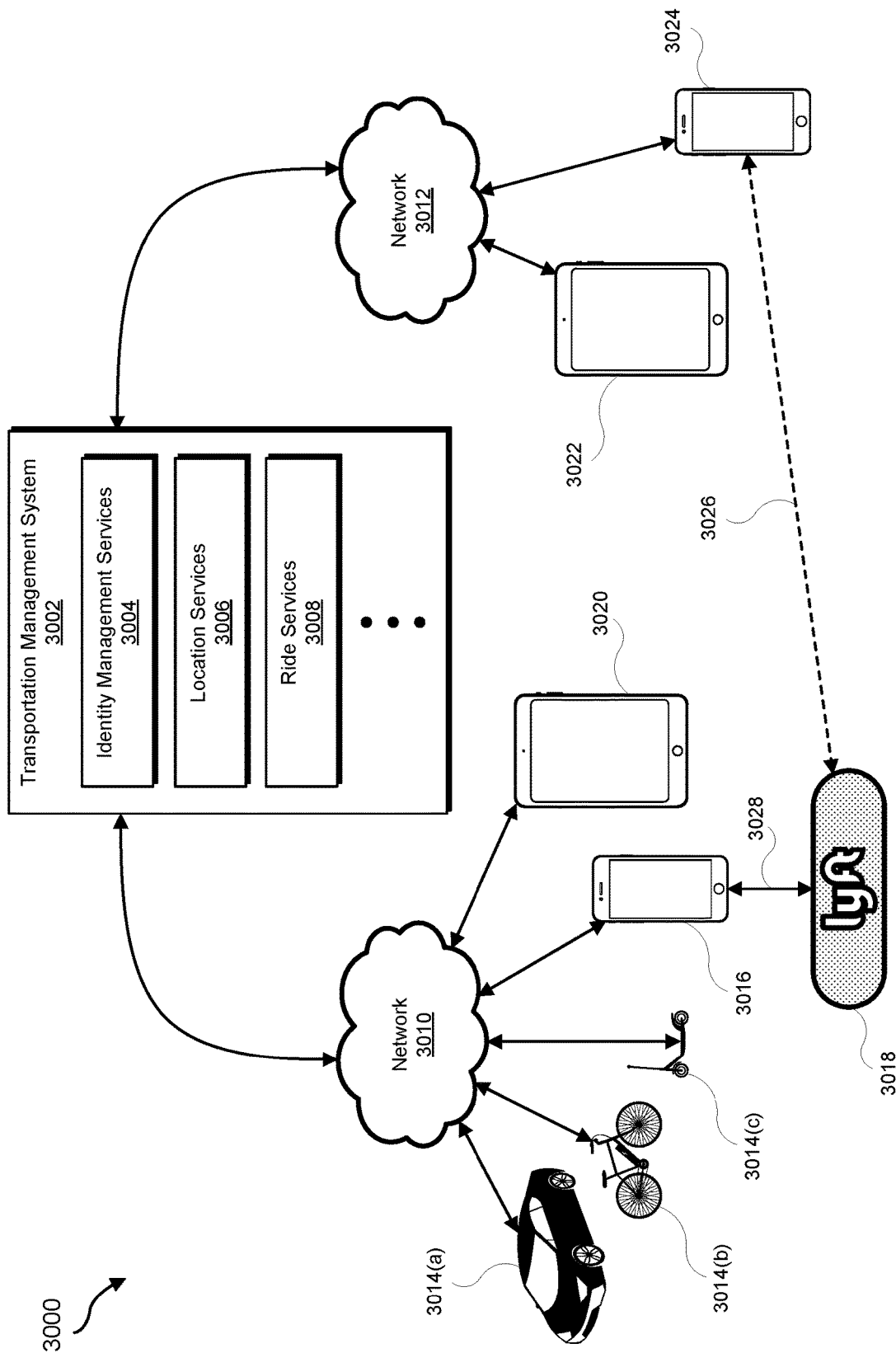
FIG. 30 shows a transportation management environment in accordance with various embodiments.

FIG. 30 shows a transportation management environment 3000 in accordance with various embodiments. As shown in FIG. 30, a transportation management system 3002 may run one or more services and/or software applications, including identity management services 3004, location services 3006, ride services 3008, and/or other services. Although FIG. 30 shows a certain number of services provided by transportation management system 3002, more or fewer services may be provided in various implementations. In addition, although FIG. 30 shows these services as being provided by transportation management system 3002, all or a portion of any of the services may be processed in a distributed fashion. For example, computations associated with a service task may be performed by a combination of transportation management system 3002 (including any number of servers, databases, etc.), one or more devices associated with a provider (e.g., devices integrated with managed vehicles 3014(*a*), 3014(*b*), and/or 3014(*c*), provider computing devices 3016 and tablets 3020, and transportation management vehicle devices 3018), and/or more or more devices associated with a ride requestor (e.g., the computing devices of the requestor 3024 and tablets 3022). In some embodiments, transportation management system 3002 may include one or more general purpose computers, server computers, clustered computing systems, cloud-based computing systems, and/or any other computing systems or arrangements of computing systems. Transportation management system 3002 may be configured to run any or all of the services and/or software components described herein. In some embodiments, the transportation management system 3002 may include an appropriate operating system and/or various server applications, such as web servers capable of handling hypertext transport protocol (HTTP) requests, file transfer protocol (FTP) servers, database servers, etc.

In some embodiments, identity management services 3004 may be configured to perform authorization services for requestors and providers and/or manage their interactions and/or data with transportation management system 3002. This may include, e.g., authenticating the identity of providers and determining that they are authorized to provide services through transportation management system 3002. Similarly, requestors' identities may be authenticated to determine whether they are authorized to receive the requested services through transportation management system 3002. Identity management services 3004 may also manage and/or control access to provider and/or requestor data maintained by transportation management system 3002, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 3002 may also manage and/or control access to provider and/or requestor data stored with and/or obtained from third-party systems. For example, a requester or provider may grant transportation management system 3002 access to a third-party email, calendar, or task management system (e.g., via the credentials of the user). As another example, a requestor or provider may grant, through a mobile device (e.g., 3016, 3020, 3022, or 3024), a transportation application associated with transportation management system 3002 access to data provided by other applications installed on the mobile device. In some examples, such data may be processed on the client and/or uploaded to transportation management system 3002 for processing.

In some embodiments, transportation management system 3002 may provide ride services 3008, which may include ride matching and/or management services to connect a requestor to a provider. For example, after identity management services module 3004 has authenticated the identity a ride requestor, ride services module 3008 may attempt to match the requestor with one or more ride providers. In some embodiments, ride services module 3008 may identify an appropriate provider using location data obtained from location services module 3006. Ride services module 3008 may use the location data to identify providers who are geographically close to the requestor (e.g., within a certain threshold distance or travel time) and/or who are otherwise a good match with the requestor. Ride services module 3008 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 3008 may use rule-based algorithms and/or machine-learning models for matching requestors and providers.

Transportation management system 3002 may communicatively connect to various devices through networks 3010 and/or 3012. Networks 3010 and 3012 may include any combination of interconnected networks configured to send and/or receive data communications using various communication protocols and transmission technologies. In some embodiments, networks 3010 and/or 3012 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 3010 and/or 3012 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 802.11 family of standards, Bluetooth, Bluetooth Low Energy, Near Field Communication (NFC), Z-Wave, and ZigBee). In various embodiments, networks 3010 and/or 3012 may include any combination of networks described herein or any other type of network capable of facilitating communication across networks 3010 and/or 3012.

In some embodiments, transportation management vehicle device 3018 may include a provider communication device configured to communicate with users, such as drivers, passengers, pedestrians, and/or other users. In some embodiments, transportation management vehicle device 3018 may communicate directly with transportation management system 3002 or through another provider computing device, such as provider computing device 3016. In some embodiments, a requestor computing device (e.g., device 3024) may communicate via a connection 3026 directly with transportation management vehicle device 3018 via a communication channel and/or connection, such as a peer-to-peer connection, Bluetooth connection, NFC connection, ad hoc wireless network, and/or any other communication channel or connection. Although FIG. 30 shows particular devices communicating with transportation management system 3002 over networks 3010 and 3012, in various embodiments, transportation management system 3002 may expose an interface, such as an application programming interface (API) or service provider interface (SPI) to enable various third parties which may serve as an intermediary between end users and transportation management system 3002.

In some embodiments, devices within a vehicle may be interconnected. For example, any combination of the following may be communicatively connected: vehicle 3014(*a*), vehicle 3014(*b*), vehicle 3014(*c*), provider computing device 3016, provider tablet 3020, transportation management vehicle device 3018, requestor computing device 3024, requestor tablet 3022, and any other device (e.g., smart watch, smart tags, etc.). For example, transportation management vehicle device 3018 may be communicatively connected to provider computing device 3016 and/or requestor computing device 3024. Transportation management vehicle device 3018 may establish communicative connections, such as connections 3026 and 3028, to those devices via any suitable communication technology, including, e.g., WLAN technologies implementing the IEEE 802.11 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 3002 using applications executing on their respective computing devices (e.g., 3016, 3018, 3020, and/or a computing device integrated within vehicle 3014(*a*), vehicle 3014(*b*), and/or vehicle 3014(*c*)), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 3014(a), vehicle 3014(b), and/or vehicle 3014(c) may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 3002. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 31:
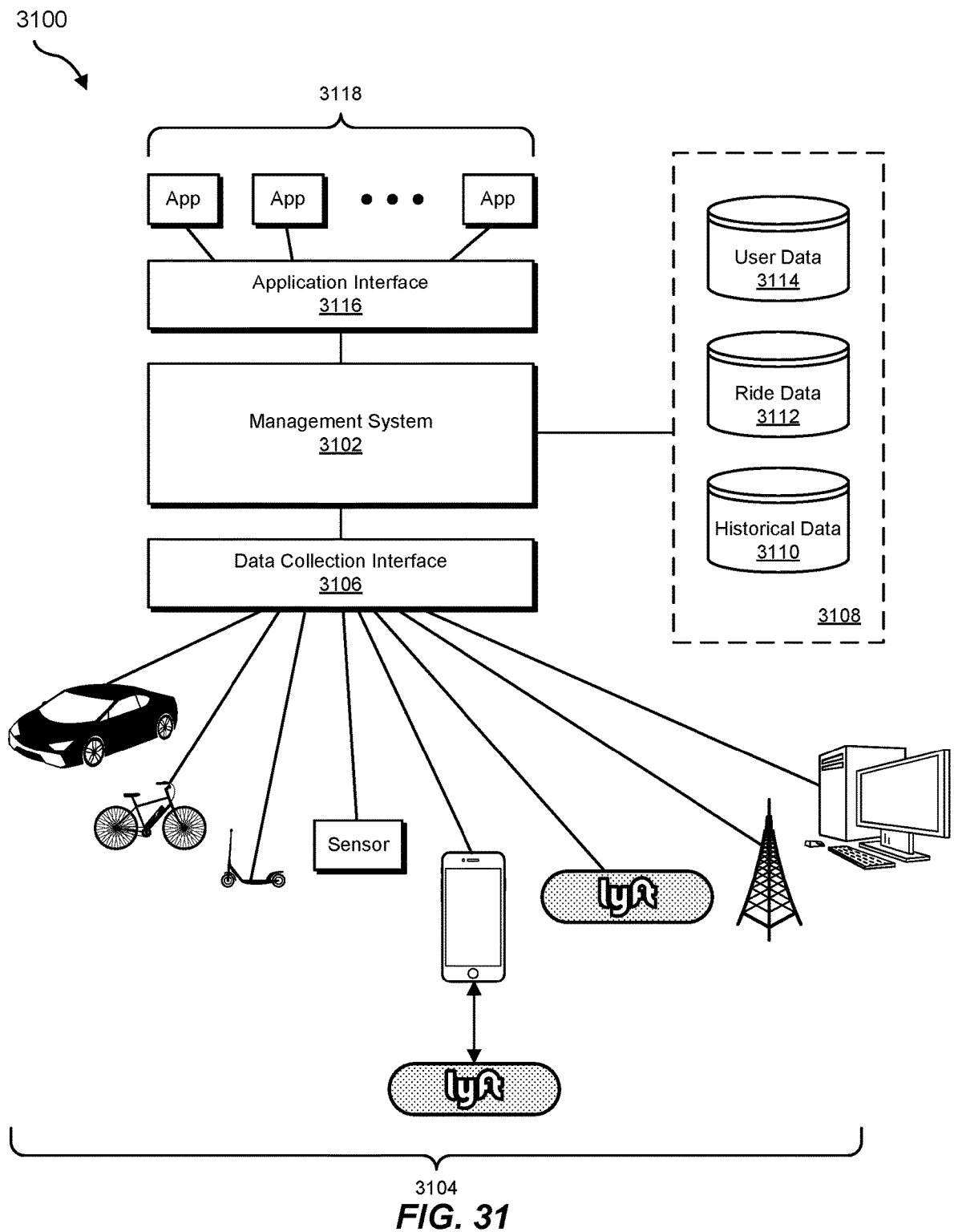
FIG. 31 shows a data collection and application management environment in accordance with various embodiments.

FIG. 31 shows a data collection and application management environment 3100 in accordance with various embodiments. As shown in FIG. 31, management system 3102 may be configured to collect data from various data collection devices 3104 through a data collection interface 3106. As discussed above, management system 3102 may include one or more computers and/or servers or any combination thereof. Data collection devices 3104 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 3106 can include, e.g., an extensible device framework configured to support interfaces for each data collection device. In various embodiments, data collection interface 3106 may be extended to support new data collection devices as they are released and/or to update existing interfaces to support changes to existing data collection devices. In various embodiments, data collection devices may communicate with data collection interface 3106 over one or more networks. The networks may include any network or communication protocol as would be recognized by one of ordinary skill in the art, including those networks discussed above.

As shown in FIG. 31, data received from data collection devices 3104 can be stored in data store 3108. Data store 3108 may include one or more data stores, such as databases, object storage systems and services, cloud-based storage services, and other data stores. For example, various data stores may be implemented on a non-transitory storage medium accessible to management system 3102, such as historical data store 3110, ride data store 3112, and user data store 3114. Data stores 3108 can be local to management system 3102, or remote and accessible over a network, such as those networks discussed above or a storage-area network or other networked storage system. In various embodiments, historical data 3110 may include historical traffic data, weather data, request data, road condition data, or any other data for a given region or regions received from various data collection devices. Ride data 3112 may include route data, request data, timing data, and other ride related data, in aggregate and/or by requestor or provider. User data 3114 may include user account data, preferences, location history, and other user-specific data. Although certain data stores are shown by way of example, any data collected and/or stored according to the various embodiments described herein may be stored in data stores 3108.

As shown in FIG. 31, an application interface 3116 can be provided by management system 3102 to enable various apps 3118 to access data and/or services available through management system 3102. Apps 3118 may run on various user devices (including provider and requestor computing devices, such as those discussed above) and/or may include cloud-based or other distributed apps configured to run across various devices (e.g., computers, servers, or combinations thereof). Apps 3118 may include, e.g., aggregation and/or reporting apps which may utilize data 3108 to provide various services (e.g., third-party ride request and management apps). In various embodiments, application interface 3116 can include an API and/or SPI enabling third party development of apps 3118. In some embodiments, application interface 3116 may include a web interface, enabling web-based access to data 3108 and/or services provided by management system 3102. In various embodiments, apps 3118 may run on devices configured to communicate with application interface 3116 over one or more networks. The networks may include any network or communication protocol as would be recognized by one of ordinary skill in the art, including those networks discussed above, in accordance with an embodiment of the present disclosure.

While various embodiments of the present disclosure are described in terms of a ridesharing service in which the ride providers are human drivers operating their own vehicles, in other embodiments, the techniques described herein may also be used in environments in which ride requests are fulfilled using autonomous vehicles. For example, a transportation management system of a ridesharing service may facilitate the fulfillment of ride requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   determining, by a requestor computing device, a route to a vehicle based on location information associated with the vehicle received from a dynamic transportation matching system server and a location of the requestor computing device;
   determining, by the requestor computing device, a wireless identifier associated with a vehicle computing device coupled to the vehicle;
   transmitting, by the requestor computing device, one or more first wireless signals for receipt by an antenna included in the vehicle computing device;
   determining by the requestor computing device, a distance between the vehicle computing device and the requestor computing device based on a strength of one or more second wireless signals received from the vehicle computing device,
   in response to determining that the distance is within a threshold distance, establishing, by the requestor computing device, a wireless connection to the vehicle computing device using the wireless identifier;
   receiving, by the requestor computing device via the wireless connection, bearing information that indicates a bearing of the vehicle computing device relative to the requestor computing device, wherein the bearing information is based on an angle of arrival of one or more third wireless signals received by the antenna;
   modifying, by the requestor computing device, the route to the vehicle based on the bearing information; and
   displaying the modified route on a display of the requestor computing device.

2. The computer-implemented method of claim 1, wherein the antenna comprises an array of computer-controlled antennas electronically scanned to create a beam of radio waves that are steered to point in different directions, the steering enabling the array of computer-controlled antennas to receive one or more of the one or more first wireless signals.

3. The computer-implemented method of claim 1,
   wherein the angle of arrival of the one or more third wireless signals is relative to an orientation of the vehicle computing device with respect to the requestor computing device; and
   wherein the method further comprises identifying, by the requestor computing device, an orientation of the requestor computing device with respect to the vehicle computing device.

4. The computer-implemented method of claim 3, wherein the modifying the route is based on the bearing information, the orientation of the requestor computing device, and the orientation of the vehicle computing device.

5. The computer-implemented method of claim 1, further comprising determining that the requestor computing device is approaching the vehicle based at least in part on the strength of the one or more second wireless signals.

6. The computer-implemented method of claim 1, further comprising:

determining, by the requestor computing device, whether the requestor computing device is within a second threshold distance from the vehicle computing device; and in response to determining that the requestor computing device is within the second threshold distance from the vehicle computing device, providing, on the requestor computing device, an indication that a user associated with the requestor computing device has arrived at a location of the vehicle.

7. The computer-implemented method of claim 1, further comprising in response to establishing the wireless connection, providing, by the requestor computing device, one of a haptic feedback, an audio feedback, or a visual indication.

8. A system comprising one or more physical processors and one or more memories coupled to one or more of the physical processors, the one or more memories comprising instructions operable when executed by the one or more physical processors to cause the system to perform operations comprising:

determining a route from a requestor computing device to a vehicle based on location information associated with the vehicle received from a dynamic transportation system server and a location of the requestor computing device;

transmitting one or more first wireless signals for receipt by an antenna included in a vehicle computing device of the vehicle;

establishing a wireless connection between the requestor computing device and the vehicle computing device;

receiving, via the wireless connection, bearing information that indicates a bearing of the vehicle computing device relative to the requestor computing device, wherein the bearing information is based on an angle of arrival of one or more of the one or more first wireless signals received by the antenna;

modifying the route from the requestor computing device to the vehicle based on the bearing information;

displaying, on a display of the requestor computing device, information describing the modified route;

determining a distance between the vehicle computing device and the requestor computing device based on a strength of one or more second wireless signals received by the requestor computing device;

determining whether the distance is within a threshold distance; and in response to determining that the distance is within the threshold distance, providing, on the requestor computing device, an indication that a user associated with the requestor computing device has arrived at a location of the vehicle.

9. The system of claim 8, wherein the antenna comprises an array of computer-controlled antennas electronically scanned to create a beam of radio waves that are steered to point in different directions, the steering enabling the array of computer-controlled antennas to receive the one or more of the one or more first wireless signals.

10. The system of claim 8,
wherein the angle of arrival of the one or more of the one or more first wireless signals is relative to an orientation of the vehicle computing device with respect to the requestor computing device; and
wherein the operations further comprise identifying an orientation of the requestor computing device with respect to the vehicle.

11. The system of claim 8, wherein the information describing the modified route comprises an indication of a direction of travel from the requestor computing device to the vehicle based on the bearing information.

12. The system of claim 8, wherein the operations further comprise:
receiving one or more third wireless signals from the vehicle computing device; and
determining a second distance between the vehicle computing device and the requestor computing device based on a second strength of one or more of the one or more third wireless signals.

13. The system of claim 12, wherein the operations further comprise determining whether the second distance is within a second threshold distance, wherein the establishing the wireless connection is based at least in part on determining that the distance is within the second threshold distance.

14. The system of claim 12, wherein the operations further comprise determining that the requestor computing device is approaching the vehicle based at least in part on the second strength of the one or more of the one or more third wireless signals.

15. The system of claim 12, wherein the operations further comprise determining whether the second distance is within a third threshold distance, and wherein the displaying the information describing the modified route is in response to the determining that the second distance is within the third threshold distance.

16. The system of claim 8, wherein the operations further comprise in response to establishing the wireless connection, providing, on the requestor computing device, one of a haptic indication, an audio indication, or a visual indication.

17. A non-transitory computer-readable medium comprising computer-readable instructions that, when executed by at least one processor, cause the at least one processor to perform operations comprising:

receiving location information associated with a vehicle from a dynamic transportation matching system server;

determining a route from a requestor computing device to the vehicle based on the location information associated with the vehicle and a location of the requestor computing device;

detecting that the vehicle is within a threshold distance from the requestor computing device;

in response to the detecting, transmitting, by the requestor computing device, one or more first wireless signals for receipt by an antenna included in the vehicle computing device;

establishing a wireless connection between the requestor computing device and a vehicle computing device of the vehicle via one or more of the one or more first wireless signals;

receiving, via the wireless connection, bearing information that indicates a bearing of the vehicle computing device relative to the requestor computing device, wherein the bearing information is based on an angle of arrival of the one or more of the one or more first wireless signals received by the antenna;

modifying the route from the requestor computing device to the vehicle based on the bearing information;

displaying information describing the modified route on the requestor computing device;

determining, by the requestor computing device, a distance between the vehicle computing device and the requestor computing device based on a strength of one or more second wireless signals received from the vehicle computing device; and determining that the requestor computing device is approaching the vehicle based at least in part on the strength of the one or more second wireless signals.

18. The non-transitory computer-readable medium of claim 17, wherein the vehicle computing device comprises an array of computer-controlled antennas electronically scanned to create a beam of radio waves that are steered to point in different directions, the steering enabling the array of computer-controlled antennas to receive the one or more of the one or more first wireless signals.

19. The non-transitory computer-readable medium of claim 17, wherein the operations further comprise:
   determining, by the requestor computing device, whether the requestor computing device is within a second threshold distance from the vehicle computing device; and
   in response to determining that the requestor computing device is within the second threshold distance from the vehicle computing device, providing, on the requestor computing device, an indication that a user associated with the requestor computing device has arrived at a location of the vehicle.

20. The non-transitory computer-readable medium of claim 17, wherein the angle of arrival of the one or more of the one or more first wireless signals is relative to an orientation of the vehicle computing device with respect to the requestor computing device, and wherein the operations further comprise identifying, by the requestor computing device, an orientation of the requestor computing device with respect to the vehicle computing device.

* * * * *